(12) United States Patent
Kurihara et al.

(10) Patent No.: US 11,803,384 B2
(45) Date of Patent: Oct. 31, 2023

(54) COMPUTER-READABLE RECORDING MEDIUM STORING PROGRAM FOR CONVERTING FIRST SINGLE INSTRUCTION MULTIPLE DATA (SIMD) COMMAND USING FIRST MASK REGISTER INTO SECOND SIMD COMMAND USING SECOND MASK REGISTER, COMMAND CONVERSION METHOD FOR CONVERTING FIRST SIMD COMMAND USING FIRST MASK REGISTER INTO SECOND SIMD COMMAND USING SECOND MASK REGISTER, AND COMMAND CONVERSION APPARATUS FOR CONVERTING FIRST SIMD COMMAND USING FIRST MASK REGISTER INTO SECOND SIMD COMMAND USING SECOND MASK REGISTER

(71) Applicant: FUJITSU LIMITED, Kawasaki (JP)

(72) Inventors: Koji Kurihara, Kawasaki (JP); Kentaro Kawakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/828,075

(22) Filed: May 31, 2022

(65) Prior Publication Data
US 2023/0056168 A1  Feb. 23, 2023

(30) Foreign Application Priority Data

Aug. 20, 2021 (JP) .................. 2021-135232

(51) Int. Cl.
*G06F 9/30* (2018.01)
*G06F 9/38* (2018.01)

(52) U.S. Cl.
CPC ........ *G06F 9/30174* (2013.01); *G06F 9/3001* (2013.01); *G06F 9/30018* (2013.01); *G06F 9/3887* (2013.01)

(58) Field of Classification Search
CPC ............. G06F 9/30018; G06F 9/30036; G06F 9/30174; G06F 8/52; G06F 8/40
See application file for complete search history.

(56) References Cited

U.S. PATENT DOCUMENTS 8,505,002 B2 * 8/2013 Yehia .................. G06F 9/30036
717/160
2014/0189321 A1  7/2014 Uliel et al.

FOREIGN PATENT DOCUMENTS

GB       2537936 A  * 11/2016 ............. G06F 8/443
JP       2014-130580 A  7/2014

OTHER PUBLICATIONS

Luc Michel, Nicolas Fournel and Frédéric Pétrot, "Speeding-up SIMD instructions Dynamic BinaryTranslation in Embedded Processor Simulation", March, IEEE, pp. 1-4 (Year: 2011).*

(Continued)

*Primary Examiner* — Courtney P Carmichael-Moody
(74) *Attorney, Agent, or Firm* — Fujitsu Patent Center

(57) ABSTRACT

A recording medium stores a program for causing a computer to execute a process including: converting, in a first source code corresponding to a first-type processor, a first load command for a first mask register included in the first-type processor into a second load command for a second mask register included in a second-type processor; and converting, when a first SIMD command for performing an arithmetic operation using the first mask register exists after the first load command in the first source code and a state of a value of the first mask register does not coincide with a state of a value of the first mask register, the first SIMD command into a second SIMD command correspond- (Continued)

ing to the second-type processor and a change command for changing a state of a value of the second mask register to a state of a value of the second mask register.

10 Claims, 55 Drawing Sheets

(56) References Cited

OTHER PUBLICATIONS

Yu-Ping Liu, Ding-Yong Hong, Jan-Jan Wu, Sheng-Yu Fu, Wei-Chung Hsu, "Exploiting Asymmetric SIMD Register Configurations in ARM-to-x86 Dynamic Binary Translation", Nov. 2, IEEE, pp. 343-355 (Year: 2017).*

Sheng-Yu Fu, Ding-Yong Hong, Yu-Ping Liu, Jan-Jan Wu, Wei-Chung Hsu, "Optimizing data permutations in structured loads/ stores translation and SIMD register mapping for a cross-ISA dynamic binary translator", September, vol. 98, pp. 173-190 (Year: 2019).*

* cited by examiner

FIG. 4 line INFORMATION                                                                400

| line | ID | state | kind |
|---|---|---|---|
| line NUMBER | MASK REGISTER ID | STATE OF VALUE | TYPE OF COMMAND LINE |
| ... | ... | ... | ... |
| ... | ... | ... | ... |
| ... | ... | ... | ... |
| ... | ... | ... | ... |

MASK REGISTER INFORMATION

| ID | used[ID] | Reserve[ID] | Final_point[ID] | Reserved[ID] | State[ID] |
|----|----------|-------------|-----------------|--------------|-----------|
| 0  | USED?    | SAVING DESTINATION | LAST USED COMMAND LINE | SAVING SOURCE | STATE OF VALUE |
| 1  | ...      | ...         | ...             | ...          | ...       |
| 2  | ...      | ...         | ...             | ...          | ...       |
| 3  | ...      | ...         | ...             | ...          | ...       |

FIG. 7
- vpaddb zmm2, zmm0, zmm1
- ADD 64 PIECES OF DATA OF 8-BIT ($c_i = a_i + b_i$, $i = 0, 1, \ldots,$ AND 63)
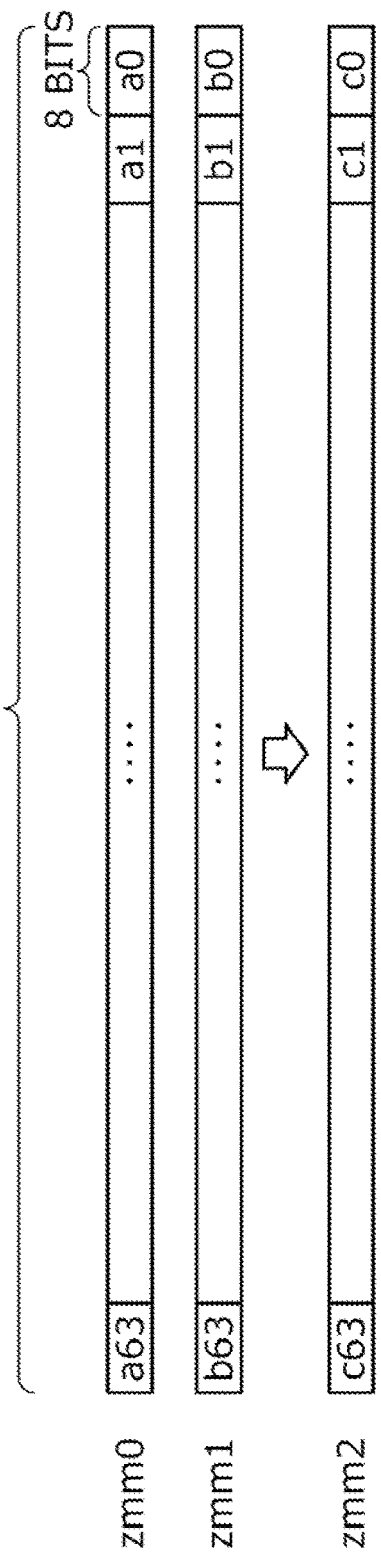
- vpaddq zmm2, zmm0, zmm1
- ADD 8 PIECES OF DATA OF 64-BIT ($c_i = a_i + b_i$, $i = 0, 1, \ldots,$ AND 7)
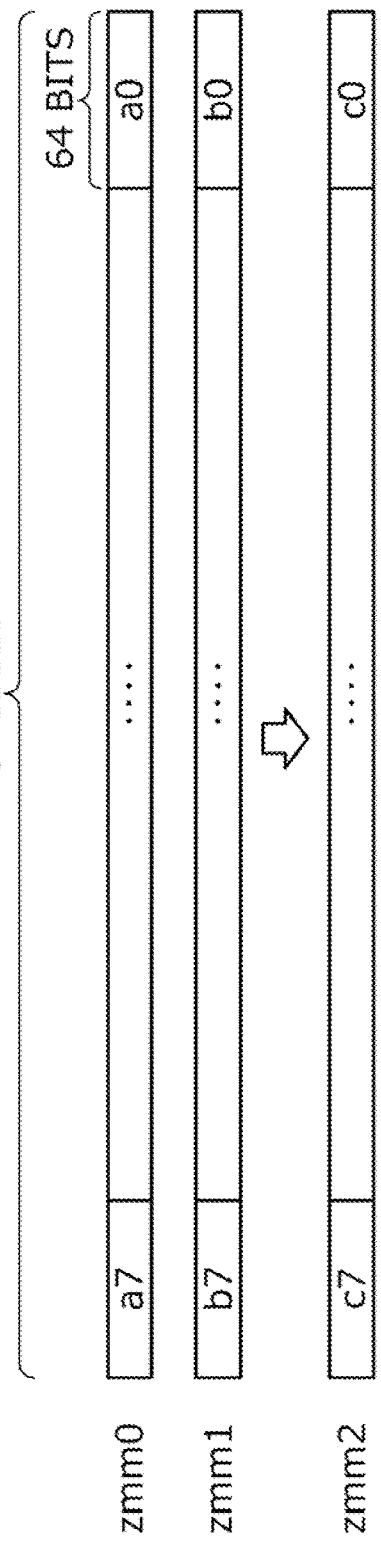

FIG. 8
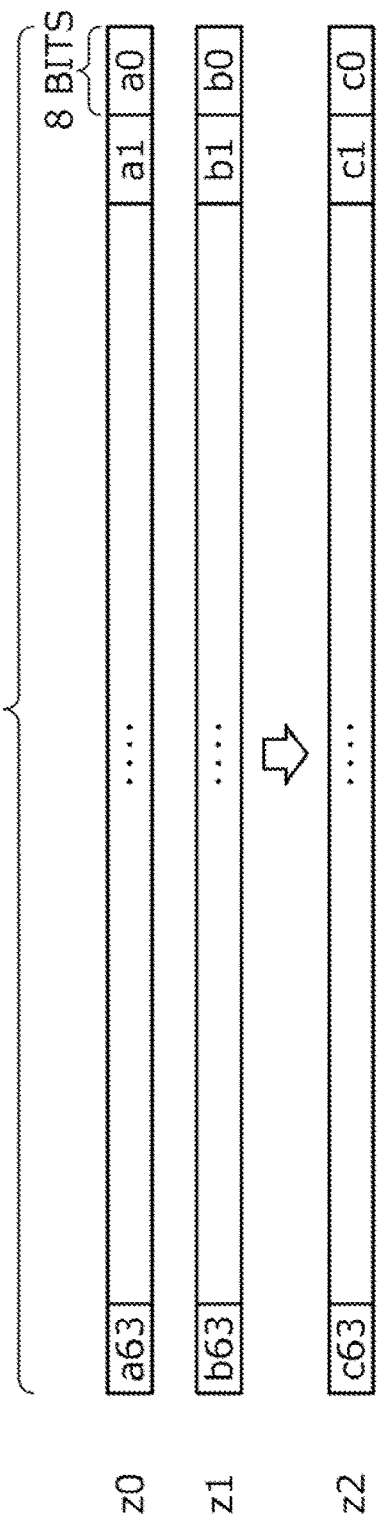
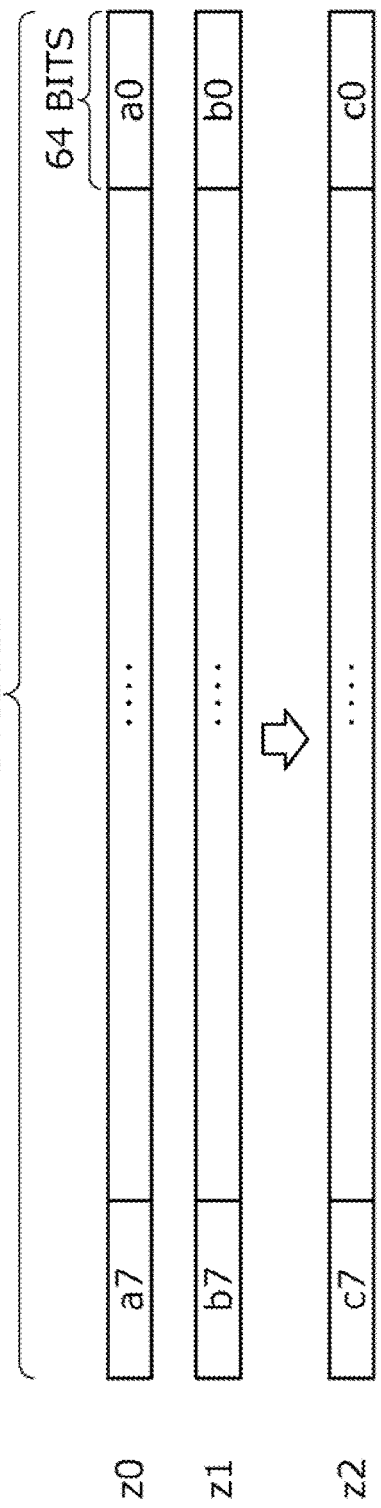

FIG. 14

| MEMORY | +0x00 | +0x01 | +0x02 | +0x03 | +0x04 | +0x05 | +0x06 | +0x07 |
|---|---|---|---|---|---|---|---|---|
| 0x00 | 8 BITS | | | | | | | |
| 0x08 | A | | | | | | | |
| 0x10 | B | C | | | D | E | F | G |
| 0x18 | H | I | J | K | L | M | N | O | kmovb k1, [0x09]
8 BITS ARE READ FROM STORAGE REGION DESIGNATED BY MEMORY ADDRESS AND SET IN 0 TO 7 BITS OF MASK REGISTER k1
0 IS SET IN 8 TO 63 BITS OF MASK REGISTER k1 k1 | A | REMAINING 56 BITS ARE all 0 | kmovw k1, [0x10]
16 BITS ARE READ FROM STORAGE REGION DESIGNATED BY MEMORY ADDRESS AND SET IN 0 TO 15 BITS OF MASK REGISTER k1
0 IS SET IN 16 TO 63 BITS OF MASK REGISTER k1 k1 | C | B | REMAINING 48 BITS ARE all 0 | kmovd k1, [0x14]
32 BITS ARE READ FROM STORAGE REGION DESIGNATED BY MEMORY ADDRESS AND SET IN 0 TO 31 BITS OF MASK REGISTER k1
0 IS SET IN 32 TO 63 BITS OF MASK REGISTER k1 k1 | G | F | E | D | REMAINING 32 BITS ARE all 0 | kmovq k1, [0x18]
64 BITS ARE READ FROM STORAGE REGION DESIGNATED BY MEMORY ADDRESS AND SET IN 0 TO 63 BITS OF MASK REGISTER k1 k1 | O | N | M | L | K | J | I | H |

| line NUMBER | ASSEMBLER SOURCE OF IA-64 TO BE CONVERTED |
|---|---|
| 10 | kmovq k0, [MEMORY ADDRESS] |
| 11 | vpaddb zmm2{k0}, zmm0, zmm1 |
| ... | ... |
| 120 | vpaddb zmm4{k0}, zmm3, zmm2 |
| 121 | kmovq k1, [MEMORY ADDRESS] |
| 122 | vpaddb zmm6{k1}, zmm5, zmm4 |
| ... | ... |
| 450 | vpaddb zmm9{k0}, zmm8, zmm7 |
| 451 | vpaddb zmm12{k1}, zmm11, zmm10 |
| ... | ... |

FIG. 17

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 10 | kmovq k0, [MEMORY ADDRESS] | ASSEMBLER SOURCE IS NOT OUTPUT | | line=10, ID=0, MASK BIT WIDTH=64, kind=LD, used[0]=1, Final_point[0]=10 |
| 11 | vpaddb zmm2{k0}, zmm0, zmm1 | ASSEMBLER SOURCE IS NOT OUTPUT | | line=11, ID=0, MASK BIT WIDTH=64, kind=SIMD |
| ... | ... | ... | ... | ... |
| 120 | vpaddb zmm4{k0}, zmm3, zmm2 | ASSEMBLER SOURCE IS NOT OUTPUT | | line=120, ID=0, MASK BIT WIDTH=64, kind=SIMD |
| 121 | kmovq k1, [MEMORY ADDRESS] | ASSEMBLER SOURCE IS NOT OUTPUT | | line=121, ID=1, MASK BIT WIDTH=64, kind=LD, used[1]=1, Final_point[1]=121 |
| 122 | vpaddb zmm6{k1}, zmm5, zmm4 | ASSEMBLER SOURCE IS NOT OUTPUT | | line=122, ID=1, MASK BIT WIDTH=64, kind=SIMD |
| ... | ... | ... | ... | ... |
| 450 | vpaddb zmm9{k0}, zmm8, zmm7 | ASSEMBLER SOURCE IS NOT OUTPUT | | line=450, ID=0, MASK BIT WIDTH=64, kind=SIMD |
| 451 | vpaddb zmm12{k1}, zmm11, zmm10 | ASSEMBLER SOURCE IS NOT OUTPUT | | line=451, ID=1, MASK BIT WIDTH=64, kind=SIMD |
| ... | ... | ... | ... | ... |

STATE AFTER END OF FIRST LOOP

400

| line | ID | state | kind |
|---|---|---|---|
| 10 | 0 | 64 | LD |
| 11 | 0 | 64 | SIMD |
| 120 | 0 | 64 | SIMD |
| 121 | 1 | 64 | LD |
| 122 | 1 | 64 | SIMD |
| 450 | 0 | 64 | SIMD |
| 451 | 1 | 64 | SIMD |

500

| ID | used[ID] | Reserve[ID] | Final_point[ID] | Reserved[ID] | State[ID] |
|---|---|---|---|---|---|
| 0 | 1 | | 10 | | |
| 1 | 1 | | 121 | | |
| 2 | 0 | | | -1 | |
| 3 | 0 | | | -1 | |

FIG. 19

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 10 | kmovq k0, [MEMORY ADDRESS] | ldr p0, [MEMORY ADDRESS] | 64 BITS ARE READ FROM [MEMORY ADDRESS] INTO MASK REGISTER #0 | SINCE line = 10 HAS kind = LD AND line = Final_point[0], LD COMMAND FOR READING 64 BITS FROM [MEMORY ADDRESS] IS GENERATED AND SET AS State[0] = 64 |
| 11 | vpaddb zmm2{k0}, zmm0, zmm1 | | line AS PROCESSING TARGET | |
| ... | | | | |
| 120 | vpaddb zmm4{k0}, zmm3, zmm2 | | | |
| 121 | kmovq k1, [MEMORY ADDRESS] | | | |
| 122 | vpaddb zmm6{k1}, zmm5, zmm4 | | | |
| ... | | | | |
| 450 | vpaddb zmm9{k0}, zmm8, zmm7 | | | |
| 451 | vpaddb zmm12{k1}, zmm11, zmm10 | | | |
| ... | | | | |

| line | ID | state | kind |
|------|----|----|------|
| 10 | 0 | 64 | LD |
| 11 | 0 | 64 | SIMD |
| 120 | 0 | 64 | SIMD |
| 121 | 1 | 64 | LD |
| 122 | 1 | 64 | SIMD |
| 450 | 0 | 64 | SIMD |
| 451 | 1 | 64 | SIMD |

STATE AT END OF LINE 10

500

| ID | used[ID] | Reserve[ID] | Final_point[ID] | Reserved[ID] | State[ID] |
|----|----------|-------------|-----------------|--------------|-----------|
| 0 | 1 | | 10 | | 64 |
| 1 | 1 | | 121 | | |
| 2 | 0 | | | -1 | |
| 3 | 0 | | | -1 | |

FIG. 21

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 10 | kmovq k0, [MEMORY ADDRESS] | ldr p0, [MEMORY ADDRESS] | 64 BITS ARE READ FROM [MEMORY ADDRESS] INTO MASK REGISTER #0 | SINCE line = 10 HAS kind = LD AND line = Final_point[0], LD COMMAND FOR READING 64 BITS FROM [MEMORY ADDRESS] IS GENERATED AND SET AS State[0] = 64 |
| 11 | vpaddb zmm2{k0}, zmm0, zmm1 | add z4.b, p0, z3.b, z2.b | PERFORM ADDITION OF 8-BIT × 64 PIECES BY USING MASK REGISTER #0 | SINCE line = 11 HAS line > Final_point[0], SIMD COMMAND OF ADDITION OF 8-BIT × 64 PIECES IS GENERATED |
| ... | | line AS PROCESSING TARGET | | |
| 120 | vpaddb zmm4{k0}, zmm3, zmm2 | | | |
| 121 | kmovq k1, [MEMORY ADDRESS] | | | |
| 122 | vpaddb zmm6{k1}, zmm5, zmm4 | | | |
| ... | | | | |
| 450 | vpaddb zmm9{k0}, zmm8, zmm7 | | | |
| 451 | vpaddb zmm12{k1}, zmm11, zmm10 | | | |
| ... | | | | |

STATE AT END OF LINE 11

500

| ID | used[ID] | Reserve[ID] | Final_point[ID] | Reserved[ID] | State[ID] |
|---|---|---|---|---|---|
| 0 | 1 | | 10 | | 64 |
| 1 | 1 | | 121 | | |
| 2 | 0 | | | -1 | |
| 3 | 0 | | | -1 | |

400

| line | ID | state | kind |
|---|---|---|---|
| 10 | 0 | 64 | LD |
| 11 | 0 | 64 | SIMD |
| 120 | 0 | 64 | SIMD |
| 121 | 1 | 64 | LD |
| 122 | 1 | 64 | SIMD |
| 450 | 0 | 64 | SIMD |
| 451 | 1 | 64 | SIMD |

FIG. 23

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 10 | kmovq k0, [MEMORY ADDRESS] | ldr p0, [MEMORY ADDRESS] | 64 BITS ARE READ FROM [MEMORY ADDRESS] INTO MASK REGISTER #0 | SINCE line = 10 HAS kind = LD AND line = Final_point[0], LD COMMAND FOR READING 64 BITS FROM [MEMORY ADDRESS] IS GENERATED AND SET AS State[0] = 64 |
| 11 | vpaddb zmm2{k0}, zmm0, zmm1 | add z4.b, p0, z3.b, z2.b | PERFORM ADDITION OF 8-BIT × 64 PIECES BY USING MASK REGISTER #0 | SINCE line = 11 HAS line > Final_point[0], SIMD COMMAND OF ADDITION OF 8-BIT × 64 PIECES IS GENERATED |
| ... | ... | ... | ... | ... |
| 120 | vpaddb zmm4{k0}, zmm3, zmm2 | add z2.b, p0, z0.b, z0.b | PERFORM ADDITION OF 8-BIT × 64 PIECES BY USING MASK REGISTER #0 | SINCE line = 120 HAS line > Final_point[0], SIMD COMMAND OF ADDITION OF 8-BIT × 64 PIECES IS GENERATED |
| 121 | kmovq k1, [MEMORY ADDRESS] | line AS PROCESSING TARGET | | |
| 122 | vpaddb zmm6{k1}, zmm5, zmm4 | | | |
| ... | ... | | | |
| 450 | vpaddb zmm9{k0}, zmm8, zmm7 | | | |
| 451 | vpaddb zmm12{k1}, zmm11, zmm10 | | | |
| ... | ... | | | |

STATE AT END OF LINE 120

500

| ID | used[ID] | Reserve[ID] | Final_point[ID] | Reserved[ID] | State[ID] |
|----|----------|-------------|-----------------|--------------|-----------|
| 0  | 1        |             | 10              |              | 64        |
| 1  | 1        |             | 121             |              |           |
| 2  | 0        |             |                 | -1           |           |
| 3  | 0        |             |                 | -1           |           |

400

| line | ID | state | kind |
|------|----|-------|------|
| 10   | 0  | 64    | LD   |
| 11   | 0  | 64    | SIMD |
| 120  | 0  | 64    | SIMD |
| 121  | 1  | 64    | LD   |
| 122  | 1  | 64    | SIMD |
| 450  | 0  | 64    | SIMD |
| 451  | 1  | 64    | SIMD |

FIG. 25

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 10 | kmovq k0, [MEMORY ADDRESS] | ldr p0, [MEMORY ADDRESS] | 64 BITS ARE READ FROM [MEMORY ADDRESS] INTO MASK REGISTER #0 | SINCE line = 10 HAS kind = LD AND line = Final_point[0], LD COMMAND FOR READING 64 BITS FROM [MEMORY ADDRESS] IS GENERATED AND SET AS State[0] = 64 |
| 11 | vpaddb zmm2{k0}, zmm0, zmm1 | add z4.b, p0, z3.b, z2.b | PERFORM ADDITION OF 8-BIT × 64 PIECES BY USING MASK REGISTER #0 | SINCE line = 11 HAS line > Final_point[0], SIMD COMMAND OF ADDITION OF 8-BIT × 64 PIECES IS GENERATED |
| ... | ... | ... | ... | ... |
| 120 | vpaddb zmm4{k0}, zmm3, zmm2 | add z2.b, p0, z0.b, z0.b | PERFORM ADDITION OF 8-BIT × 64 PIECES BY USING MASK REGISTER #0 | SINCE line = 120 HAS line > Final_point[0], SIMD COMMAND OF ADDITION OF 8-BIT × 64 PIECES IS GENERATED |
| 121 | kmovq k1, [MEMORY ADDRESS] | ldr p1, [MEMORY ADDRESS] | 64 BITS ARE READ FROM [MEMORY ADDRESS] INTO MASK REGISTER #1 | SINCE line = 121 HAS kind = LD AND line = Final_point[1], LD COMMAND FOR READING 64 BITS FROM [MEMORY ADDRESS] IS GENERATED AND SET AS State[1] = 64 |
| 122 | vpaddb zmm6{k1}, zmm5, zmm4 | line AS PROCESSING TARGET | | |
| ... | ... | | | |
| 450 | vpaddb zmm9{k0}, zmm8, zmm7 | | | |
| 451 | vpaddb zmm12{k1}, zmm11, zmm10 | | | |
| ... | ... | | | |

| line | ID | state | kind |
|---|---|---|---|
| 10 | 0 | 64 | LD |
| 11 | 0 | 64 | SIMD |
| 120 | 0 | 64 | SIMD |
| 121 | 1 | 64 | LD |
| 122 | 1 | 64 | SIMD |
| 450 | 0 | 64 | SIMD |
| 451 | 1 | 64 | SIMD |

STATE AT END OF LINE 121

500

| ID | used[ID] | Reserve[ID] | Final_point[ID] | Reserved[ID] | State[ID] |
|---|---|---|---|---|---|
| 0 | 1 | | 10 | | 64 |
| 1 | 1 | | 121 | | 64 |
| 2 | 0 | | | -1 | |
| 3 | 0 | | | -1 | |

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 10 | kmovq k0, [MEMORY ADDRESS] | ldr p0, [MEMORY ADDRESS] | 64 BITS ARE READ FROM [MEMORY ADDRESS] INTO MASK REGISTER #0 | SINCE line = 10 HAS kind = LD AND line = Final_point[0], LD COMMAND FOR READING 64 BITS FROM [MEMORY ADDRESS] IS GENERATED AND SET AS State[0] = 64 |
| 11 | vpaddb zmm2{k0}, zmm0, zmm1 | add z4.b, p0, z3.b, z2.b | PERFORM ADDITION OF 8-BIT × 64 PIECES BY USING MASK REGISTER #0 | SINCE line = 11 HAS line > Final_point[0], SIMD COMMAND OF ADDITION OF 8-BIT × 64 PIECES IS GENERATED |
| ... | ... | ... | ... | ... |
| 120 | vpaddb zmm4{k0}, zmm3, zmm2 | add z2.b, p0, z0.b, z0.b | PERFORM ADDITION OF 8-BIT × 64 PIECES BY USING MASK REGISTER #0 | SINCE line = 120 HAS line > Final_point[0], SIMD COMMAND OF ADDITION OF 8-BIT × 64 PIECES IS GENERATED |
| 121 | kmovq k1, [MEMORY ADDRESS] | ldr p1, [MEMORY ADDRESS] | 64 BITS ARE READ FROM [MEMORY ADDRESS] INTO MASK REGISTER #1 | SINCE line = 121 HAS kind = LD AND line = Final_point[1], LD COMMAND FOR READING 64 BITS FROM [MEMORY ADDRESS] IS GENERATED AND SET AS State[1] = 64 |
| 122 | vpaddb zmm6{k1}, zmm5, zmm4 | add z6.b, p0, z5.b, z4.b | PERFORM ADDITION OF 8-BIT × 64 PIECES BY USING MASK REGISTER #0 | SINCE line = 122 HAS line > Final_point[1], SIMD COMMAND OF ADDITION OF 8-BIT × 64 PIECES IS GENERATED |
| ... | ... | line AS PROCESSING TARGET | | |
| 450 | vpaddb zmm9{k0}, zmm8, zmm7 | | | |
| 451 | vpaddb zmm12{k1}, zmm11, zmm10 | | | |
| ... | ... | | | |

FIG. 28

STATE AT END OF LINE 122

500

| ID | used[ID] | Reserve[ID] | Final_point[ID] | Reserved[ID] | State[ID] |
|---|---|---|---|---|---|
| 0 | 1 | | 10 | | 64 |
| 1 | 1 | | 121 | | 64 |
| 2 | 0 | | | -1 | |
| 3 | 0 | | | -1 | |

400

| line | ID | state | kind |
|---|---|---|---|
| 10 | 0 | 64 | LD |
| 11 | 0 | 64 | SIMD |
| 120 | 0 | 64 | SIMD |
| 121 | 1 | 64 | LD |
| 122 | 1 | 64 | SIMD |
| 450 | 0 | 64 | SIMD |
| 451 | 1 | 64 | SIMD |

FIG. 29

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 10 | kmovq k0, [MEMORY ADDRESS] | ldr p0, [MEMORY ADDRESS] | 64 BITS ARE READ FROM [MEMORY ADDRESS] INTO MASK REGISTER #0 | SINCE line = 10 HAS kind = LD AND line = Final_point[0], LD COMMAND FOR READING 64 BITS FROM [MEMORY ADDRESS] IS GENERATED AND SET AS State[0] = 64 |
| 11 | vpaddb zmm2{k0}, zmm0, zmm1 | add z4.b, p0, z3.b, z2.b | PERFORM ADDITION OF 8-BIT × 64 PIECES BY USING MASK REGISTER #0 | SINCE line = 11 HAS line > Final_point[0], SIMD COMMAND OF ADDITION OF 8-BIT × 64 PIECES IS GENERATED |
| ... | ... | ... | ... | ... |
| 120 | vpaddb zmm4{k0}, zmm3, zmm2 | add z2.b, p0, z0.b, z0.b | PERFORM ADDITION OF 8-BIT × 64 PIECES BY USING MASK REGISTER #0 | SINCE line = 120 HAS line > Final_point[0], SIMD COMMAND OF ADDITION OF 8-BIT × 64 PIECES IS GENERATED |
| 121 | kmovq k1, [MEMORY ADDRESS] | ldr p1, [MEMORY ADDRESS] | 64 BITS ARE READ FROM [MEMORY ADDRESS] INTO MASK REGISTER #1 | SINCE line = 121 HAS kind = LD AND line = Final_point[1], LD COMMAND FOR READING 64 BITS FROM [MEMORY ADDRESS] IS GENERATED AND SET AS State[1] = 64 |
| 122 | vpaddb zmm6{k1}, zmm5, zmm4 | add z6.b, p1, z5.b, z4.b | PERFORM ADDITION OF 8-BIT × 64 PIECES BY USING MASK REGISTER #0 | SINCE line = 122 HAS line > Final_point[1], SIMD COMMAND OF ADDITION OF 8-BIT × 64 PIECES IS GENERATED |
| ... | ... | ... | ... | ... |
| 450 | vpaddb zmm9{k0}, zmm8, zmm7 | add z9.b, p0, z8.b, z7.b | PERFORM ADDITION OF 8-BIT × 64 PIECES BY USING MASK REGISTER #0 | SINCE line = 450 HAS line > Final_point[0], SIMD COMMAND OF ADDITION OF 8-BIT × 64 PIECES IS GENERATED |
| 451 | vpaddb zmm12{k1}, zmm11, zmm10 | | line AS PROCESSING TARGET | |
| ... | ... | | | |

| line | ID | state | kind |
|------|----|----|------|
| 10 | 0 | 64 | LD |
| 11 | 0 | 64 | SIMD |
| 120 | 0 | 64 | SIMD |
| 121 | 1 | 64 | LD |
| 122 | 1 | 64 | SIMD |
| 450 | 0 | 64 | SIMD |
| 451 | 1 | 64 | SIMD |

STATE AT END OF LINE 450

500

| ID | used[ID] | Reserve[ID] | Final_point[ID] | Reserved[ID] | State[ID] |
|----|----------|-------------|-----------------|--------------|-----------|
| 0 | 1 | | 10 | | 64 |
| 1 | 1 | | 121 | | 64 |
| 2 | 0 | | | -1 | |
| 3 | 0 | | | -1 | |

FIG. 31

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 10 | kmovq k0, [MEMORY ADDRESS] | ldr p0, [MEMORY ADDRESS] | 64 BITS ARE READ FROM [MEMORY ADDRESS] INTO MASK REGISTER #0 | SINCE line = 10 HAS kind = LD AND line = Final_point[0], LD COMMAND FOR READING 64 BITS FROM [MEMORY ADDRESS] IS GENERATED AND SET AS State[0] = 64 |
| 11 | vpaddb zmm2{k0}, zmm0, zmm1 | add z4.b, p0, z3.b, z2.b | PERFORM ADDITION OF 8-BIT × 64 PIECES BY USING MASK REGISTER #0 | SINCE line = 11 HAS line > Final_point[0], SIMD COMMAND OF ADDITION OF 8-BIT × 64 PIECES IS GENERATED |
| ... | ... | ... | ... | ... |
| 120 | vpaddb zmm4{k0}, zmm3, zmm2 | add z2.b, p0, z0.b, z0.b | PERFORM ADDITION OF 8-BIT × 64 PIECES BY USING MASK REGISTER #0 | SINCE line = 120 HAS line > Final_point[0], SIMD COMMAND OF ADDITION OF 8-BIT × 64 PIECES IS GENERATED |
| 121 | kmovq k1, [MEMORY ADDRESS] | ldr p1, [MEMORY ADDRESS] | 64 BITS ARE READ FROM [MEMORY ADDRESS] INTO MASK REGISTER #1 | SINCE line = 121 HAS kind = LD AND line = Final_point[1], LD COMMAND FOR READING 64 BITS FROM [MEMORY ADDRESS] IS GENERATED AND SET AS State[1] = 64 |
| 122 | vpaddb zmm6{k1}, zmm5, zmm4 | add z6.b, p0, z5.b, z4.b | PERFORM ADDITION OF 8-BIT × 64 PIECES BY USING MASK REGISTER #0 | SINCE line = 122 HAS line > Final_point[1], SIMD COMMAND OF ADDITION OF 8-BIT × 64 PIECES IS GENERATED |
| ... | ... | ... | ... | ... |
| 450 | vpaddb zmm9{k0}, zmm8, zmm7 | add z9.b, p0, z8.b, line AS PROCESSING TARGET } #0 | PERFORM ADDITION OF 8-BIT × 64 PIECES BY | SINCE line = 450 HAS line > Final_point[0], SIMD COMMAND OF ADDITION OF 8-BIT × 64 PIECES IS GENERATED |
| 451 | vpaddb zmm12{k1}, zmm11, zmm10 | add z12.b, p1, z11.b, z10.b | PERFORM ADDITION OF 8-BIT × 64 PIECES BY USING MASK REGISTER #1 | SINCE line = 451 HAS line > Final_point[1], SIMD COMMAND OF ADDITION OF 8-BIT × 64 PIECES IS GENERATED |
| ... | ... | ... | ... | ... |

| line | ID | state | kind |
|---|---|---|---|
| 10 | 0 | 64 | LD |
| 11 | 0 | 64 | SIMD |
| 120 | 0 | 64 | SIMD |
| 121 | 1 | 64 | LD |
| 122 | 1 | 64 | SIMD |
| 450 | 0 | 64 | SIMD |
| 451 | 1 | 64 | SIMD |

STATE AT END OF LINE 451

500

| ID | used[ID] | Reserve[ID] | Final_point[ID] | Reserved[ID] | State[ID] |
|---|---|---|---|---|---|
| 0 | 1 |  | 10 |  | 64 |
| 1 | 1 |  | 121 |  | 64 |
| 2 | 0 |  |  | -1 |  |
| 3 | 0 |  |  | -1 |  |

FIG. 34

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS 3400 |
|---|---|---|---|---|
| 10 | kmovq k0, [MEMORY ADDRESS] | ASSEMBLER SOURCE IS NOT OUTPUT | | line=10, ID=0, MASK BIT WIDTH=64, kind=LD, used[0]=1, Final_point[0]=10 |
| 11 | vpaddd zmm2{k0}, zmm0, zmm1 | ASSEMBLER SOURCE IS NOT OUTPUT | | line=11, ID=0, MASK BIT WIDTH=16, kind=SIMD, Final_point[0]=11 |
| ... | ... | ... | ... | ... |
| 120 | vpaddb zmm4{k0}, zmm3, zmm2 | ASSEMBLER SOURCE IS NOT OUTPUT | | line=120, ID=0, MASK BIT WIDTH=64, kind=SIMD, Final_point[0]=120 |
| 121 | kmovq k1, [MEMORY ADDRESS] | ASSEMBLER SOURCE IS NOT OUTPUT | | line=121, ID=1, MASK BIT WIDTH=64, kind=LD, used[1]=1, Final_point[1]=121 |
| 122 | vpaddb zmm6{k1}, zmm5, zmm4 | ASSEMBLER SOURCE IS NOT OUTPUT | | line=122, ID=1, MASK BIT WIDTH=16, kind=SIMD, Final_point[1]=122 |
| ... | ... | ... | ... | ... |
| 450 | vpaddb zmm9{k0}, zmm8, zmm7 | ASSEMBLER SOURCE IS NOT OUTPUT | | line=450, ID=0, MASK BIT WIDTH=64, kind=SIMD |
| 451 | vpaddb zmm12{k1}, zmm11, zmm10 | ASSEMBLER SOURCE IS NOT OUTPUT | | line=451, ID=1, MASK BIT WIDTH=64, kind=SIMD, Final_point[1]=451 |
| ... | ... | ... | ... | ... |

| line | ID | state | kind |
|---|---|---|---|
| 10 | 0 | 64 | LD |
| 11 | 0 | 16 | SIMD |
| 120 | 0 | 64 | SIMD |
| 121 | 1 | 64 | LD |
| 122 | 1 | 16 | SIMD |
| 450 | 0 | 64 | SIMD |
| 451 | 1 | 64 | SIMD |

STATE AFTER END OF FIRST LOOP

500

| ID | used[ID] | Reserve[ID] | Final_point[ID] | Reserved[ID] | State[ID] |
|---|---|---|---|---|---|
| 0 | 1 | | 120 | | |
| 1 | 1 | | 451 | | |
| 2 | 0 | | | -1 | |
| 3 | 0 | | | -1 | |

FIG. 36

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 10 | kmovq k0, [MEMORY ADDRESS] | ldr p0, [MEMORY ADDRESS] movs p2.b, p0.b | 64 BITS ARE READ FROM [MEMORY ADDRESS] INTO MASK REGISTER #0, AND VALUE OF MASK REGISTER #0 IS COPIED TO MASK REGISTER #2 | SINCE line = 10 HAS kind = LD, LD COMMAND FOR READING 64 BITS FROM [MEMORY ADDRESS] IS GENERATED, AND WITH line != Final_point[0], MASK REGISTER #2, WHICH IS ONE MASK REGISTER HAVING used != 1 AND Reserved[ID] = -1, IS SET AS RESERVE REGISTER (Reserved[0] = 2, Reserved[2] = 1), SAVING COMMAND FOR COPYING VALUE OF MASK REGISTER #0 TO MASK REGISTER #2 IS GENERATED, VALUE IS SET TO BE RESTORABLE, AND State[0] = 64 IS SET |
| 11 | vpaddd zmm2{k0}, zmm0, zmm1 | | line AS PROCESSING TARGET | |
| ... | ... | | | |
| 120 | vpaddb zmm4{k0}, zmm3, zmm2 | | | |

FIG. 37

STATE AT END OF LINE 10

400

| line | ID | state | kind |
|---|---|---|---|
| 10 | 0 | 64 | LD |
| 11 | 0 | 16 | SIMD |
| 120 | 0 | 64 | SIMD |
| 121 | 1 | 64 | LD |
| 122 | 1 | 16 | SIMD |
| 450 | 0 | 64 | SIMD |
| 451 | 1 | 64 | SIMD |

500

| ID | used[ID] | Reserve[ID] | Final_point[ID] | Reserved[ID] | State[ID] |
|---|---|---|---|---|---|
| 0 | 1 | 2 | 120 | | 64 |
| 1 | 1 | | 451 | | |
| 2 | 0 | | | 1 | |
| 3 | 0 | | | -1 | |

FIG. 38

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 10 | kmovq k0, [MEMORY ADDRESS] | ldr p0, [MEMORY ADDRESS] movs p2.b, p0.b | 64 BITS ARE READ FROM [MEMORY ADDRESS] INTO MASK REGISTER #0, AND VALUE OF MASK REGISTER #0 IS COPIED TO MASK REGISTER #2 | SINCE line = 10 HAS kind = LD, LD COMMAND FOR READING 64 BITS FROM [MEMORY ADDRESS] IS GENERATED, AND WITH line != Final_point[0], MASK REGISTER #2, WHICH IS ONE MASK REGISTER HAVING used i = 1 AND Reserved[ID] = -1, IS SET AS RESERVE REGISTER (Reserve[0] = 2, Reserved[2] = 1), SAVING COMMAND FOR COPYING VALUE OF MASK REGISTER #0 TO MASK REGISTER #2 IS GENERATED, VALUE IS SET TO BE RESTORABLE, AND State[0] = 64 IS SET |
| 11 | vpaddd zmm2{k0}, zmm0, zmm1 | CHANGE MASK BIT WIDTH pfalse p3.b zip1 p0.b, p0.b, p3.b zip1 p0.h, p0.h, p3.h add z4.s, p0, z3.s, z2.s | MASK BIT WIDTH OF MASK REGISTER #0 IS CHANGED FROM 64 TO 32, AND SAVED IN MASK REGISTER #0. PERFORM ADDITION OF 32-BIT × 16 PIECES BY USING MASK REGISTER #0 | SINCE line = 11 HAS kind = SIMD, ID = 0, state != State[0], AND line != Final_point[0], CHANGE COMMAND FOR CHANGING MASK BIT WIDTH OF MASK REGISTER TO REQUESTED MASK BIT WIDTH IS GENERATED, AND SIMD COMMAND OF ADDITION OF 32-BIT × 16 PIECES IS GENERATED. SET State[0] = state = 16 |
| ... | | line AS PROCESSING TARGET | | |
| 120 | vpaddb zmm4{k0}, zmm3, zmm2 | | | |

FIG. 39

STATE AT END OF LINE 11

500

| ID | used[ID] | Reserve[ID] | Final_point[ID] | Reserved[ID] | State[ID] |
|---|---|---|---|---|---|
| 0 | 1 | 2 | 120 | | 16 |
| 1 | 1 | | 451 | | |
| 2 | 0 | | | 1 | |
| 3 | 0 | | | -1 | |

400

| line | ID | state | kind |
|---|---|---|---|
| 10 | 0 | 64 | LD |
| 11 | 0 | 16 | SIMD |
| 120 | 0 | 64 | SIMD |
| 121 | 1 | 64 | LD |
| 122 | 1 | 16 | SIMD |
| 450 | 0 | 64 | SIMD |
| 451 | 1 | 64 | SIMD |

FIG. 40

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 10 | kmovq k0, [MEMORY ADDRESS] | ldr p0, [MEMORY ADDRESS] movs p2.b, p0.b | 64 BITS ARE READ FROM [MEMORY ADDRESS] INTO MASK REGISTER #0, AND VALUE OF MASK REGISTER #0 IS COPIED TO MASK REGISTER #2 | SINCE line = 10 HAS kind = LD, LD COMMAND FOR READING 64 BITS FROM [MEMORY ADDRESS] IS GENERATED, AND WITH line != Final_point[0], MASK REGISTER #2, WHICH IS ONE MASK REGISTER HAVING used != 1 AND Reserved[ID] = -1, IS SET AS RESERVE REGISTER (Reserved[2] = 1), SAVING COMMAND FOR COPYING VALUE OF MASK REGISTER #0 TO MASK REGISTER #2 IS GENERATED, VALUE IS SET TO BE RESTORABLE, AND State[0] = 64 IS SET |
| 11 | vpaddd zmm2{k0}, zmm0, zmm1 | pfalse p3.b zip1 p0.b, p0.b, p3.b zip1 p0.h, p0.h, p3.h add z4.s, p0, z3.s, z2.s | MASK BIT WIDTH OF MASK REGISTER #0 IS CHANGED FROM 64 TO 32, AND SAVED IN MASK REGISTER #0. PERFORM ADDITION OF 32-BIT × 16 PIECES BY USING MASK REGISTER #0 | SINCE line = 11 HAS kind = SIMD, ID = 0, state != State[0], AND line != Final_point[0], COMMAND FOR CHANGING MASK BIT WIDTH OF MASK REGISTER TO REQUESTED MASK BIT WIDTH IS GENERATED, AND SIMD COMMAND OF ADDITION OF 32-BIT × 16 PIECES IS GENERATED. SET State[0] = state = 16 |
| ... | ... | ... line AS PROCESSING TARGET | ... | ... |
| 120 | vpaddb zmm4{k0}, zmm3, zmm2 | CHANGE MASK BIT WIDTH movs p0.b, p2.b add z2.b, p0, z0.b, z0.b | MASK BIT WIDTH OF MASK REGISTER #0 IS CHANGED FROM 32 TO 64, AND SAVED IN MASK REGISTER #0. PERFORM ADDITION OF 8-BIT × 64 PIECES BY USING MASK REGISTER #0 | SINCE line = 120 HAS kind = SIMD, ID = 0, line <= Final_point[0], state != State[0], AND State[0] != 64, VALUE OF MASK REGISTER IS RESTORED. WITH state = 64, SIMD COMMAND OF ADDITION OF 8-BIT × 64 PIECES IS GENERATED. CHANGE TO State[0] = 64, WITH line = Final_point[0], CHANGE TO Reserved[Reserved[0]] = -1, AND DELETE 2 FROM Reserved[0] |

Table 400:

| line | ID | state | kind |
|------|----|----|------|
| 10 | 0 | 64 | LD |
| 11 | 0 | 16 | SIMD |
| 120 | 0 | 64 | SIMD |
| 121 | 1 | 64 | LD |
| 122 | 1 | 16 | SIMD |
| 450 | 0 | 64 | SIMD |
| 451 | 1 | 64 | SIMD |

STATE AT END OF LINE 120

Table 500:

| ID | used[ID] | Reserve[ID] | Final_point[ID] | Reserved[ID] | State[ID] |
|----|----------|-------------|-----------------|--------------|-----------|
| 0 | 1 | | 120 | | 64 |
| 1 | 1 | | 451 | | |
| 2 | 0 | | | -1 | |
| 3 | 0 | | | -1 | |

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 121 | kmovq k1, [MEMORY ADDRESS] | ldr p1, [MEMORY ADDRESS] movs p2.b, p0.b | 64 BITS ARE READ FROM [MEMORY ADDRESS] INTO MASK REGISTER #1, AND VALUE OF MASK REGISTER #1 IS COPIED TO MASK REGISTER #2 | SINCE line = 121 HAS kind = LD, LD COMMAND FOR READING 64 BITS FROM [MEMORY ADDRESS] IS GENERATED, AND WITH line != Final_point[1], MASK REGISTER #2, WHICH IS ONE MASK REGISTER HAVING used != 1 AND Reserved[ID] = -1, IS SET AS RESERVE REGISTER (Reserve[1] = 2, Reserved[2] = 1), SAVING COMMAND FOR COPYING VALUE OF MASK REGISTER #1 TO MASK REGISTER #2 IS GENERATED, VALUE IS SET TO BE RESTORABLE, AND State [1] = 64 IS SET |
| 122 | vpaddd zmm6{k1}, zmm5, zmm4 | | line AS PROCESSING TARGET | |
| ... | ... | | | |
| 450 | vpaddb zmm9{k0}, zmm8, zmm7 | | | |
| 451 | vpaddb zmm12{k1}, zmm11, zmm10 | | | |
| ... | ... | | | |

| line | ID | state | kind |
|---|---|---|---|
| 10 | 0 | 64 | LD |
| 11 | 0 | 16 | SIMD |
| 120 | 0 | 64 | SIMD |
| 121 | 1 | 64 | LD |
| 122 | 1 | 16 | SIMD |
| 450 | 0 | 64 | SIMD |
| 451 | 1 | 64 | SIMD |

STATE AT END OF LINE 121

500

| ID | used[ID] | Reserve[ID] | Final_point[ID] | Reserved[ID] | State[ID] |
|---|---|---|---|---|---|
| 0 | 1 |  | 120 |  | 64 |
| 1 | 1 | 2 | 451 |  | 64 |
| 2 | 0 |  |  | 1 |  |
| 3 | 0 |  |  | -1 |  |

FIG. 44

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 121 | kmovq k1, [MEMORY ADDRESS] | ldr p1, [MEMORY ADDRESS] movs p2.b, p0.b | 64 BITS ARE READ FROM [MEMORY ADDRESS] INTO MASK REGISTER #1, AND VALUE OF MASK REGISTER #1 IS COPIED TO MASK REGISTER #2 | SINCE line = 121 HAS kind = LD, LD COMMAND FOR READING 64 BITS FROM [MEMORY ADDRESS] IS GENERATED, AND WITH line != Final_point[1], MASK REGISTER #2, WHICH IS ONE MASK REGISTER HAVING used != 1 AND Reserved[ID] = -1, IS SET AS RESERVE REGISTER (Reserve[1] = 2, Reserved[2] = 1). SAVING COMMAND FOR COPYING VALUE OF MASK REGISTER #1 TO MASK REGISTER #2 IS GENERATED, VALUE IS SET TO BE RESTORABLE, AND State [1] = 64 IS SET |
| | | ----- CHANGE MASK BIT WIDTH ----- | | |
| 122 | vpaddd zmm6{k1}, zmm5, zmm4 | pfalse p3.b zip1 p1.b, p1.b, p3.b zip1 p1.h, p1.h, p3.h add z6.s, p0, z5.s, z4.s | MASK BIT WIDTH OF MASK REGISTER #1 IS CHANGED FROM 64 TO 32, AND SAVED IN MASK REGISTER #1. PERFORM ADDITION OF 32-BIT × 16 PIECES BY USING MASK REGISTER #0 | SINCE line = 122 HAS ID = 1, line <= Final_point[1], AND state != State[1], CHANGE COMMAND FOR CHANGING MASK BIT WIDTH OF MASK REGISTER TO REQUESTED MASK BIT WIDTH IS GENERATED, AND SIMD COMMAND OF ADDITION OF 32-BIT × 16 PIECES IS GENERATED. SET State[1] = state = 16 |
| ... | | ----- line AS PROCESSING TARGET ----- | | |
| 450 | vpaddb zmm9{k0}, zmm8, zmm7 | | | |
| 451 | vpaddb zmm12{k1}, zmm11, zmm10 | | | |
| ... | | | | |

| line | ID | state | kind |
|---|---|---|---|
| 10 | 0 | 64 | LD |
| 11 | 0 | 16 | SIMD |
| 120 | 0 | 64 | SIMD |
| 121 | 1 | 64 | LD |
| 122 | 1 | 16 | SIMD |
| 450 | 0 | 64 | SIMD |
| 451 | 1 | 64 | SIMD |

STATE AT END OF LINE 122

500

| ID | used[ID] | Reserve[ID] | Final_point[ID] | Reserved[ID] | State[ID] |
|---|---|---|---|---|---|
| 0 | 1 |  | 120 |  | 64 |
| 1 | 1 | 2 | 451 | 1 | 16 |
| 2 | 0 |  |  |  |  |
| 3 | 0 |  |  | -1 |  |

FIG. 46

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 121 | kmovq k1, [MEMORY ADDRESS] | ldr p1, [MEMORY ADDRESS] movs p2.b, p1.b | 64 BITS ARE READ FROM [MEMORY ADDRESS] INTO MASK REGISTER #1, AND VALUE OF MASK REGISTER #1 IS COPIED TO MASK REGISTER #2 | SINCE line = 121 HAS kind = LD, LD COMMAND FOR READING 64 BITS FROM [MEMORY ADDRESS] IS GENERATED, AND WITH line != Final_point[1], MASK REGISTER #2, WHICH IS ONE MASK REGISTER HAVING used != 1 AND Reserved[ID] = -1, IS SET AS RESERVE REGISTER (Reserve[1] = 2, Reserved[2] = 1), SAVING COMMAND FOR COPYING VALUE OF MASK REGISTER #1 TO MASK REGISTER #2 IS GENERATED, VALUE IS SET TO BE RESTORABLE, AND State [1] = 64 IS SET |
| 122 | vpaddd zmm6{k1}, zmm5, zmm4 | pfalse p3.b zip1 p1.b, p1.b, p3.b zip1 p1.h, p1.h, p3.h add z6.s, p0, z5.s, z4.s | MASK BIT WIDTH OF MASK REGISTER #1 IS CHANGED FROM 64 TO 32, AND SAVED IN MASK REGISTER #1. PERFORM ADDITION OF 32-BIT × 16 PIECES BY USING MASK REGISTER #0 | SINCE line = 122 HAS ID = 1, line <= Final_point[1], AND state != State[1], CHANGE COMMAND FOR CHANGING MASK BIT WIDTH OF MASK REGISTER TO REQUESTED MASK BIT WIDTH IS GENERATED, AND SIMD COMMAND OF ADDITION OF 32-BIT × 16 PIECES IS GENERATED. SET State[1] = state = 16 |
| ... | ... | ... | ... | ... |
| 450 | vpaddb zmm9{k0}, zmm8, zmm7 | add z9.b, p0, z8.b, z7.b | PERFORM ADDITION OF 8-BIT × 64 PIECES BY USING MASK REGISTER #0 | SINCE line = 450 HAS kind = SIMD, ID = 0, AND line > Final_point[0], SIMD COMMAND OF ADDITION OF 32-BIT × 16 PIECES IS GENERATED WITHOUT CHANGING MASK BIT WIDTH OF MASK REGISTER. |
| 451 | vpaddb zmm12{k1}, zmm11, zmm10 | | line AS PROCESSING TARGET | |
| ... | ... | | ... | ... |

FIG. 47

STATE AT END OF LINE 450

400

| line | ID | state | kind |
|---|---|---|---|
| 10 | 0 | 64 | LD |
| 11 | 0 | 16 | SIMD |
| 120 | 0 | 64 | SIMD |
| 121 | 1 | 64 | LD |
| 122 | 1 | 16 | SIMD |
| 450 | 0 | 64 | SIMD |
| 451 | 1 | 64 | SIMD |

500

| ID | used[ID] | Reserve[ID] | Final_point[ID] | Reserved[ID] | State[ID] |
|---|---|---|---|---|---|
| 0 | 1 | | | | 64 |
| 1 | 1 | 2 | 120 | | 16 |
| 2 | 0 | | 451 | 1 | |
| 3 | 0 | | | -1 | |

FIG. 48

| line | ASSEMBLER SOURCE OF IA-64 TO BE CONVERTED | ASSEMBLER SOURCE OF Armv8-A AFTER CONVERSION | PROCESS CONTENT OF ASSEMBLER SOURCE OF Armv8-A | OPERATION OF COMMAND CONVERSION APPARATUS |
|---|---|---|---|---|
| 121 | kmovq k1, [MEMORY ADDRESS] | ldr p1, [MEMORY ADDRESS] movs p2.b, p0.b | 64 BITS ARE READ FROM [MEMORY ADDRESS] INTO MASK REGISTER #1, AND VALUE OF MASK REGISTER #1 IS COPIED TO MASK REGISTER #2 | SINCE line = 121 HAS kind = LD, LD COMMAND FOR READING 64 BITS FROM [MEMORY ADDRESS] IS GENERATED, AND WITH line != Final_point[1], MASK REGISTER #2, WHICH IS ONE MASK REGISTER HAVING used != 1 AND Reserved[ID] = -1, IS SET AS RESERVE REGISTER (Reserve[1] = 2, Reserved[2] = 1), SAVING COMMAND FOR COPYING VALUE OF MASK REGISTER #1 TO MASK REGISTER #2 IS GENERATED, VALUE IS SET TO BE RESTORABLE, AND State [1] = 64 IS SET |
| 122 | vpaddd zmm6{k1}, zmm5, zmm4 | pfalse p3.b zip1 p1.b, p1.b, p3.b zip1 p1.h, p1.h, p3.h add z6.s, p0, z5.s, z4.s | MASK BIT WIDTH OF MASK REGISTER #1 IS CHANGED FROM 64 TO 32, AND SAVED IN MASK REGISTER #1.PERFORM ADDITION OF 32-BIT × 16 PIECES BY USING MASK REGISTER #0 | SINCE line = 122 HAS ID = 1, line <= Final_point[1], AND state != State[1], CHANGE COMMAND FOR CHANGING MASK BIT WIDTH OF MASK REGISTER TO REQUESTED MASK BIT WIDTH IS GENERATED, AND SIMD COMMAND OF ADDITION OF 32-BIT × 16 PIECES IS GENERATED. SET State[1] = state = 16 |
| ... | ... | ... | ... | ... |
| 450 | vpaddq zmm9{k0}, zmm8, zmm7 | add z9.b, p0, z8.b, z7.b | PERFORM ADDITION OF 8-BIT × 64 PIECES BY USING line AS PROCESSING TARGET | SINCE line = 450 HAS kind = SIMD, ID = 0, AND line > Final_point[0], SIMD COMMAND OF ADDITION OF 32-BIT × 16 PIECES IS GENERATED WITHOUT CHANGING MASK BIT WIDTH OF MASK REGISTER. |
| 451 | vpaddb zmm12{k1}, zmm11, zmm10 | CHANGE MASK BIT WIDTH MASK REGISTER #1 movs p1.b, p2.b add z12.b, p1, z11.b, z10.b | MASK BIT WIDTH OF MASK REGISTER #1 IS CHANGED FROM 32 TO 64, AND SAVED IN MASK REGISTER #1.PERFORM ADDITION OF 8-BIT × 64 PIECES BY USING MASK REGISTER #1 | SINCE line = 451 HAS kind = SIMD, ID = 1, line <= Final_point[1], AND state != State[1], CHANGE COMMAND OF CHANGING MASK BIT WIDTH OF MASK REGISTER TO REQUESTED MASK BIT WIDTH IS GENERATED, AND SIMD COMMAND OF ADDITION OF 8-BIT × 64 PIECES IS GENERATED.CHANGE TO State[0] = 64, WITH line = Final_point[0], CHANGE TO Reserved[Reserved[1]] = -1, AND DELETE 2 FROM Reserved[1] |
| ... | ... | ... | ... | ... |

FIG. 49

STATE AT END OF LINE 451

400

| line | ID | state | kind |
|------|----|----|------|
| 10 | 0 | 64 | LD |
| 11 | 0 | 16 | SIMD |
| 120 | 0 | 64 | SIMD |
| 121 | 1 | 64 | LD |
| 122 | 1 | 16 | SIMD |
| 450 | 0 | 64 | SIMD |
| 451 | 1 | 64 | SIMD |

500

| ID | used[ID] | Reserve[ID] | Final_point[ID] | Reserved[ID] | State[ID] |
|----|----------|-------------|-----------------|--------------|-----------|
| 0 | 1 | | 120 | | 64 |
| 1 | 1 | | 451 | -1 | 64 |
| 2 | 0 | | | | |
| 3 | 0 | | | -1 | |

COMPUTER-READABLE RECORDING MEDIUM STORING PROGRAM FOR CONVERTING FIRST SINGLE INSTRUCTION MULTIPLE DATA (SIMD) COMMAND USING FIRST MASK REGISTER INTO SECOND SIMD COMMAND USING SECOND MASK REGISTER, COMMAND CONVERSION METHOD FOR CONVERTING FIRST SIMD COMMAND USING FIRST MASK REGISTER INTO SECOND SIMD COMMAND USING SECOND MASK REGISTER, AND COMMAND CONVERSION APPARATUS FOR CONVERTING FIRST SIMD COMMAND USING FIRST MASK REGISTER INTO SECOND SIMD COMMAND USING SECOND MASK REGISTER

CROSS-REFERENCE TO RELATED APPLICATION

This application is based upon and claims the benefit of priority of the prior Japanese Patent Application No. 2021-135232, filed on Aug. 20, 2021, the entire contents of which are incorporated herein by reference.

FIELD

The embodiments discussed herein are related to non-transitory computer-readable recording medium storing a command conversion program, a command conversion method, and a command conversion apparatus.

BACKGROUND

In the related art, there is a technology of generating an execution file in an execution format corresponding to a certain type of central processing unit (CPU), based on a source code. For example, when the source code is described in a low level language such as an assembly language corresponding to the certain type of CPU, the execution file in the execution format corresponding to the type of CPU is generated based on the source code by using an assembler corresponding to the type of CPU.

Japanese Laid-open Patent Publication No. 2014-130580 is disclosed as related art.

SUMMARY

According to an aspect of the embodiments, a non-transitory computer-readable recording medium stores a command conversion program for causing a computer to execute a process including: converting, in a first source code corresponding to a first-type processor, a first load command for a first mask register included in the first-type processor into a second load command for a second mask register included in a second-type processor different from the first-type processor; and converting, when a first single instruction multiple data (SIMD) command for performing an arithmetic operation using the first mask register exists after the first load command in the first source code and a state of a value of the first mask register requested by the first SIMD command does not coincide with a state of a value of the first mask register, the first SIMD command into a second SIMD command corresponding to the second-type processor and a change command for changing a state of a value of the second mask register to a state of a value of the second mask register requested by the second SIMD command.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory diagram illustrating an example of storage contents in a line information management table;

FIG. 5 is an explanatory diagram illustrating an example of storage contents in a mask register information management table;

FIG. 7 is an explanatory diagram (part 1) illustrating an example of an SIMD command;

FIG. 8 is an explanatory diagram (part 2) illustrating the example of the SIMD command;

FIG. 14 is an explanatory diagram (part 1) illustrating an example of a load command;

FIG. 17 is an explanatory diagram (part 2) illustrating the first operation example of the command conversion apparatus;

FIG. 18 is an explanatory diagram (part 3) illustrating the first operation example of the command conversion apparatus;

FIG. 19 is an explanatory diagram (part 4) illustrating the first operation example of the command conversion apparatus;

FIG. 20 is an explanatory diagram (part 5) illustrating the first operation example of the command conversion apparatus;

FIG. 21 is an explanatory diagram (part 6) illustrating the first operation example of the command conversion apparatus;

FIG. 22 is an explanatory diagram (part 7) illustrating the first operation example of the command conversion apparatus;

FIG. 23 is an explanatory diagram (part 8) illustrating the first operation example of the command conversion apparatus;

FIG. 24 is an explanatory diagram (part 9) illustrating the first operation example of the command conversion apparatus;

FIG. 25 is an explanatory diagram (part 10) illustrating the first operation example of the command conversion apparatus;

FIG. 26 is an explanatory diagram (part 11) illustrating the first operation example of the command conversion apparatus;

FIG. 27 is an explanatory diagram (part 12) illustrating the first operation example of the command conversion apparatus;

FIG. 28 is an explanatory diagram (part 13) illustrating the first operation example of the command conversion apparatus;

FIG. 29 is an explanatory diagram (part 14) illustrating the first operation example of the command conversion apparatus;

FIG. 30 is an explanatory diagram (part 15) illustrating the first operation example of the command conversion apparatus;

FIG. 31 is an explanatory diagram (part 16) illustrating the first operation example of the command conversion apparatus;

FIG. 32 is an explanatory diagram (part 17) illustrating the first operation example of the command conversion apparatus;

FIG. 34 is an explanatory diagram (part 2) illustrating the second operation example of the command conversion apparatus;

FIG. 35 is an explanatory diagram (part 3) illustrating the second operation example of the command conversion apparatus;

FIG. 36 is an explanatory diagram (part 4) illustrating the second operation example of the command conversion apparatus;

FIG. 37 is an explanatory diagram (part 5) illustrating the second operation example of the command conversion apparatus;

FIG. 38 is an explanatory diagram (part 6) illustrating the second operation example of the command conversion apparatus;

FIG. 39 is an explanatory diagram (part 7) illustrating the second operation example of the command conversion apparatus;

FIG. 40 is an explanatory diagram (part 8) illustrating the second operation example of the command conversion apparatus;

FIG. 41 is an explanatory diagram (part 9) illustrating the second operation example of the command conversion apparatus;

FIG. 42 is an explanatory diagram (part 10) illustrating the second operation example of the command conversion apparatus;

FIG. 43 is an explanatory diagram (part 11) illustrating the second operation example of the command conversion apparatus;

FIG. 44 is an explanatory diagram (part 12) illustrating the second operation example of the command conversion apparatus;

FIG. 45 is an explanatory diagram (part 13) illustrating the second operation example of the command conversion apparatus;

FIG. 46 is an explanatory diagram (part 14) illustrating the second operation example of the command conversion apparatus;

FIG. 47 is an explanatory diagram (part 15) illustrating the second operation example of the command conversion apparatus;

FIG. 48 is an explanatory diagram (part 16) illustrating the second operation example of the command conversion apparatus;

FIG. 49 is an explanatory diagram (part 17) illustrating the second operation example of the command conversion apparatus;

DESCRIPTION OF EMBODIMENTS

For example, there is a technology in which data of continuous vector elements of a source vector is copied to an unmasked vector element of a destination vector in response to reception of a processor command.

Meanwhile, in some cases, it is difficult to generate an execution file in an execution format corresponding to a specific type of CPU. For example, in a case where a source code is described in a low level language such as an assembly language corresponding to a certain type of CPU, it is difficult to generate an execution file in an execution format corresponding to another type of CPU different from the certain type of CPU.

According to one aspect, an object of the present disclosure is to convert a command included in a source code in accordance with an execution format corresponding to a type of processor.

Hereinafter, embodiments of a command conversion program, a command conversion method, and a command conversion apparatus according to the present disclosure are described in detail with reference to the drawings.

(Example of Command Conversion Method According to Embodiment)

Figure 1:
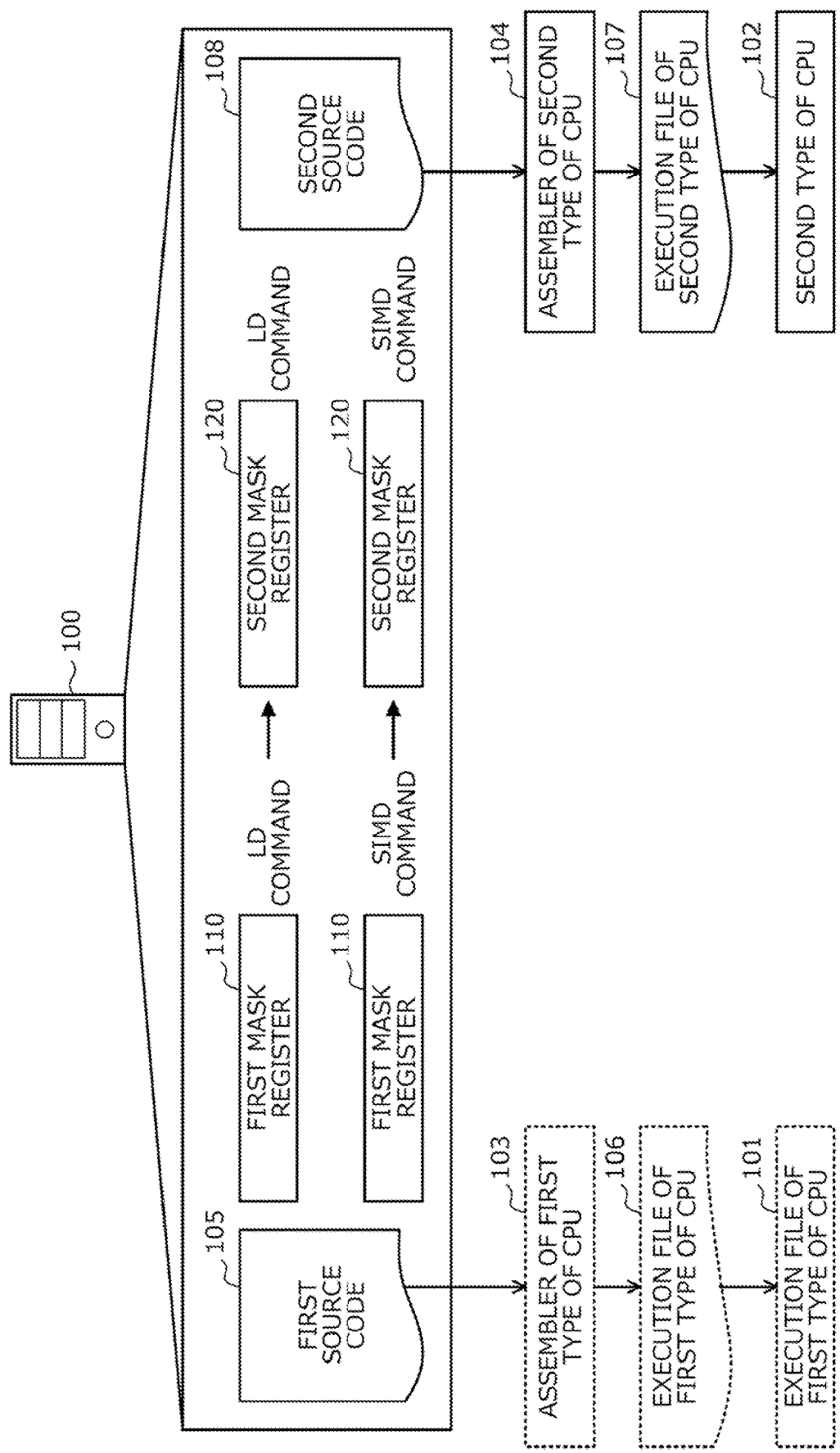
FIG. 1 is an explanatory diagram illustrating an example of a command conversion method according to an embodiment.

FIG. 1 is an explanatory diagram illustrating an example of a command conversion method according to an embodiment. A command conversion apparatus 100 is a computer for converting a command included in a source code in accordance with an execution format corresponding to a type of processor. For example, the command conversion apparatus 100 is a server, a personal computer (PC), or the like.

For example, the processor is a CPU. In the following, a case where the processor is the "CPU" will be mainly described. A type of CPU corresponds to a type of command set included in the CPU. The type of CPU is, for example, Intel architecture (IA)-64, advanced micro devices (AMD), Armv8-A, or the like. For example, the command set belongs to an assembly language. For example, the source code is described in the assembly language. For example, the source code is described by a command of a command set corresponding to the type of CPU. An execution format corresponds to a command set.

In the related art, when a source code is described in a low level language such as an assembly language corresponding to a first type of CPU, an execution file in an execution format corresponding to the first type of CPU may be generated based on the source code by using an assembler corresponding to the first type of CPU.

By contrast, in some cases, a developer wants to generate an execution file having an execution format corresponding to a second type of CPU different from the first type of CPU.

Meanwhile, in the related art, it is difficult to generate the execution file in the execution format corresponding to the second type of CPU. For example, the source code described in the assembly language corresponding to the first type of CPU may not be correctly recognized by an assembler corresponding to the second type of CPU. Therefore, it is not possible to generate the execution file in the execution format corresponding to the second type of CPU based on the source code.

Accordingly, it is desirable that the source code described in the assembly language corresponding to the first type of CPU is convertible into a source code described in an assembly language corresponding to the second type of CPU in accordance with the execution format corresponding to the second type of CPU.

In the related art, it is difficult to convert the source code written in the assembly language corresponding to the first type of CPU into a source code written in the assembly language corresponding to the second type of CPU. For example, a case is conceivable in which a use rule of a mask register in the assembly language corresponding to the first type of CPU and a use rule of a mask register in the assembly language corresponding to the second type of CPU are different from each other.

In this case, an SIMD command in the assembly language corresponding to the first type of CPU may not be simply replaced with an SIMD command in the assembly language corresponding to the second type of CPU. Therefore, the source code described in the assembly language corresponding to the first type of CPU may not be converted into the source code described in the assembly language corresponding to the second type of CPU.

In the present embodiment, a command conversion method capable of converting a command included in a source code in accordance with an execution format corresponding to a type of CPU will be described.

In FIG. 1, a first type of CPU 101 and a second type of CPU 102 exist. The first type of CPU 101 and the second type of CPU 102 respectively have different command sets. An assembler 103 corresponding to the first type of CPU 101 and an assembler 104 corresponding to the second type of CPU 102 exist.

The first type of CPU 101 includes one or more mask registers. The first type of CPU 101 includes, for example, a first mask register 110. The second type of CPU 102 includes one or more mask registers. The second type of CPU 102 includes, for example, a second mask register 120.

In some cases, a use rule of the mask register by the first type of CPU 101 and a use rule of the mask register by the second type of CPU 102 are different from each other. For example, the use rule indicates which bit of a value of the mask register is to be used in accordance with a state of the value of the mask register. The state of the value is, for example, a state indicating how many bits of the value are to be used.

The command conversion apparatus 100 acquires a first source code 105 corresponding to the first type of CPU 101. For example, the command conversion apparatus 100 acquires the first source code 105 corresponding to the first type of CPU 101 by accepting an input of the first source code 105 corresponding to the first type of CPU 101, based on an operation input by a user.

The first source code 105 is described in, for example, an assembly language corresponding to the first type of CPU 101. For example, the first source code 105 is described by using a command set corresponding to the first type of CPU 101. The first source code 105 is correctly recognizable by the assembler 103, for example. For example, the assembler 103 may generate an execution file 106 corresponding to the first type of CPU 101, based on the first source code 105. For example, the execution file 106 is executable by the first type of CPU 101.

The first source code 105 may not be correctly recognized by the assembler 104, for example. For example, the assembler 104 may not generate an execution file 107 corresponding to the second type of CPU 102, based on the first source code 105. Accordingly, in some cases, it is desired to generate a second source code 108 described by using a command set corresponding to the second type of CPU 102, for generating the execution file 107.

(1-1) The command conversion apparatus 100 specifies a first load command for the first mask register 110 included in the first type of CPU 101, in the first source code 105. In FIG. 1 and in the following description, a load may be referred to as an "LD (load)", in some cases. For example, the first load command is described by a command set included in the first type of CPU 101. The command conversion apparatus 100 converts the specified first load command into a second load command for the second mask register 120 included in the second type of CPU 102. For example, the second load command is described by a command set included in the second type of CPU 102.

(1-2) When there is a first SIMD command for performing an arithmetic operation using the first mask register 110 after the first load command, in the first source code 105, the command conversion apparatus 100 specifies the first SIMD command. For example, the command conversion apparatus 100 determines whether or not a state of a value of the first mask register 110 requested by the specified first SIMD command coincides with a state of a value of the first mask register 110. When the states coincide with each other, the command conversion apparatus 100 converts the first SIMD command into a second SIMD command corresponding to the second type of CPU 102. For example, the second SIMD command is described by a command set included in the second type of CPU 102.

By contrast, when the states do not coincide with each other, the command conversion apparatus 100 converts the first SIMD command into the second SIMD command corresponding to the second type of CPU 102 and a change command for changing a state of a value of the second mask register 120. The change command changes the state of the value of the second mask register 120 to a state of a value of the second mask register 120 requested by the second SIMD command. For example, the change command is described by a command set included in the second type of CPU 102.

(1-3) The command conversion apparatus 100 may further convert another command that is neither a load command nor an SIMD command, in the first source code 105 into a command that implements the same function as the command and corresponds to the second type of CPU 102. By inserting various commands after the conversion into the empty second source code 108, the command conversion apparatus 100 may complete the second source code 108. The command conversion apparatus 100 may convert the first source code 105 into the second source code 108 by overwriting various commands before conversion included in the first source code 105 with various commands after the conversion.

Accordingly, the command conversion apparatus 100 may convert the command included in the first source code 105 in accordance with an execution format corresponding to the second type of CPU 102, and may generate the second source code 108. Therefore, the command conversion apparatus 100 may generate the second source code 108 described using the command set corresponding to the second type of CPU 102, for generating the execution file 107. Based on the generated second source code 108, the command conversion apparatus 100 may generate the execution file 107.

Here, the case where the command conversion apparatus 100 operates alone and accepts the input of the first source code 105 corresponding to the first type of CPU 101 is described, and the embodiment is not limited thereto. For example, the command conversion apparatus 100 may acquire the first source code 105 corresponding to the first type of CPU 101 by receiving the first source code 105 from another computer in cooperation with the another computer, in some cases.

Here, the case where the command conversion apparatus 100 operates alone and generates the execution file 107 based on the second source code 108 corresponding to the second type of CPU 102 is described, and the embodiment is not limited thereto. For example, the command conversion apparatus 100 may transmit the second source code 108 corresponding to the second type of CPU 102 to another computer in cooperation with the another computer, in some cases. In this case, the another computer generates the execution file 107 based on the generated second source code 108. A specific example in a case where the command conversion apparatus 100 cooperates with the another computer will be described below with reference to FIG. 2.

(Example of Source Code Conversion System 200)

Next, an example of a source code conversion system 200 to which the command conversion apparatus 100 illustrated in FIG. 1 is applied will be described with reference to FIG. 2.

Figure 2:
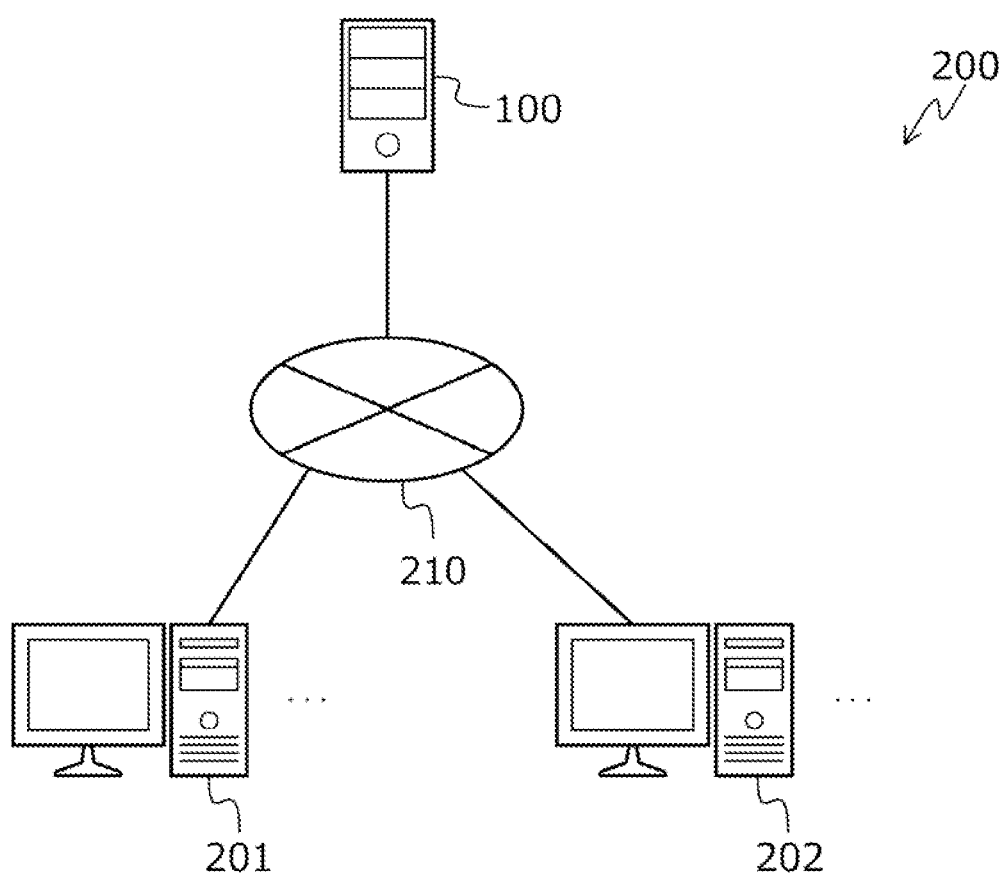
FIG. 2 is an explanatory diagram illustrating an example of a source code conversion system.

FIG. 2 is an explanatory diagram illustrating an example of the source code conversion system 200. In FIG. 2, the source code conversion system 200 includes the command conversion apparatus 100, a first client apparatus 201, and a second client apparatus 202.

In the source code conversion system 200, the command conversion apparatus 100 and the first client apparatus 201 are coupled to each other via a wired or wireless network 210. The network 210 is, for example, a local area network (LAN), a wide area network (WAN), an internet, or the like. In the source code conversion system 200, the command conversion apparatus 100 and the second client apparatus 202 are coupled to each other via the wired or wireless network 210.

The command conversion apparatus 100 receives a first source code corresponding to a CPU of IA-64 from the first client apparatus 201. The command conversion apparatus 100 analyzes the first source code corresponding to the CPU of IA-64, and generates various tables, which will be described below with reference to FIGS. 4 and 5.

For example, the command conversion apparatus 100 generates a line information management table 400, which will be described below in FIG. 4, in which attributes of a load command, an SIMD command, or the like using a mask register included in the CPU of IA-64 in the first source code are recorded. For example, the command conversion apparatus 100 generates a mask register information management table 500, which will be described below in FIG. 5, in which a state of the mask register is recorded.

By using various tables, which will be described below with reference to FIGS. 4 and 5, the command conversion apparatus 100 generates a second source code corresponding to a CPU of Armv8-A, based on the first source code. The command conversion apparatus 100 transmits the second source code to the second client apparatus 202. For example, the command conversion apparatus 100 is a server, a PC, or the like.

The first client apparatus 201 is a computer including the CPU of IA-64. The first client apparatus 201 transmits the first source code corresponding to the CPU of IA-64 to the command conversion apparatus 100. For example, the first client apparatus 201 is a server, a PC, or the like.

The second client apparatus 202 is a computer including the CPU of Armv8-A. The second client apparatus 202 receives the second source code corresponding to the CPU of Armv8-A from the command conversion apparatus 100. Based on the second source code corresponding to the CPU of Armv8-A, the second client apparatus 202 generates and executes an execution file corresponding to the CPU of Armv8-A. For example, the second client apparatus 202 is a server, a PC, or the like.

Here, the case where the command conversion apparatus 100 is different from the first client apparatus 201 is described, and the embodiment is not limited thereto. For example, the command conversion apparatus 100 may have a function as the first client apparatus 201, and may also operate as the first client apparatus 201, in some cases.

Here, the case where the command conversion apparatus 100 is different from the second client apparatus 202 is described, and the embodiment is not limited thereto. For example, the command conversion apparatus 100 may have a function as the second client apparatus 202, and may also operate as the second client apparatus 202, in some cases.

(Hardware Configuration Example of Command Conversion Apparatus 100)

Next, a hardware configuration example of the command conversion apparatus 100 will be described with reference to FIG. 3.

Figure 3:
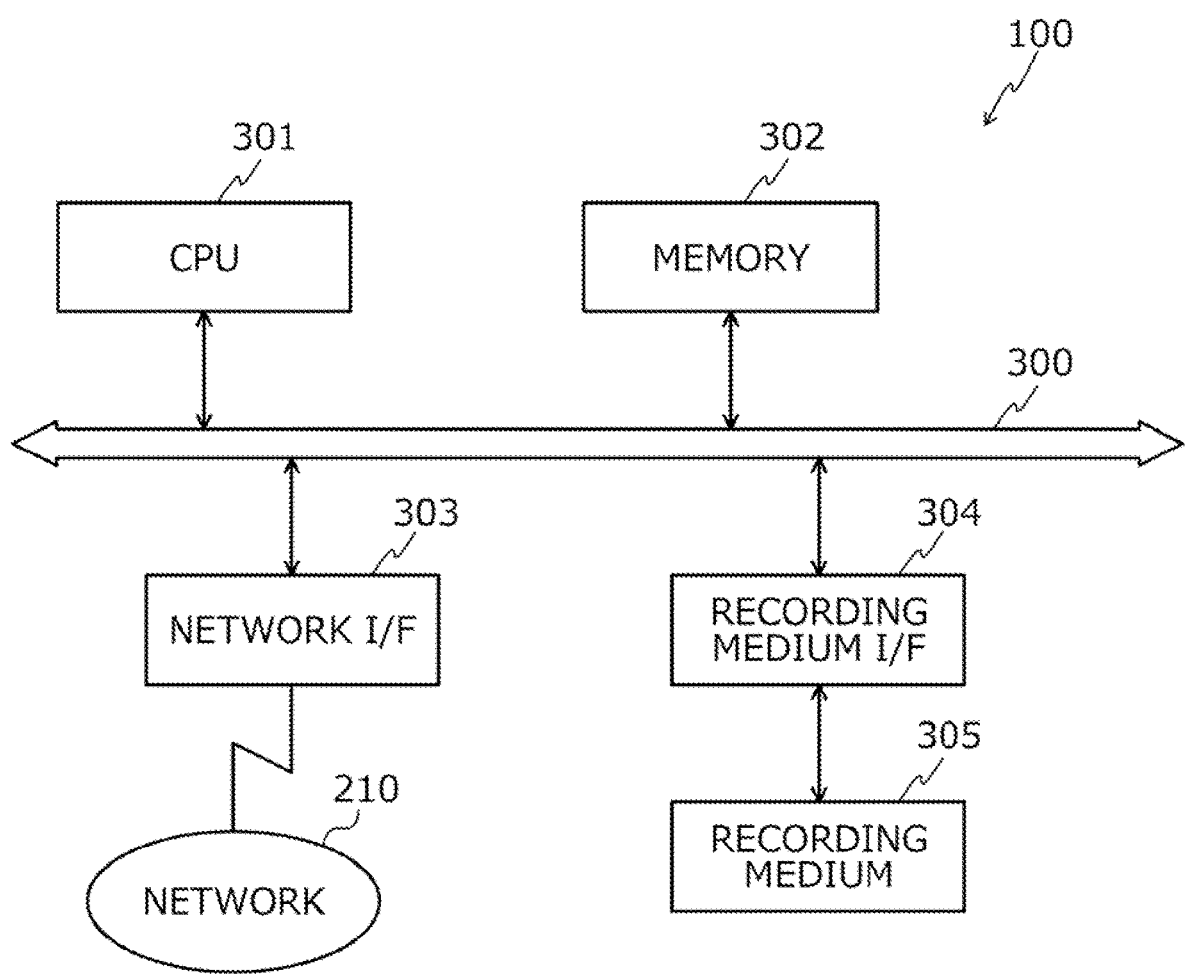
FIG. 3 is a block diagram illustrating a hardware configuration example of a command conversion apparatus.

FIG. 3 is a block diagram illustrating the hardware configuration example of the command conversion apparatus 100. In FIG. 3, the command conversion apparatus 100 includes a CPU 301, a memory 302, a network interface (I/F) 303, a recording medium I/F 304, and a recording medium 305. The respective components are coupled to each other through a bus 300.

The CPU 301 controls the entire command conversion apparatus 100. The memory 302 includes, for example, a read-only memory (ROM), a random-access memory (RAM), a flash ROM, and the like. For example, the flash ROM or the ROM stores various programs, and the RAM is used as a work area of the CPU 301. The program stored in the memory 302 causes the CPU 301 to execute coded processes by being loaded into the CPU 301. The memory 302 stores, for example, various tables, which will be described below in FIGS. 4 and 5.

The network I/F 303 is coupled to the network 210 through a communication line, and is coupled to another computer via the network 210. The network I/F 303 controls the network 210 and an internal interface so as to control an input and an output of data from and to the another computer. The network I/F 303 is, for example, a modem, a LAN adapter, or the like.

The recording medium I/F 304 controls reading and writing of data from and to the recording medium 305 under the control of the CPU 301. The recording medium I/F 304 is, for example, a disk drive, a solid-state drive (SSD), a Universal Serial Bus (USB) port, or the like. The recording medium 305 is a non-volatile memory that stores data written under the control of the recording medium I/F 304. The recording medium 305 is, for example, a disk, a semiconductor memory, a USB memory, or the like. The recording medium 305 may be detachable from the command conversion apparatus 100.

In addition to the components described above, the command conversion apparatus 100 may include, for example, a keyboard, a mouse, a display, a printer, a scanner, a microphone, a speaker, and the like. The command conversion apparatus 100 may include a plurality of recording media I/F 304 or recording media 305. The command conversion apparatus 100 may not include the recording medium I/F 304 or the recording medium 305.

(Storage Content of Line Information Management Table 400)

Next, an example of storage contents of the line information management table 400 will be described with reference to FIG. 4. The line information management table 400 is implemented by, for example, a storage region such as the memory 302 or the recording medium 305 of the command conversion apparatus 100 illustrated in FIG. 3.

FIG. 4 is an explanatory diagram illustrating the example of the storage contents stored in the line information management table 400. As illustrated in FIG. 4, the line information management table 400 includes fields of a line, an ID, a state, and a kind. The line information management table 400 stores line information as a record 400-a, by setting information in each field for each specific command line. "a" is arbitrary integer. For example, the specific command line is a command line indicating a load command or a masked SIMD command.

A line number of the specific command line included in an assembler source code is set in a line field. An ID allocated to a mask register used in the command line described above is set in an ID field. A state of a value of the mask register described above is set in a state field. For example, the state of the value is a mask bit width. A type of command line described above is set in a kind field. The type is, for example, LD indicating a load command or SIMD indicating a masked SIMD command.

(Storage Content of Mask Register Information Management Table 500)

Next, an example of storage contents of the mask register information management table 500 will be described with reference to FIG. 5. The mask register information management table 500 is implemented by, for example, a storage region such as the memory 302 or the recording medium 305 of the command conversion apparatus 100 illustrated in FIG. 3.

FIG. 5 is an explanatory diagram illustrating the example of the storage contents in the mask register information management table 500. As illustrated in FIG. 5, the mask register information management table 500 includes fields of ID, used[ID], Reserve[ID], Final_point[ID], Reserved[ID], and State[ID]. The mask register information management table 500 stores mask register information as a record 500-b, by setting information in each field for each mask register. "b" is arbitrary integer.

An ID allocated to the mask register is set in an ID field. Flag information indicating whether or not the mask register having the ID described above is used in an assembler source code is set in a used[ID] field. When the flag information is 1, the flag information indicates that the flag information is used, and when the flag information is 0, the flag information indicates that the flag information is not used.

A value of the mask register of the ID described above is set in a Reserve[ID] field, and in a case of saving to another mask register of ID', an ID' of a mask register as a saving destination is set. The line number of the last command line used with the mask register of the ID described above in an assembler source code is set in a Final_point[ID] field.

A value of the another mask register of the ID' is set in a Reserved[ID] field, and in a case of saving to the mask register of the ID described above, an ID' of a mask register as a saving source is set. A state of a value of the mask register of the ID described above is set in a State[ID] field. For example, the state of the value is a mask bit width.

(Hardware Configuration Example of First Client Apparatus 201)

A hardware configuration example of the first client apparatus 201 is the same as, for example, the hardware configuration example of the command conversion apparatus 100 illustrated in FIG. 3, and thus description thereof will be omitted.

(Hardware Configuration Example of Second Client Apparatus 202)

A hardware configuration example of the second client apparatus 202 is the same as, for example, the hardware configuration example of the command conversion apparatus 100 illustrated in FIG. 3, and thus description thereof will be omitted.

(Functional Configuration Example of Command Conversion Apparatus 100)

Next, a functional configuration example of the command conversion apparatus 100 will be described with reference to FIG. 6.

Figure 6:
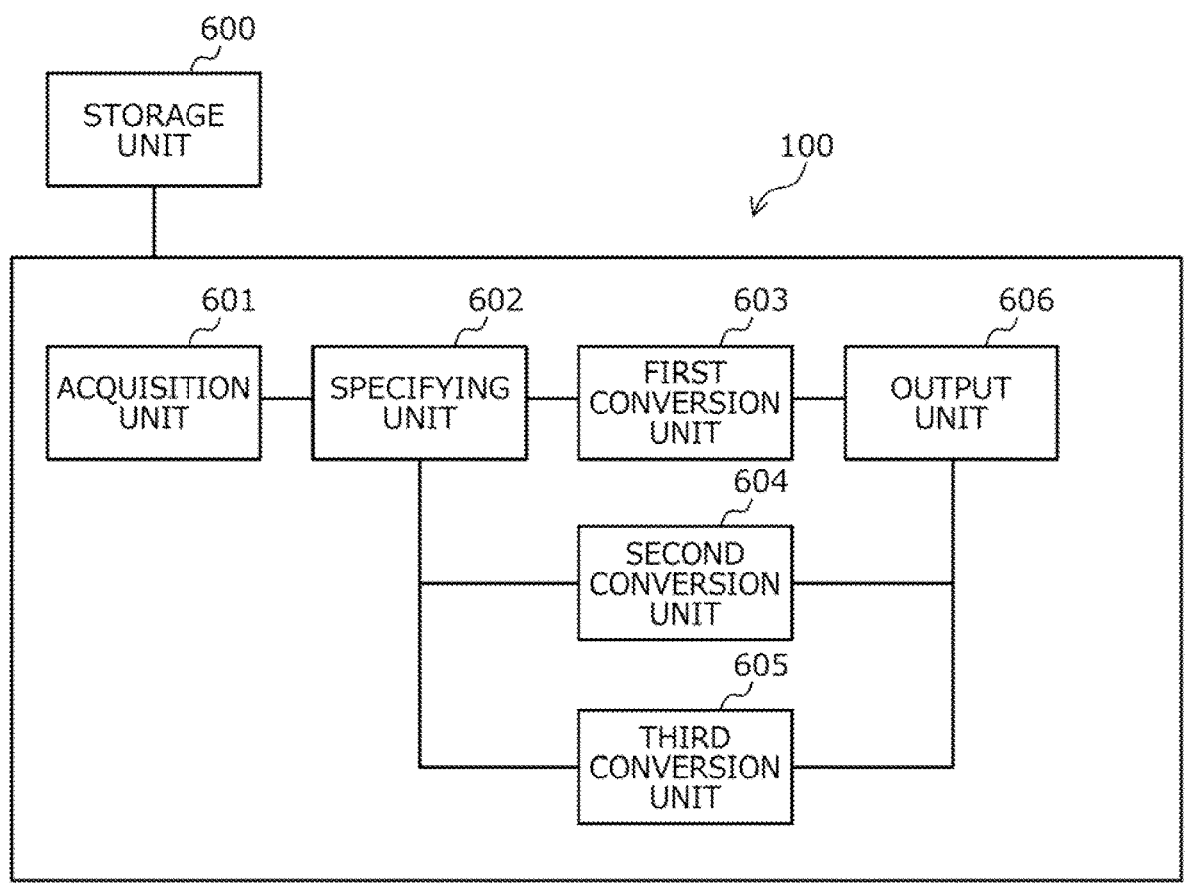
FIG. 6 is a block diagram illustrating an example of a functional configuration of the command conversion apparatus.

FIG. 6 is a block diagram illustrating the functional configuration example of the command conversion apparatus 100. The command conversion apparatus 100 includes a storage unit 600, an acquisition unit 601, a specifying unit 602, a first conversion unit 603, a second conversion unit 604, a third conversion unit 605, and an output unit 606.

The storage unit 600 is implemented by, for example, a storage region such as the memory 302 or the recording medium 305 illustrated in FIG. 3. Hereinafter, a case where the storage unit 600 is included in the command conversion apparatus 100 will be described, and the embodiment is not limited thereto. For example, the storage unit 600 may be included in an apparatus different from the command conversion apparatus 100, and storage contents in the storage unit 600 may be referred to from the command conversion apparatus 100, in some cases.

The acquisition unit 601 to the output unit 606 function as examples of a control unit. For example, the functions of the acquisition unit 601 to the output unit 606 are implemented by causing the CPU 301 to execute programs stored in a storage region such as the memory 302 or the recording medium 305, or by using the network I/F 303, as illustrated in FIG. 3. A process result by each functional unit is stored in, for example, the storage region such as the memory 302 or the recording medium 305 illustrated in FIG. 3.

The storage unit 600 stores various types of information to be referred to or updated in the process of each functional unit. For example, the storage unit 600 stores a first source code corresponding to a first-type processor. For example, the first source code is described in an assembly language corresponding to the first-type processor. For example, the first source code is described by a command set included in the first-type processor. For example, the first type is IA-64. For example, the first source code is acquired by the acquisition unit 601, and stored in the storage unit 600.

For example, the storage unit 600 stores a command set of the first-type processor. For example, the storage unit 600 stores a command set of a second-type processor. For example, the storage unit 600 stores a rule for converting a first command included in the command set of the first-type processor into a second command included in the command set of the second-type processor. For example, the various command sets and rules are stored in advance in the storage unit 600.

For example, the storage unit 600 stores a use rule of a mask register included in the first-type processor, by the first-type processor. For example, the storage unit 600 stores a use rule of a mask register included in the second-type processor, by the second-type processor. The use rule of the mask register by the first-type processor and the use rule of the mask register by the second-type processor are use rules different from each other. For example, the use rule indicates which bit of a value of the mask register is to be used in accordance with a state of the value of the mask register. The state of the value is, for example, a state indicating how many bits of the value are to be used. The state of the value corresponds to, for example, a mask bit width.

For example, the storage unit 600 stores position information capable of specifying a position of a load command with respect to the mask register included in the first-type processor, in the first source code. For example, the storage unit 600 stores position information capable of specifying a position of an SIMD command that performs an arithmetic operation using the mask register included in the first-type processor. For example, the storage unit 600 stores the line information management table 400. For example, the position information is generated by the specifying unit 602, and stored in the storage unit 600.

For example, the storage unit 600 may store a state of the mask register included in the first-type processor. For example, the state includes whether or not the mask register included in the first-type processor is used in the first source code. For example, the state may include a position of a load command or an SIMD command in which the mask register included in the first-type processor is used last, in the first source code. For example, the storage unit 600 stores the mask register information management table 500. For example, the state is generated by the specifying unit 602, and stored in the storage unit 600.

The acquisition unit 601 acquires various types of information used in the process of each functional unit. The acquisition unit 601 stores the acquired various types of information in the storage unit 600, or outputs the acquired information to each functional unit. The acquisition unit 601 may output the various types of information stored in advance in the storage unit 600 to each functional unit. For example, the acquisition unit 601 acquires various types of information based on an operation input by a user. For example, the acquisition unit 601 may receive the various types of information from an apparatus different from the command conversion apparatus 100.

For example, the acquisition unit 601 acquires the first source code. For example, the acquisition unit 601 acquires the first source code by accepting an input of the first source code, based on an operation input of the user. For example, the acquisition unit 601 acquires the first source code by receiving the first source code from another computer. For example, the another computer is the first client apparatus 201.

The acquisition unit 601 may accept a start trigger for starting the process to be performed by any of the functional units. The start trigger is, for example, a predetermined operation input by the user. The start trigger may be, for example, receipt of predetermined information from another computer. The start trigger may be, for example, an output of the predetermined information by any of the functional units. For example, the acquisition unit 601 accepts acquisition of the first source code as a start trigger for starting the processes of the specifying unit 602, the first conversion unit 603, the second conversion unit 604, and the third conversion unit 605.

The specifying unit 602 specifies a load command to a mask register included in the first-type processor, in the first source code. For example, the specifying unit 602 specifies a first load command for a first mask register included in the first-type processor, in the first source code. For example, the specifying unit 602 may generate position information capable of specifying a position of the specified first load command, and may store the position information in the storage unit 600. Accordingly, the specifying unit 602 makes it easy for the first conversion unit 603 to set the first load command as a processing target.

The specifying unit 602 specifies an SIMD command that performs an arithmetic operation using a mask register included in the first-type processor, in the first source code. For example, the specifying unit 602 specifies a first SIMD command that performs an arithmetic operation using a first mask register, in the first source code. For example, the specifying unit 602 may generate position information capable of specifying a position of the specified first SIMD command, and may store the position information in the storage unit 600. Accordingly, the specifying unit 602 makes it easy for the second conversion unit 604 to set the first SIMD command as a processing target.

The specifying unit 602 may specify a state of the mask register included in the first-type processor. For example, the specifying unit 602 specifies a state including whether or not the mask register included in the first-type processor is used in the first source code. For example, the specifying unit 602 specifies a state in which the mask register included in the first-type processor includes a position of a load command or an SIMD command used last, in the first source code. For example, the specifying unit 602 may store the specified state in the storage unit 600. Accordingly, the specifying unit 602 may refer to information that may serve as a guide when the first conversion unit 603 converts the first load command and when the second conversion unit 604 converts the first SIMD command.

The first conversion unit 603 converts the first load command for the first mask register included in the first-type processor, in the first source code. For example, the first conversion unit 603 converts the first load command into a second load command for a second mask register included in the second-type processor. For example, the first conversion unit 603 refers to the storage unit 600, and converts the first load command into the second load command for the second mask register included in the second-type processor. Accordingly, the first conversion unit 603 may obtain the second load command corresponding to the second-type processor, described in an assembly language corresponding to the second-type processor.

For example, when the first SIMD command exists after the first load command in the first source code, the first conversion unit 603 converts the first load command into a second load command and a saving command. The saving command defines that a value of the second mask register is saved to a third mask register included in the second-type processor. Accordingly, after the first conversion unit 603 may change a state of the value of the second mask register by replacing a bit of the value of the second mask register, and then set the bit of the value of the second mask register to be restorable. When the state of the value of the second mask register may not be changed, the first conversion unit 603 may complete the process without using the saving command, may reduce the processing amount, and may easily secure an empty mask register.

For example, when another load command to the first mask register exists after the first load command in the first source code, the first conversion unit 603 converts the first load command into a second load command and a saving command. The saving command defines that a value of the second mask register is saved to a third mask register included in the second-type processor. Accordingly, after the first conversion unit 603 may change a state of the value of the second mask register by replacing a bit of the value of the second mask register, and then set the bit of the value of the second mask register to be restorable. When the state of the value of the second mask register may not be changed, the first conversion unit 603 may complete the process without using the saving command, may reduce the processing amount, and may easily secure an empty mask register.

The second conversion unit 604 converts the first SIMD command that performs an arithmetic operation using the first mask register, in the first source code. For example, the second conversion unit 604 refers to the storage unit 600 to determine whether or not the first SIMD command exists after the first load command in the first source code. When the first SIMD command exists, the second conversion unit 604 determines whether or not a state of a value of the first mask register requested by the first SIMD command coincides with a state of a value of the immediately before first mask register. The state of the value of the immediately before first mask register is a state of a value of the first mask register immediately before the first SIMD command, in the first source code.

For example, when the states do not coincide with each other, the second conversion unit 604 refers to the storage unit 600 and converts the first SIMD command into a second SIMD command corresponding to the second-type processor and a change command. The change command defines that a state of a value of the second mask register is changed to a state of a value of the second mask register requested by the second SIMD command. Accordingly, the second conversion unit 604 may change the state of the value of the second mask register, for the second SIMD command being correctly executable.

For example, when the states coincide with each other, the second conversion unit 604 converts the first SIMD command into the second SIMD command. For example, when the states coincide with each other, the second conversion unit 604 converts the first SIMD command into the second SIMD command by referring to the storage unit 600. Accordingly, the second conversion unit 604 may obtain the second load command corresponding to the second-type processor, described in an assembly language corresponding to the second-type processor.

For example, the second conversion unit 604 determines whether or not the state of the value of the first mask register requested by the first SIMD command coincides with the state of the value of the immediately before first mask register. The state of the value of the immediately before first mask register is a state of a value of the first mask register immediately before another SIMD command, in the first source code. For example, the second conversion unit 604 determines whether or not there is the another SIMD command that performs an arithmetic operation using the first mask register after the first SIMD command, in the first source code. For example, in a case where it is determined that there is no other SIMD command and it is determined that the states do not coincide with each other, the second conversion unit 604 converts the first SIMD command into the second SIMD command and the change command, and releases the third mask register. Accordingly, the second conversion unit 604 may easily secure an empty mask register.

For example, the second conversion unit 604 determines whether or not the state of the value of the first mask register requested by the first SIMD command coincides with the state of the value of the immediately before first mask register. The state of the value of the immediately before first mask register is a state of a value of the first mask register immediately before the first SIMD command, in the first source code.

For example, the second conversion unit 604 specifies a state of a value of the first mask register requested by another SIMD command that exists after the first SIMD command and performs an arithmetic operation using the first mask register, in the first source code. For example, the second conversion unit 604 determines whether or not the specified state of the value of the first mask register coincides with a state of a value of the immediately before first mask register. The state of the value of the immediately before first mask register is a state of a value of the first mask register immediately before another SIMD command, in the first source code.

For example, there may be a case where it is determined that the state of the value of the first mask register requested by the first SIMD command is not matched and it is determined that the state of the value of the first mask register requested by the another SIMD command is matched. For example, in this case, the second conversion unit 604 converts the first SIMD command into the second SIMD command and the change command, and releases the third mask register. Accordingly, the second conversion unit 604 may easily secure an empty mask register.

For example, the second conversion unit 604 determines whether or not the state of the value of the first mask register requested by the first SIMD command coincides with the state of the value of the first mask register. For example, the second conversion unit 604 determines whether or not another SIMD command that performs an arithmetic operation using the first mask register and another load command for the first mask register exist after the first SIMD command, in the first source code. For example, in a case where it is determined that there is no other load command and it is determined that the states do not coincide with each other, the second conversion unit 604 converts the first SIMD command into the second SIMD command and the change command, and releases the third mask register. Accordingly, the second conversion unit 604 may easily secure an empty mask register.

For example, the second conversion unit 604 determines whether or not the state of the value of the first mask register requested by the first SIMD command coincides with the state of the value of the immediately before first mask register. The state of the value of the immediately before first mask register is a state of a value of the first mask register immediately before the first SIMD command, in the first source code.

For example, the second conversion unit 604 specifies a state of a value of the first mask register requested by another SIMD command that exists after the first SIMD command and performs an arithmetic operation using the first mask register, in the first source code. For example, the second conversion unit 604 determines whether or not the specified state of the value of the first mask register coincides with a state of a value of the immediately before first mask register. The state of the value of the immediately before first mask register is a state of a value of the first mask register immediately before another SIMD command, in the first source code.

For example, the second conversion unit 604 specifies a state of a value of the first mask register corresponding to another load command existing after the first SIMD command, in the first source code. For example, the second conversion unit 604 determines whether or not the specified state of the value of the first mask register coincides with a state of a value of the immediately before first mask register. The state of the value of the immediately before first mask register is a state of a value of the first mask register immediately before the another load command, in the first source code.

For example, there may be a case where it is determined that the state of the value of the first mask register requested by the first SIMD command is not matched. There may be a case where it is determined that the state of the value of the first mask register requested by another SIMD command is matched, and it is determined that the state of the value of the first mask register corresponding to the another load command is matched. For example, in this case, the second conversion unit 604 converts the first SIMD command into the second SIMD command and the change command, and releases the third mask register. Accordingly, the second conversion unit 604 may easily secure an empty mask register.

By referring to the storage unit 600, the third conversion unit 605 converts a command that is neither a load command nor an SIMD command into a command corresponding to the second-type processor that implements a function corresponding to the command, in the first source code. Accordingly, the third conversion unit 605 may obtain the command corresponding to the second-type processor described in the assembly language corresponding to the second-type processor.

The output unit 606 outputs a result of the process performed by at least any of the functional units. For example, the output is made in the form of display on a display, print output to a printer, transmission to an external apparatus through the network I/F 303, or storage in a storage region such as the memory 302 or the recording medium 305. Accordingly, the output unit 606 may notify a user of the process result in at least any of the functional units, and may thus improve the convenience of the command conversion apparatus 100.

For example, the output unit 606 outputs the second load command obtained by the first conversion unit 603. For example, the output unit 606 outputs the second SIMD command obtained by the second conversion unit 604. For example, the output unit 606 outputs the command obtained by the third conversion unit 605. For example, the output unit 606 outputs the second source code described in the assembly language corresponding to the second-type processor, including the second load command obtained by the first conversion unit 603, the second SIMD command obtained by the second conversion unit 604, and the command obtained by the third conversion unit 605. Accordingly, the output unit 606 may use the second source code.

(Operation Example of Command Conversion Apparatus 100)

Next, an operation example of the command conversion apparatus 100 will be described with reference to FIGS. 7 to 49. First, an example of an SIMD command will be described with reference to FIGS. 7 to 13, for example.

FIGS. 7 to 13 are explanatory diagrams illustrating the example of the SIMD command. An example of an SIMD command corresponding to a CPU of IA-64 will be described with reference to FIG. 7. The CPU of IA-64 includes 32 SIMD registers of 512-bit. The SIMD registers respectively have names of zmm0 to zmm31, for example. The SIMD command is a command that performs an arithmetic operation on a value of an SIMD register. For example, the SIMD command is included in a command set included in the CPU of IA-64.

As an example of the SIMD command, "vpaddb zmm2, zmm0, zmm1" is used, for example. "vpaddb zmm2, zmm0, zmm1" defines that an arithmetic operation of respectively adding 64 pieces of data having an 8-bit width in zmm0 and 64 pieces of data having an 8-bit width in zmm1 is performed, and the arithmetic operation result is stored in zmm2.

"vpaddb zmm2, zmm0, zmm1" defines, for example, $c_i = a_i + b_i$, $i = 0, 1, \ldots$, and 63. $a_i$ is an i-th 8-bit data in a case where zmm0 is divided with an 8-bit width. $b_i$ is an i-th 8-bit data in a case where zmm1 is divided with an 8-bit width. $c_i$ is an i-th 8-bit data in a case where zmm2 is divided with an 8-bit width.

As the example of the SIMD command, "vpaddq zmm2, zmm0, zmm1" is used, for example. "vpaddq zmm2, zmm0, zmm1" defines that an arithmetic operation of respectively adding 8 pieces of data having a 64-bit width in zmm0 and 8 pieces of data having a 64-bit width in zmm1 is performed and the arithmetic operation result is stored in zmm2.

"vpaddq zmm2, zmm0, zmm1" defines, for example, $c_i = a_i + b_i$, $i = 0, 1, \ldots$, and 7. $a_i$ is an i-th 64-bit data in a case where zmm0 is divided with a 64-bit width. $b_i$ is an i-th 64-bit data in a case where zmm1 is divided with a 64-bit width. $c_i$ is an i-th 64-bit data in a case where zmm2 is divided with a 64-bit width.

In the same manner, as the example of the SIMD command, "vpaddw zmm2, zmm0, zmm1", "vpaddd zmm2, zmm0, zmm1", or the like is used, for example. Next, the description continues with reference to FIG. 8.

An SIMD command corresponding to a CPU of Armv8-A will be described with reference to FIG. 8. The CPU of Armv8-A includes 32 SIMD registers of 512-bit. The SIMD registers respectively have names of z0 to z31, for example. The SIMD command is a command that performs an arithmetic operation on a value of an SIMD register. For example, the SIMD command is included in a command set of the CPU of Armv8-A.

As an example of the SIMD command, "add z2.b, z0.b, z1.b" is used, for example. "add z2.b, z0.b, z1.b" defines that an arithmetic operation of respectively adding 64 pieces of data having an 8-bit width in z0 and 64 pieces of data having an 8-bit width in z1 is performed, and the arithmetic operation result is stored in z2.

"add z2.b, z0.b, z1.b" defines, for example, $c_i=a_i+b_i$, $i=0, 1, \ldots$, and 63. $a_i$ is an i-th 8-bit data in a case where z0 is divided with an 8-bit width. $b_i$ is an i-th 8-bit data in a case where z1 is divided with an 8-bit width. $c_i$ is an i-th 8-bit data in a case where z2 is divided with an 8-bit width.

As the example of the SIMD command, "add z2.q, z0.q, z1.q" is used, for example. "add z2.q, z0.q, z1.q" defines that an arithmetic operation of respectively adding 8 pieces of data having a 64-bit width in z0 and 8 pieces of data having a 64-bit width in z1 is performed and the arithmetic operation result is stored in z2.

"add z2.q, z0.q, z1.q" defines, for example, $c_i=a_i+b_i$, $i=0, 1, \ldots$, and 7. $a_i$ is an i-th 64-bit data in a case where z0 is divided with a 64-bit width. $b_i$ is an i-th 64-bit data in a case where z1 is divided with a 64-bit width. $c_i$ is an i-th 64-bit data in a case where z2 is divided with a 64-bit width.

In the same manner, as the example of the SIMD command, "add z2.h, z0.h, z1.h", "add z2.d, z0.d, z1.d", or the like is used, for example. Next, the description continues with reference to FIGS. 9 to 12, and an example of a masked SIMD command obtained by expanding an SIMD command using a mask register will be described.

Figure 9:
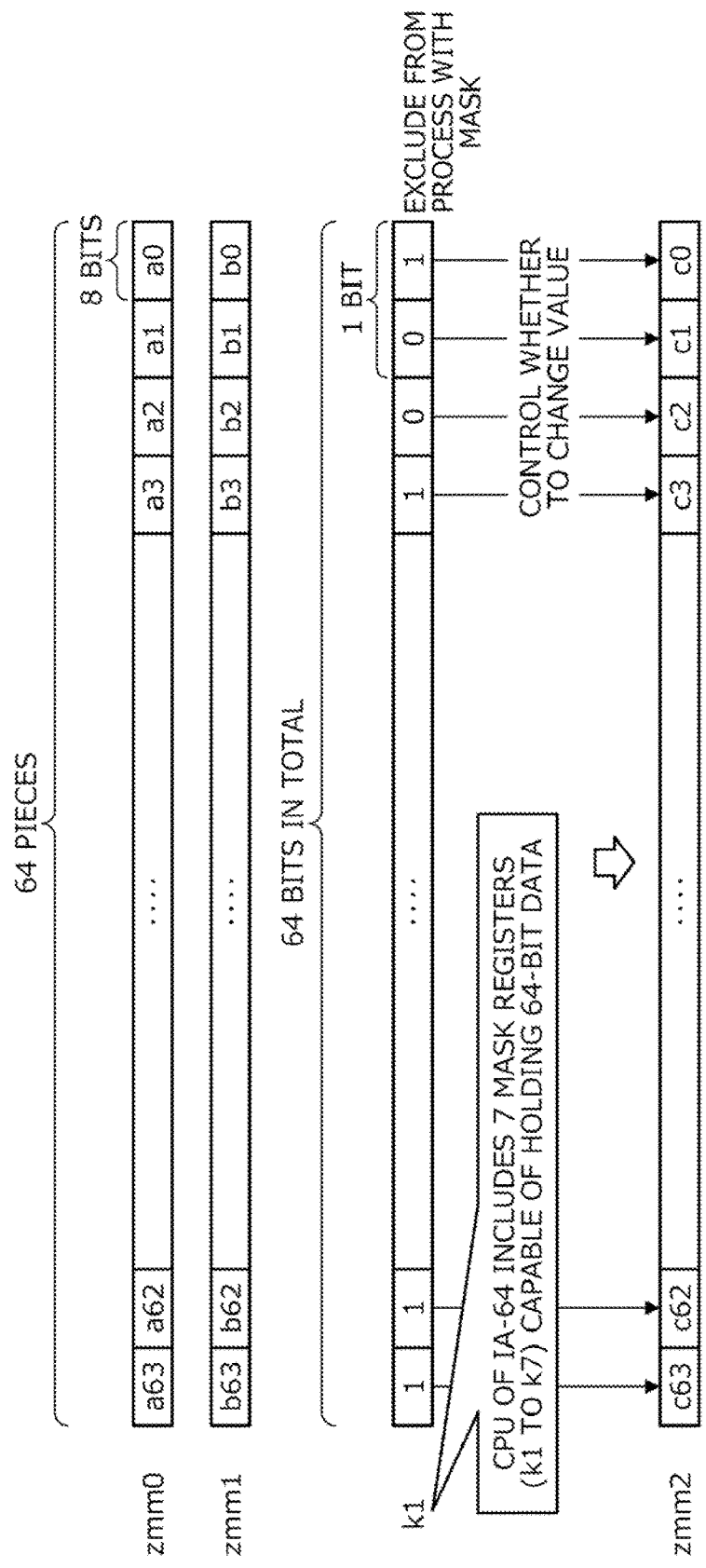
FIG. 9 is an explanatory diagram (part 3) illustrating the example of the SIMD command.

A masked SIMD command corresponding to a CPU of IA-64 will be described with reference to FIG. 9. The CPU of IA-64 includes 7 mask registers of 64-bit. The mask registers respectively have names of k1 to k7, for example. The masked SIMD command is a command that uses the mask register to perform an arithmetic operation on a value in an SIMD register. For example, the masked SIMD command is included in a command set of the CPU of IA-64.

As an example of the masked SIMD command, "vpaddb zmm2 {k1}, zmm0, zmm1" is used, for example. "vpaddb zmm2 {k1}, zmm0, zmm1" defines that, among 64 pieces of data having an 8-bit width in zmm0 and 64 pieces of data having an 8-bit width in zmm1, pieces of data designated by the mask register are added to each other, and the arithmetic operation result is stored in zmm2.

"vpaddb zmm2 {k1}, zmm0, zmm1" defines, for example, if (i-th bit of the mask register is 1) $\{c_i=a_i+b_i;\}$. $a_i$ is an i-th 8-bit data in a case where zmm0 is divided with an 8-bit width. $b_i$ is an i-th 8-bit data in a case where zmm1 is divided with an 8-bit width. $c_i$ is an i-th 8-bit data in a case where zmm2 is divided with an 8-bit width.

For example, when the i-th bit of the mask register is 0, i-th 8-bit data of zmm0 and i-th 8-bit data of zmm1 are not added, and thus i-th 8-bit data of zmm2 is not updated. Next, the description continues with reference to FIG. 10.

Figure 10:
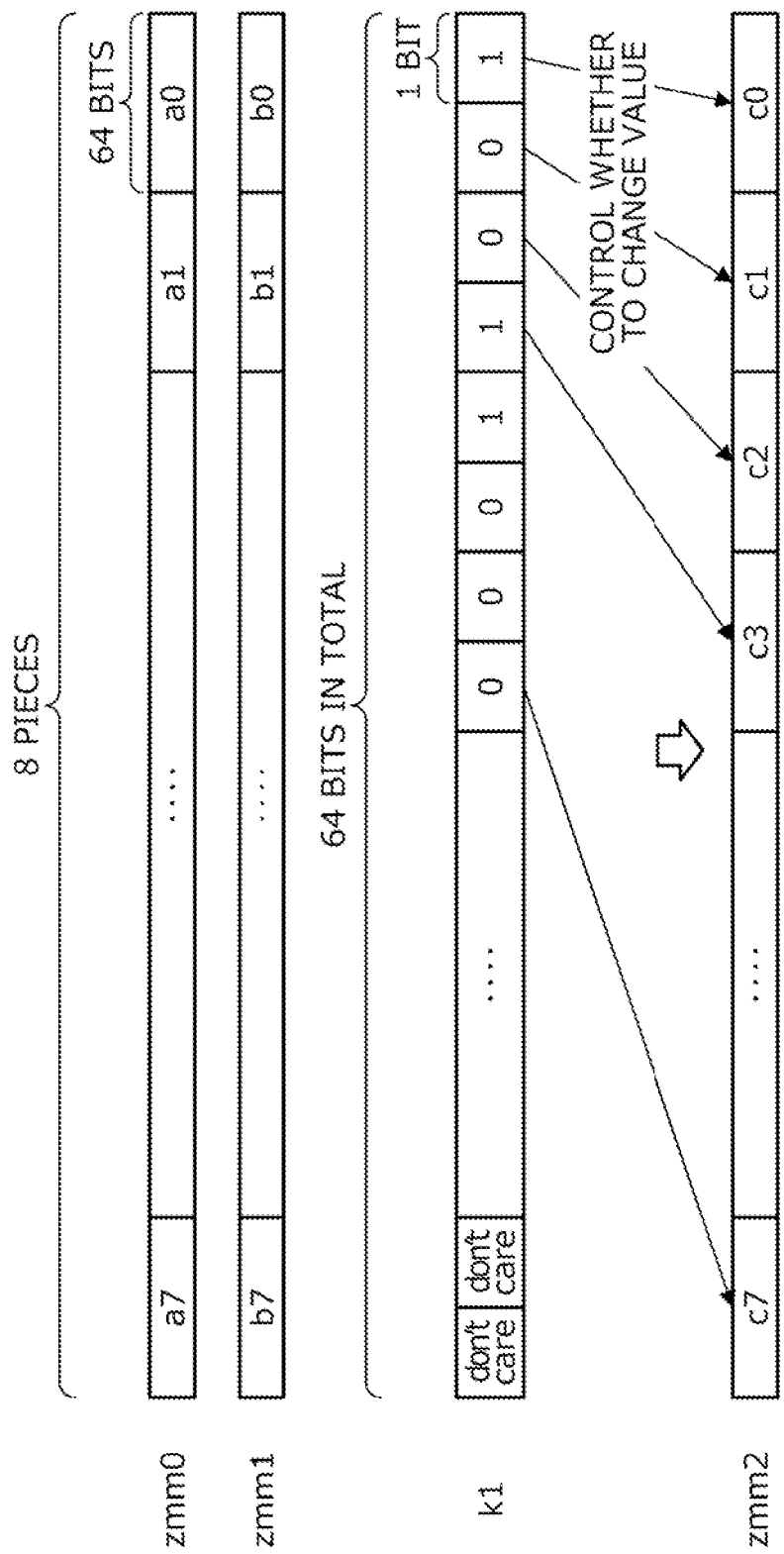
FIG. 10 is an explanatory diagram (part 4) illustrating the example of the SIMD command.

A masked SIMD command corresponding to a CPU of IA-64 will be described with reference to FIG. 10. As an example of the masked SIMD command, "vpaddq zmm2 {k1}, zmm0, zmm1" is used, for example. "vpaddq zmm2 {k1}, zmm0, zmm1" defines that, among 8 pieces of data having a 64-bit width in zmm0 and 8 pieces of data having a 64-bit width in zmm1, pieces of data designated by a mask register are added to each other, and the arithmetic operation result is stored in zmm2.

"vpaddq zmm2 {k1}, zmm0, zmm1" defines, for example, if (i-th bit of the mask register is 1) $\{c_i=a_i+b_i;\}$. $a_i$ is an i-th 64-bit data in a case where zmm0 is divided with a 64-bit width. $b_i$ is an i-th 64-bit data in a case where zmm1 is divided with a 64-bit width. $c_i$ is an i-th 64-bit data in a case where zmm2 is divided with a 64-bit width.

For example, when the i-th bit of the mask register is 0, i-th 64-bit data of zmm0 and i-th 64-bit data of zmm1 are not added, and thus i-th 64-bit data of zmm2 is not updated.

In the same manner, as an example of the masked SIMD command, "vpaddw zmm2 {k1}, zmm0, zmm1", "vpaddd zmm2 {k1}, zmm0, zmm1", or the like is used, for example. Next, the description continues with reference to FIG. 11.

Figure 11:
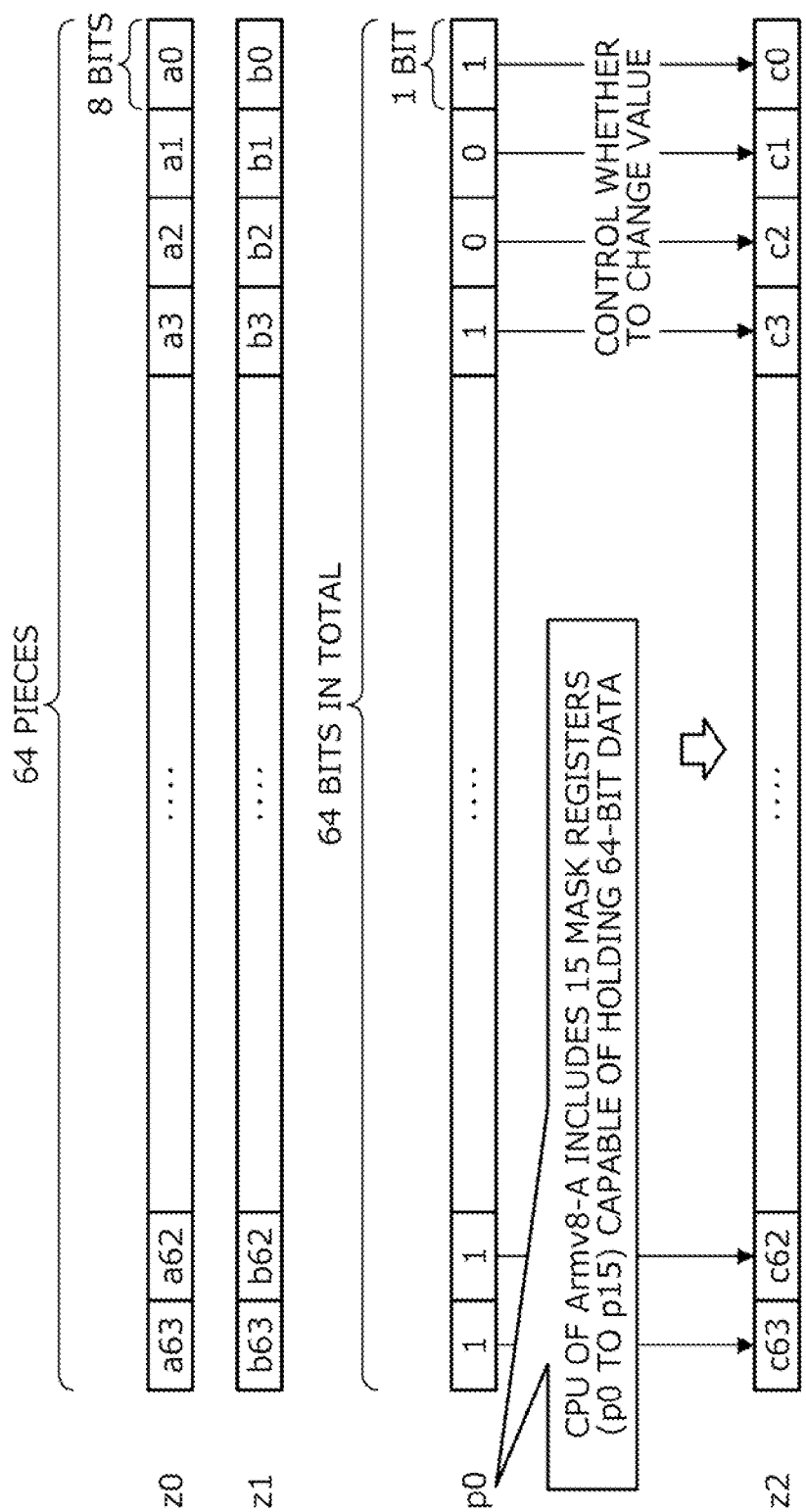
FIG. 11 is an explanatory diagram (part 5) illustrating the example of the SIMD command.

A masked SIMD command corresponding to a CPU of Armv8-A will be described with reference to FIG. 11. The CPU of Armv8-A includes 15 mask registers of 64-bit. The mask registers respectively have names of p0 to p15, for example. The masked SIMD command is a command that performs an arithmetic operation on a value of an SIMD register. For example, the masked SIMD command is included in a command set of the CPU of Armv8-A.

As an example of the masked SIMD command, "add z2.b, p0/M, z0.b, z1.b" is used, for example. "add z2.b, p0/M, z0.b, z1.b" defines that, among 64 pieces of data having an 8-bit width in z0 and 64 pieces of data having an 8-bit width in z1, pieces of data designated by the mask register are added to each other, and the arithmetic operation result is stored in z2.

"add z2.b, p0/M, z0.b, z1.b" defines, for example, if (i-th bit of the mask register is 1) $\{c_i=a_i+b_i;\}$. $a_i$ is an i-th 8-bit data in a case where z0 is divided with an 8-bit width. $b_i$ is an i-th 8-bit data in a case where z1 is divided with an 8-bit width. $c_i$ is an i-th 8-bit data in a case where z2 is divided with an 8-bit width.

For example, when the i-th bit of the mask register is 0, i-th 8-bit data of zmm0 and i-th 8-bit data of zmm1 are not added, and thus i-th 8-bit data of zmm2 is not updated. Next, the description continues with reference to FIG. 12.

Figure 12:
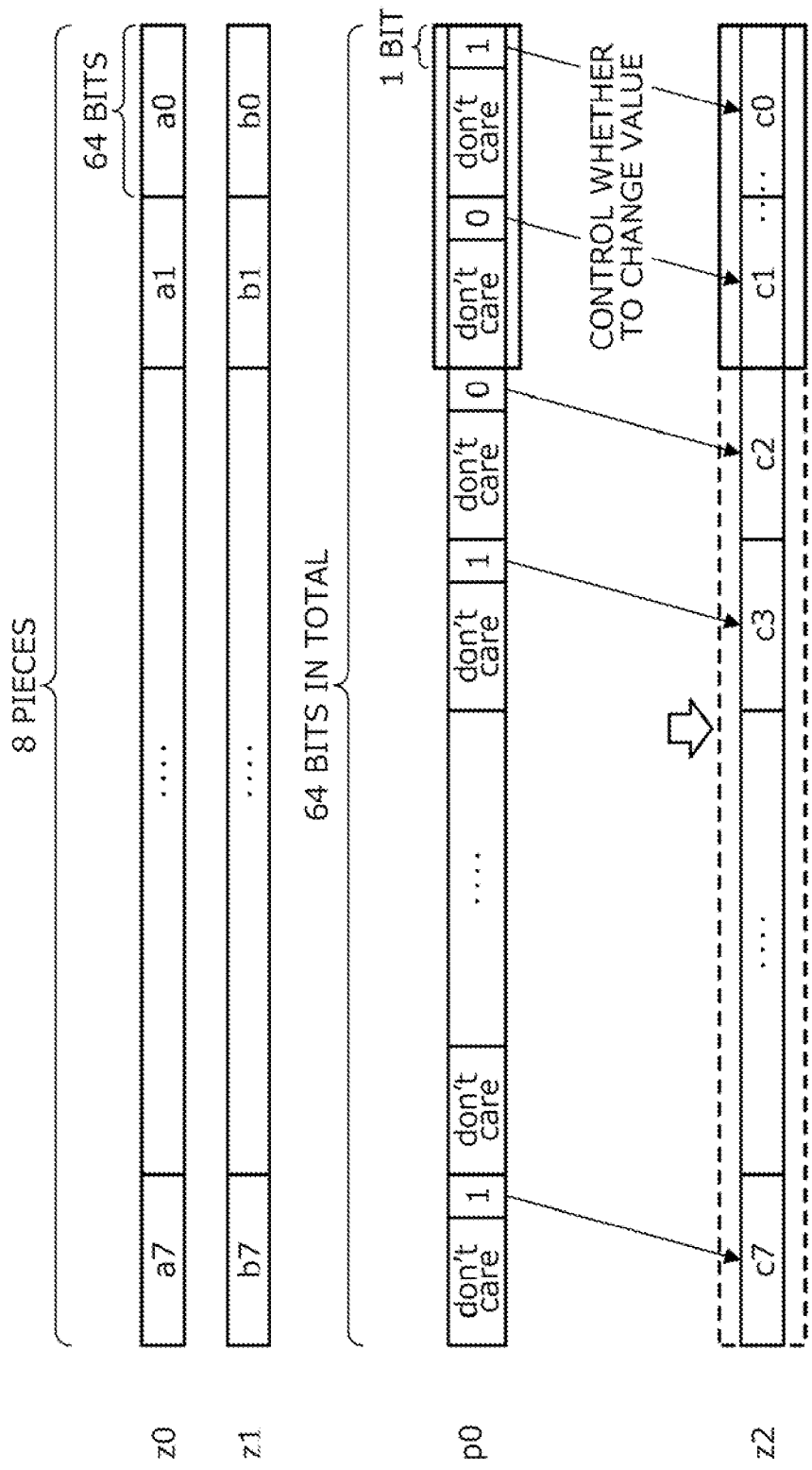
FIG. 12 is an explanatory diagram (part 6) illustrating the example of the SIMD command.

In FIG. 12, as an example of a masked SIMD command, "add z2.q, p0/M, z0.q, z1.q" is used, for example. "add z2.q, p0/M, z0.q, z1.q" defines that, among 8 pieces of data having a 64-bit width in z0 and 8 pieces of data having a 64-bit width in z1, pieces of data designated by a mask register are added, and the arithmetic operation result is stored in z2.

"add z2.q, p0/M, z0.q, z1.q" defines, for example, if (8×i-th bit of the mask register is 1) $\{c_i=a_i+b_i;\}$. $a_i$ is an i-th 64-bit data in a case where zmm0 is divided with a 64-bit width. $b_i$ is an i-th 64-bit data in a case where zmm1 is divided with a 64-bit width. $c_i$ is an i-th 64-bit data in a case where zmm2 is divided with a 64-bit width.

For example, when the 8×i-th bit of the mask register is 0, i-th 64-bit data of zmm0 and i-th 64-bit data of zmm1 are not added, and thus i-th 64-bit data of zmm2 is not updated.

In the same manner, as an example of the masked SIMD command, "add z2.h, p0/M, z0.h, z1.h", "add z2.d, p0/M, z0.d, z1.d", or the like is used, for example. Next, the description continues with reference to FIG. 13, and comparison between a masked SIMD command corresponding to a CPU of IA-64 and a masked SIMD command corresponding to a CPU of Armv8-A will be described.

Figure 13:
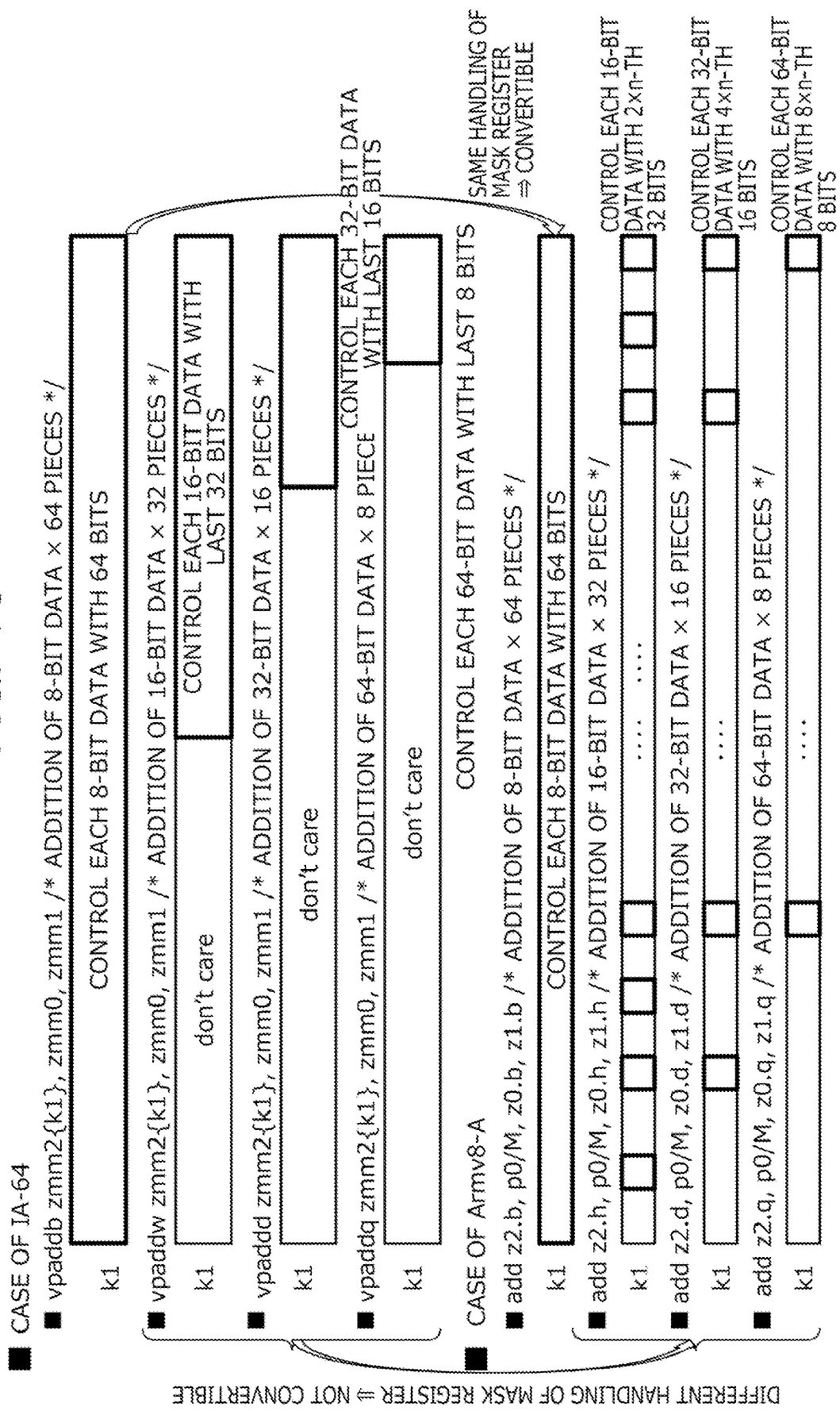
FIG. 13 is an explanatory diagram (part 7) illustrating the example of the SIMD command.

As illustrated in FIG. 13, a masked SIMD command "vpaddb zmm2 {k1}, zmm0, zmm1" and a masked SIMD command "add z2.b, p0/M, z0.b, z1.b" respectively refer to a mask register based on the same reference. Therefore, it is considered that the masked SIMD command "vpaddb zmm2 {k1}, zmm0, zmm1" and the masked SIMD command "add z2.b, p0/M, z0.b, z1.b" are convertible to each other. For example, it is considered that the arithmetic operation result of the masked SIMD command "vpaddb zmm2 {k1}, zmm0, zmm1" coincides with the arithmetic operation result of the masked SIMD command "add z2.b, p0/M, z0.b, z1.b".

By contrast, a masked SIMD command "vpaddq zmm2 {k1}, zmm0, zmm1" and a masked SIMD command "add z2.q, p0/M, z0.q, z1.q" respectively refer to mask registers based on different references. Therefore, it is considered that the masked SIMD command "vpaddq zmm2 {k1}, zmm0, zmm1" and the masked SIMD command "add z2.q, p0/M, z0.q, z1.q" are not convertible to each other. For example, it is considered that the arithmetic operation result of the masked SIMD command "vpaddq zmm2 {k1}, zmm0, zmm1" does not coincide with the arithmetic operation result of the masked SIMD command "add z2.q, p0/M, z0.q, z1.q".

In the same manner, a masked SIMD command "vpaddw zmm2 {k1}, zmm0, zmm1" and a masked SIMD command "add z2.h, p0/M, z0.h, z1.h" respectively refer to mask registers based on different references. Therefore, it is considered that the masked SIMD command "vpaddw zmm2 {k1}, zmm0, zmm1" and the masked SIMD command "add z2.h, p0/M, z0.h, z1.h" are not convertible to each other. For example, it is considered that the arithmetic operation result of the masked SIMD command "vpaddw zmm2 {k1}, zmm0, zmm1" does not coincide with the arithmetic operation result of the masked SIMD command "add z2.h, p0/M, z0.h, z1.h".

In the same manner, a masked SIMD command "vpaddd zmm2 {k1}, zmm0, zmm1" and a masked SIMD command "add z2.d, p0/M, z0.d, z1.d" respectively refer to mask registers based on different references. Therefore, it is considered that the masked SIMD command "vpaddd zmm2 {k1}, zmm0, zmm1" and the masked SIMD command "add z2.d, p0/M, z0.d, z1.d" are not convertible to each other. For example, it is considered that the arithmetic operation result of the masked SIMD command "vpaddd zmm2 {k1}, zmm0, zmm1" does not coincide with the arithmetic operation result of the masked SIMD command "add z2.d, p0/M, z0.d, z1.d".

Next, an example of a load command will be described with reference to FIGS. 14 and 15.

Figure 15:
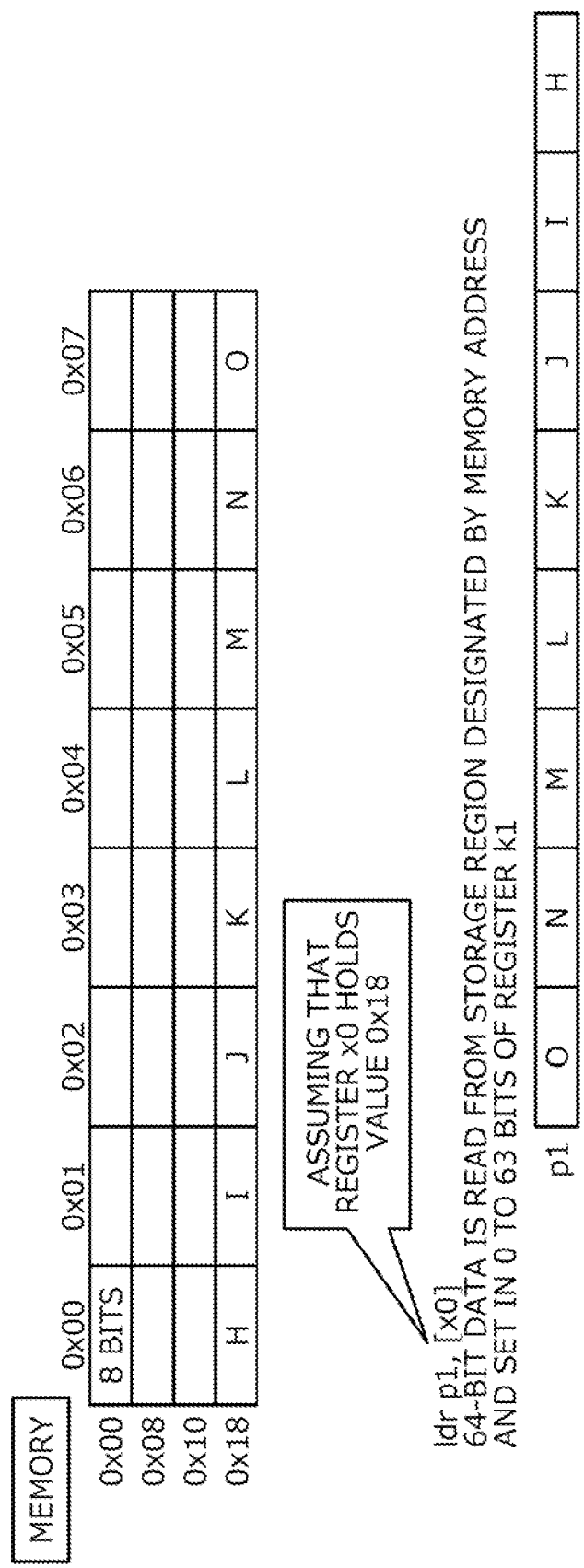
FIG. 15 is an explanatory diagram (part 2) illustrating the example of the load command.

FIGS. 14 and 15 are explanatory diagrams illustrating the example of the load command. An example of a load command corresponding to a CPU of IA-64 will be described with reference to FIG. 14. As the example of the load command corresponding to the CPU of IA-64, "kmovb k1, [0x09]" is used, for example. [0x09] is a memory address. For example, the load command "kmovb k1, [0x09]" defines that 8-bit data is read from a storage region designated by the memory address and the read 8-bit data is set in 0-th to 7-th bits of the mask register k1. For example, the load command "kmovb k1, [0x09]" defines that 0 is set in 8-th to 63-th bits of the mask register k1.

As the example of the load command corresponding to the CPU of IA-64, "kmovw k1, [0x10]" is used, for example. [0x10] is a memory address. For example, the load command "kmovw k1, [0x10]" defines that 16-bit data is read from a storage region designated by the memory address and the read 16-bit data is set in 0-th to 15-th bits of the mask register k1. For example, the load command "kmovw k1, [0x10]" defines that 0 is set in 16-th to 63-th bits of the mask register k1.

As the example of the load command corresponding to the CPU of IA-64, "kmovd k1, [0x14]" is used, for example. [0x14] is a memory address. For example, the load command "kmovd k1, [0x14]" defines that 32-bit data is read from a storage region designated by the memory address and the read 32-bit data is set in 0-th to 31-th bits of the mask register k1. For example, the load command "kmovd k1, [0x14]" defines that 0 is set in 32-th to 63-th bits of the mask register k1.

As the example of the load command corresponding to the CPU of IA-64, "kmovq k1, [0x18]" is used, for example. [0x18] is a memory address. For example, the load command "kmovq k1, [0x18]" defines that 64-bit data is read from a storage region designated by the memory address, and the read 64-bit data is set in 0-th to 63-th bits of the mask register k1. In this manner, in IA-64, there are a plurality of load commands for setting bit data having lengths different from each other in the mask register k1. Next, the description continues with reference to FIG. 15.

An example of a load command corresponding to a CPU of Armv8-A will be described with reference to FIG. 15. As the example of the load command corresponding to the CPU of Armv8-A, "ldr p1, [x0]" is used, for example. The load command "ldr p1, [x0]" defines that 64-bit data is read from a storage region designated by a memory address, and the read 64-bit data is set in 0-th to 63-th bits of the mask register k1. In this manner, in Armv8-A, there is a load command for setting 64-bit data in the mask register k1.

From the above, when converting a masked SIMD command "vpadd (b|w|d|q)" among assembler source codes of IA-64 executable by the CPU of IA-64, it is considered preferable to consider a context of the assembler source code. In the same manner, when converting a load command "kmov (b|w|d|q)" among the assembler source codes of IA-64 executable by the CPU of IA-64, it is considered preferable to consider a context of the assembler source code. For example, it is preferable to convert the masked SIMD command "vpadd (b|w|d|q)" and the load command "kmov (b|w|d|g)" in consideration of a state of a value of a mask register in the assembler source code of IA-64.

Next, a first operation example of the command conversion apparatus 100 will be described with reference to FIGS. 16 to 32.

Figure 16:
FIG. 16 is an explanatory diagram (part 1) illustrating a first operation example of the command conversion apparatus.

FIGS. 16 to 32 are explanatory diagrams illustrating the first operation example of the command conversion apparatus 100. In FIG. 16, the command conversion apparatus 100 acquires an assembler source code 1600 of IA-64 as a conversion target. For convenience, in the example illustrated in FIG. 16, the description is omitted for a command line, that is neither a load command nor a masked SIMD command, in the assembler source code 1600.

For example, in the example in FIG. 16, a load command and a line number of the load command are illustrated in association with each other, in the assembler source code 1600. FIG. 16 illustrates an example in which a masked SIMD command and a line number of the masked SIMD command are associated with each other, in the assembler source code 1600. In the following description, the masked SIMD command is simply referred to as an "SIMD command" in some cases. Next, the description continues with reference to FIGS. 17 and 18.

In FIGS. 17 and 18, the command conversion apparatus 100 performs preparation for converting the assembler source code 1600 of IA-64 into an assembler source code of Armv8-A executable by a CPU of Armv8-A. For example, the command conversion apparatus 100 analyzes the assembler source code 1600 of IA-64. For example, the command conversion apparatus 100 analyzes the assembler source code 1600 of IA-64 in order from a command line at a head. Based on the analysis result, the command conversion apparatus 100 generates and updates the line information management table 400 and the mask register information management table 500.

For example, as illustrated in a table 1700 in FIG. 17, the command conversion apparatus 100 stores line=10, ID=0, mask bit width=64, and kind=LD in the line information management table 400 in association with each other, for a load command of line=10. The ID is an ID allocated to a mask register that is a target of the load command of line=10. For the load command of line=10, the command conversion apparatus 100 stores ID=0 of the mask register, used[0]=1, and Final_point[0]=10 in the mask register information management table 500 in association with each other.

For example, as illustrated in the table 1700 in FIG. 17, the command conversion apparatus 100 stores line=11, ID=0, mask bit width=64, and kind=SIMD in the line information management table 400 in association with each other, for an SIMD command of line=11. The ID is an ID allocated to a mask register that is a target of the SIMD command of line=11. Since the mask bit width requested by the SIMD command of line=11 coincides with the immediately before mask bit width, the command conversion apparatus 100 completes the process without updating Final_point[0] of the mask register information management table 500.

In the same manner, as illustrated in the table 1700 in FIG. 17, the command conversion apparatus 100 updates the line information management table 400 and the mask register information management table 500, for another load command and another SIMD command. As a result, the line information management table 400 and the mask register information management table 500 are in states illustrated in FIG. 18. Next, the description continues with reference to FIGS. 19 to 32.

In FIGS. 19 to 32, the command conversion apparatus 100 uses the line information management table 400 and the mask register information management table 500 to convert each command line included in the assembler source code 1600 into a command line defined in Armv8-A. By inserting the converted command line into an empty assembler source code of Armv8-A, the command conversion apparatus 100 generates an assembler source code of Armv8-A.

For convenience, description of a case where the command conversion apparatus 100 converts a command line that is neither a load command nor an SIMD command will be omitted in the following description. In the following, a case where the command conversion apparatus 100 converts a load command or an SIMD command will be described.

For example, as illustrated in a table 1900 in FIG. 19, the command conversion apparatus 100 sets line=10 as a processing target. By referring to the line information management table 400 illustrated in FIG. 18 and the mask register information management table 500 illustrated in FIG. 18, the command conversion apparatus 100 determines that line=10 has kind=LD and line=Final_point[0]. With line=Final_point[0], the command conversion apparatus 100 determines that a subsequent command line is normally executable without saving a value of a mask register with ID=0, and determines that a saving command for saving the value of the mask register is not desirable. In some cases, a mask register with ID=x is referred to as a "mask register #x" in the drawings. x is an integer equal to or greater than 0.

The command conversion apparatus 100 converts a load command of line=10 into a load command defined in Armv8-A. The converted load command is a command line that implements the same function as a function of the load command of line=10, for defining that 64 bits are read from [memory address], for example. The command conversion apparatus 100 inserts the converted load command into the assembler source code of Armv8-A. For example, as illustrated in FIG. 20, the command conversion apparatus 100 stores State[0]=64 in the mask register information management table 500. Next, the description continues with reference to FIGS. 21 and 22.

For example, as illustrated in a table 2100 in FIG. 21, the command conversion apparatus 100 sets line=11 as a processing target. By referring to the line information management table 400 illustrated in FIG. 20 and the mask register information management table 500 illustrated in FIG. 20, the command conversion apparatus 100 determines that line=11 has kind=SIMD and line>Final_point[0]. With line>Final_point[0], the command conversion apparatus 100 determines that an SIMD command is normally executable without changing the mask bit width of the mask register with ID=0.

The command conversion apparatus 100 converts an SIMD command of line=11 into an SIMD command defined in Armv8-A. The converted SIMD command is a command line that implements the same function as a function of the SIMD command of line=11, for defining data addition of 8-bit×64 pieces. The command conversion apparatus 100 inserts the converted SIMD command into an assembler source code of Armv8-A. For example, as illustrated in FIG. 22, since the mask bit width of the mask register with ID=0 is not changed, the command conversion apparatus 100 does not have to update State[0]=64 in the mask register information management table 500. Next, the description continues with reference to FIGS. 23 and 24.

For example, as illustrated in a table 2300 in FIG. 23, the command conversion apparatus 100 sets line=120 as a processing target. By referring to the line information management table 400 illustrated in FIG. 22 and the mask register information management table 500 illustrated in FIG. 22, the command conversion apparatus 100 determines that line=120 has kind=SIMD and line>Final_point[0]. With line>Final_point[0], the command conversion apparatus 100 determines that an SIMD command is normally executable without changing the mask bit width of the mask register with ID=0.

The command conversion apparatus 100 converts an SIMD command of line=120 into an SIMD command defined in Armv8-A. The converted SIMD command is a command line that implements the same function as a function of the SIMD command of line=120, for defining data addition of 8-bit×64 pieces. The command conversion apparatus 100 inserts the converted SIMD command into an assembler source code of Armv8-A. For example, as illustrated in FIG. 24, since the mask bit width of the mask register with ID=0 is not changed, the command conversion apparatus 100 does not have to update State[0]=64 in the mask register information management table 500. Next, the description continues with reference to FIGS. 25 and 26.

For example, as illustrated in a table 2500 in FIG. 25, the command conversion apparatus 100 sets line=121 as a processing target. By referring to the line information management table 400 illustrated in FIG. 24 and the mask register information management table 500 illustrated in FIG. 24, the command conversion apparatus 100 determines that line=121 has kind=LD and line=Final_point[1]. With line=Final_point[1], the command conversion apparatus 100 determines that a subsequent command line is normally executable without saving a value of a mask register with ID=1, and determines that a saving command for saving the value of the mask register is not desirable.

The command conversion apparatus 100 converts a load command of line=121 into a load command defined in Armv8-A. The converted load command is a command line that implements the same function as a function of the load command of line=121, for defining that 64 bits are read from [memory address], for example. The command conversion apparatus 100 inserts the converted load command into the assembler source code of Armv8-A. For example, as illustrated in FIG. 26, the command conversion apparatus 100 stores State[1]=64 in the mask register information management table 500. Next, the description continues with reference to FIGS. 27 and 28.

For example, as illustrated in a table 2700 in FIG. 27, the command conversion apparatus 100 sets line=122 as a processing target. By referring to the line information management table 400 illustrated in FIG. 26 and the mask register information management table 500 illustrated in FIG. 26, the command conversion apparatus 100 determines that line=122 has kind=SIMD and line>Final_point[1]. With line>Final_point[1], the command conversion apparatus 100 determines that an SIMD command is normally executable without changing the mask bit width of the mask register with ID=1.

The command conversion apparatus 100 converts an SIMD command of line=122 into an SIMD command defined in Armv8-A. The converted SIMD command is a command line that implements the same function as a function of the SIMD command of line=122, for defining data addition of 8-bit×64 pieces. The command conversion apparatus 100 inserts the converted SIMD command into an assembler source code of Armv8-A. For example, as illustrated in FIG. 28, since the mask bit width of the mask register with ID=1 is not changed, the command conversion apparatus 100 does not have to update State[1]=64 in the mask register information management table 500. Next, the description continues with reference to FIGS. 29 and 30.

For example, as illustrated in a table 2900 in FIG. 29, the command conversion apparatus 100 sets line=450 as a processing target. By referring to the line information management table 400 illustrated in FIG. 28 and the mask register information management table 500 illustrated in FIG. 28, the command conversion apparatus 100 determines that line=450 has kind=SIMD and line>Final_point[0]. With line>Final_point[0], the command conversion apparatus 100 determines that an SIMD command is normally executable without changing the mask bit width of the mask register with ID=0.

The command conversion apparatus 100 converts an SIMD command of line=450 into an SIMD command defined in Armv8-A. The converted SIMD command is a command line that implements the same function as a function of the SIMD command of line=450, for defining data addition of 8-bit×64 pieces. The command conversion apparatus 100 inserts the converted SIMD command into an assembler source code of Armv8-A. For example, as illustrated in FIG. 30, since the mask bit width of the mask register with ID=0 is not changed, the command conversion apparatus 100 does not have to update State[0]=64 in the mask register information management table 500. Next, the description continues with reference to FIGS. 31 and 32.

For example, as illustrated in a table 3100 in FIG. 31, the command conversion apparatus 100 sets line=451 as a processing target. By referring to the line information management table 400 illustrated in FIG. 30 and the mask register information management table 500 illustrated in FIG. 30, the command conversion apparatus 100 determines that line=451 has kind=SIMD and line>Final_point[1]. With line>Final_point[1], the command conversion apparatus 100 determines that an SIMD command is normally executable without changing the mask bit width of the mask register with ID=1.

The command conversion apparatus 100 converts an SIMD command of line=451 into an SIMD command defined in Armv8-A. The converted SIMD command is a command line that implements the same function as a function of the SIMD command of line=451, for defining data addition of 8-bit×64 pieces. The command conversion apparatus 100 inserts the converted SIMD command into an assembler source code of Armv8-A. For example, as illustrated in FIG. 32, since the mask bit width of the mask register with ID=1 is not changed, the command conversion apparatus 100 does not have to update State[1]=64 in the mask register information management table 500.

In this manner, the command conversion apparatus 100 converts each command line included in the assembler source code 1600 into a command line defined in Armv8-A, and inserts the command line into an assembler source code of Armv8-A. Accordingly, the command conversion apparatus 100 may correctly generate the assembler source code of Armv8-A. Therefore, the command conversion apparatus 100 may reduce a work burden on a user who obtains the assembler source code of Armv8-A.

As compared with a case where an assembler source code of Armv8-A is manually generated, the command conversion apparatus 100 may reduce the probability that a bug is included in the assembler source code of Armv8-A. The command conversion apparatus 100 may easily suppress a use of an assembler source code of Armv8-A that is executable but includes a bug causing an error in an execution result, by manually generating the assembler source code of Armv8-A.

Here, the case where the command conversion apparatus 100 converts the assembler source code 1600 of IA-64 into the assembler source code of Armv8-A is described, and the embodiment is not limited thereto. For example, the command conversion apparatus 100 may convert an assembler source code of IA-64 into an assembler source code of Armv8-A, in some cases.

For example, the command conversion apparatus 100 may convert an assembler source code of AMD into an assembler source code of Armv8-A, in some cases. For example, the command conversion apparatus 100 may convert an assembler source code of Armv8-A into an assembler source code of AMD, in some cases.

For example, the command conversion apparatus 100 may convert an assembler source code corresponding to a certain type of CPU into an assembler source code corresponding to another type of CPU having a mask register use rule different from a mask register use rule of the certain type of CPU, in some cases.

Next, a second operation example of the command conversion apparatus 100 will be described with reference to FIGS. 33 to 49.

Figure 33:
FIG. 33 is an explanatory diagram (part 1) illustrating a second operation example of the command conversion apparatus.

FIGS. 33 to 49 are explanatory diagrams illustrating the second operation example of the command conversion apparatus 100. In FIG. 33, the command conversion apparatus 100 acquires an assembler source code 3300 of IA-64 as a conversion target. For convenience, in the example illustrated in FIG. 33, the description is omitted for a command line, that is neither a load command nor a masked SIMD command, in the assembler source code 3300.

For example, in the example in FIG. 33, a load command and a line number of the load command are illustrated in association with each other, in the assembler source code 3300. FIG. 33 illustrates an example in which a masked SIMD command and a line number of the masked SIMD command are associated with each other, in the assembler source code 3300. In the following description, the masked SIMD command is simply referred to as an "SIMD command" in some cases. Next, the description continues with reference to FIGS. 34 and 35.

In FIGS. 34 and 35, the command conversion apparatus 100 performs preparation for converting the assembler source code 3300 of IA-64 into an assembler source code of Armv8-A executable by a CPU of Armv8-A. For example, the command conversion apparatus 100 analyzes the assembler source code 3300 of IA-64. For example, the command conversion apparatus 100 analyzes the assembler source code 3300 of IA-64 in order from a command line at a head. Based on the analysis result, the command conversion apparatus 100 generates and updates the line information management table 400 and the mask register information management table 500.

For example, as illustrated in a table 3400 in FIG. 34, the command conversion apparatus 100 stores line=10, ID=0, mask bit width=64, and kind=LD in the line information management table 400 in association with each other, for a load command of line=10. The ID is an ID allocated to a mask register that is a target of the load command of line=10. For the load command of line=10, the command conversion apparatus 100 stores ID=0 of the mask register, used[0]=1, and Final_point[0]=10 in the mask register information management table 500 in association with each other.

For example, as illustrated in the table 3400 in FIG. 34, the command conversion apparatus 100 stores line=11, ID=0, mask bit width=16, and kind=SIMD in the line information management table 400 in association with each other, for an SIMD command of line=11. The ID is an ID allocated to a mask register that is a target of the SIMD command of line=11. The command conversion apparatus 100 determines that the mask bit width requested by the SIMD command of line=11 does not coincide with the immediately before mask bit width. Therefore, the command conversion apparatus 100 updates Final_point[0]=11 in the mask register information management table 500.

For example, as illustrated in the table 3400 in FIG. 34, the command conversion apparatus 100 stores line=120, ID=0, mask bit width=64, and kind=SIMD in the line information management table 400 in association with each other, for an SIMD command of line=120. The ID is an ID allocated to a mask register that is a target of the SIMD command of line=120. The command conversion apparatus 100 determines that the mask bit width requested by the SIMD command of line=120 does not coincide with the immediately before mask bit width. Therefore, the command conversion apparatus 100 updates Final_point[0]=120 in the mask register information management table 500.

For example, as illustrated in the table 3400 in FIG. 34, the command conversion apparatus 100 stores line=121, ID=1, mask bit width=64, and kind=LD in the line information management table 400 in association with each other, for a load command of line=121. The ID is an ID allocated to a mask register that is a target of the load command of line=121. For the load command of line=121, the command conversion apparatus 100 stores ID=1 of the mask register, used[1]=1, and Final_point[1]=121 in the mask register information management table 500 in association with each other.

For example, as illustrated in the table 3400 in FIG. 34, the command conversion apparatus 100 stores line=122, ID=1, mask bit width=16, and kind=SIMD in the line information management table 400 in association with each other, for an SIMD command of line=122. The ID is an ID allocated to a mask register that is a target of the SIMD command of line=122. The command conversion apparatus 100 determines that the mask bit width requested by the SIMD command of line=122 does not coincide with the immediately before mask bit width. Therefore, the command conversion apparatus 100 updates Final_point[1]=122 in the mask register information management table 500.

For example, as illustrated in the table 3400 in FIG. 34, the command conversion apparatus 100 stores line=450, ID=0, mask bit width=64, and kind=SIMD in the line information management table 400 in association with each other, for an SIMD command of line=450. The ID is an ID allocated to a mask register that is a target of the SIMD command of line=450. Since the mask bit width requested by the SIMD command of line=450 coincides with the immediately before mask bit width, the command conversion apparatus 100 does not have to update Final_point[0] of the mask register information management table 500.

For example, as illustrated in the table 3400 in FIG. 34, the command conversion apparatus 100 stores line=451, ID=1, mask bit width=64, and kind=SIMD in the line information management table 400 in association with each other, for an SIMD command of line=451. The ID is an ID allocated to a mask register that is a target of the SIMD command of line=451. The command conversion apparatus 100 determines that the mask bit width requested by the SIMD command of line=451 does not coincide with the immediately before mask bit width. Therefore, the command conversion apparatus 100 updates Final_point[1]=451 in the mask register information management table 500.

The command conversion apparatus 100 determines that a mask register of used[i]=0 is an empty mask register, and stores Reserved[i]=0 in the mask register information management table 500, for the mask register of used[i]=0. As a result, the line information management table 400 and the mask register information management table 500 are in states illustrated in FIG. 35. Next, the description continues with reference to FIGS. 36 to 49.

In FIGS. 36 to 49, the command conversion apparatus 100 uses the line information management table 400 and the mask register information management table 500 to convert each command line included in the assembler source code 3300 into a command line defined in Armv8-A. By inserting the converted command line into an empty assembler source code of Armv8-A, the command conversion apparatus 100 generates an assembler source code of Armv8-A.

For convenience, description of a case where the command conversion apparatus 100 converts a command line that is neither a load command nor an SIMD command will be omitted in the following description. In the following, a case where the command conversion apparatus 100 converts a load command or an SIMD command will be described.

For example, as illustrated in a table 3600 in FIG. 36, the command conversion apparatus 100 sets line=10 as a processing target. By referring to the line information management table 400 illustrated in FIG. 35 and the mask register information management table 500 illustrated in FIG. 35, the command conversion apparatus 100 determines that line=10 has kind=LD. By referring to the line information management table 400 illustrated in FIG. 35 and the mask register information management table 500 illustrated in FIG. 35, the command conversion apparatus 100 determines that line=10 has line<=Final_point[0]. By referring to the line information management table 400 illustrated in FIG. 35 and the mask register information management table 500 illustrated in FIG. 35, the command conversion apparatus 100 determines that line=10 has line !=Final_point[0]. With line !=Final_point[0], the command conversion apparatus 100 determines that it is preferable to save a value of a mask register with ID=0.

The command conversion apparatus 100 converts a load command of line=10 into a load command defined in Armv8-A and a saving command for saving the value of the mask register. The converted load command is a command line that implements the same function as a function of the load command of line=10, for defining that 64 bits are read from [memory address], for example. The saving command defines that a mask register with used !=1 and Reserved[ID] =−1 is set as a reserve register, and the value of the mask register with ID=0 is saved to the set reserve register. In the example illustrated in FIG. 35, a mask register with ID=2 is set as the reserve register.

The command conversion apparatus 100 inserts the converted load command and saving command into an assembler source code of Armv8-A. For example, as illustrated in FIG. 37, the command conversion apparatus 100 sets Reserve[0]=2 and Reserved[2]=1 in the mask register information management table 500, for the mask register with ID=2 set in the reserve register. The command conversion apparatus 100 stores State[0]=64 in the mask register information management table 500. Next, the description continues with reference to FIGS. 38 and 39.

For example, as illustrated in a table 3800 in FIG. 38, the command conversion apparatus 100 sets line=11 as a processing target. By referring to the line information management table 400 illustrated in FIG. 37 and the mask register information management table 500 illustrated in FIG. 37, the command conversion apparatus 100 determines that line=11 has kind=SIMD. By referring to the line information management table 400 illustrated in FIG. 37 and the mask register information management table 500 illustrated in FIG. 37, the command conversion apparatus 100 determines that line<=Final_point[0] and line !=Final_point[0] are satisfied.

By referring to the line information management table 400 illustrated in FIG. 37 and the mask register information management table 500 illustrated in FIG. 37, the command conversion apparatus 100 determines that line=11 is state !=State[0]. With state !=State[0], the command conversion apparatus 100 determines that it is preferable to change the mask bit width of the mask register with ID=0.

The command conversion apparatus 100 converts an SIMD command of line=11 into a change command for changing the mask bit width of the mask register with ID=0 and an SIMD command defined in Armv8-A. The converted SIMD command is a command line that implements the same function as a function of the SIMD command of line=11, for defining data addition of 32-bit×16 pieces. The change command defines that a mask bit width is changed from 64 bits to 32 bits.

The command conversion apparatus 100 inserts the converted change command and SIMD command into an assembler source code of Armv8-A. For example, as illustrated in FIG. 39, since the mask bit width of the mask register with ID=0 is changed, the command conversion apparatus 100 updates State[0]=state=16 in the mask register information management table 500. Next, the description continues with reference to FIGS. 40 and 41.

For example, as illustrated in a table 4000 in FIG. 40, the command conversion apparatus 100 sets line=120 as a processing target. By referring to the line information management table 400 illustrated in FIG. 39 and the mask register information management table 500 illustrated in FIG. 39, the command conversion apparatus 100 determines that line=120 has kind=SIMD. By referring to the line information management table 400 illustrated in FIG. 39 and the mask register information management table 500 illustrated in FIG. 39, the command conversion apparatus 100 determines that line<=Final_point[0] and line=Final_point [0] are satisfied. With line=Final_point[0], the command conversion apparatus 100 determines that the reserve register is releasable.

By referring to the line information management table 400 illustrated in FIG. 39 and the mask register information management table 500 illustrated in FIG. 39, the command conversion apparatus 100 determines that line=120 has state !=State[0]. With state !=State[0], the command conversion apparatus 100 determines that it is preferable to change the mask bit width of the mask register with ID=0. For example, with state=64 and State[0] !=64, the command conversion apparatus 100 determines that it is preferable to restore the value of the mask register having ID=0 with the saved value.

The command conversion apparatus 100 converts an SIMD command of line=120 into a change command for changing the mask bit width of the mask register with ID=0 and an SIMD command defined in Armv8-A. The converted SIMD command is a command line that implements the same function as a function of the SIMD command of line=120, for defining data addition of 8-bit×64 pieces. The change command is a restoration command for restoring the value of the mask register with ID=0 to the saved value.

The command conversion apparatus 100 inserts the converted change command and SIMD command into an assembler source code of Armv8-A. For example, as illustrated in FIG. 41, since the mask bit width of the mask register with ID=0 is changed, the command conversion apparatus 100 updates State[0]=state=64 in the mask register information management table 500. By changing Reserved[Reserve[0]]=−1 and 2 from Reserve[0], the command conversion apparatus 100 releases the reserve register. Next, the description continues with reference to FIGS. 42 and 43.

For example, as illustrated in a table 4200 in FIG. 42, the command conversion apparatus 100 sets line=121 as a processing target. By referring to the line information management table 400 illustrated in FIG. 41 and the mask register information management table 500 illustrated in FIG. 41, the command conversion apparatus 100 determines that line=121 has kind=LD. By referring to the line information management table 400 illustrated in FIG. 41 and the mask register information management table 500 illustrated in FIG. 41, the command conversion apparatus 100 determines that line=121 has line<=Final_point[1]. By referring to the line information management table 400 illustrated in FIG. 41 and the mask register information management table 500 illustrated in FIG. 41, the command conversion apparatus 100 determines that line=121 has line !=Final_point[1]. With line !=Final_point[1], the command conversion apparatus 100 determines that it is preferable to save a value of a mask register with ID=1.

The command conversion apparatus 100 converts a load command of line=121 into a load command defined in Armv8-A and a saving command for saving the value of the mask register. The converted load command is a command line that implements the same function as a function of the load command of line=121, for defining that 64 bits are read from [memory address], for example. The saving command defines that a mask register with used !=1 and Reserved[ID]

=−1 is set as a reserve register, and the value of the mask register with ID=1 is saved to the set reserve register. In the example illustrated in FIG. 42, a mask register with ID=2 is set as the reserve register.

The command conversion apparatus 100 inserts the converted load command and saving command into an assembler source code of Armv8-A. For example, as illustrated in FIG. 43, the command conversion apparatus 100 sets Reserve[1]=2 and Reserved[2]=1 in the mask register information management table 500, for the mask register with ID=2 set in the reserve register. The command conversion apparatus 100 stores State[1]=64 in the mask register information management table 500. Next, the description continues with reference to FIGS. 44 and 45.

For example, as illustrated in a table 4400 in FIG. 44, the command conversion apparatus 100 sets line=122 as a processing target. By referring to the line information management table 400 illustrated in FIG. 43 and the mask register information management table 500 illustrated in FIG. 43, the command conversion apparatus 100 determines that line=122 has kind=SIMD. By referring to the line information management table 400 illustrated in FIG. 43 and the mask register information management table 500 illustrated in FIG. 43, the command conversion apparatus 100 determines that line<=Final_point[1] and line !=Final_point [1] are satisfied.

By referring to the line information management table 400 illustrated in FIG. 43 and the mask register information management table 500 illustrated in FIG. 43, the command conversion apparatus 100 determines that line=122 has state !=State[1]. With state !=State[1], the command conversion apparatus 100 determines that it is preferable to change the mask bit width of the mask register with ID=1.

The command conversion apparatus 100 converts an SIMD command of line=122 into a change command for changing the mask bit width of the mask register with ID=1 and an SIMD command defined in Armv8-A. The converted SIMD command is a command line that implements the same function as a function of the SIMD command of line=122, for defining data addition of 32-bit×16 pieces. The change command defines that a mask bit width is changed from 64 bits to 32 bits.

The command conversion apparatus 100 inserts the converted change command and SIMD command into an assembler source code of Armv8-A. For example, as illustrated in FIG. 45, since the mask bit width of the mask register with ID=1 is changed, the command conversion apparatus 100 updates State[1]=state=16 in the mask register information management table 500. Next, the description continues with reference to FIGS. 46 and 47.

For example, as illustrated in a table 4600 in FIG. 46, the command conversion apparatus 100 sets line=450 as a processing target. By referring to the line information management table 400 illustrated in FIG. 45 and the mask register information management table 500 illustrated in FIG. 45, the command conversion apparatus 100 determines that line=450 has kind=SIMD. By referring to the line information management table 400 illustrated in FIG. 45 and the mask register information management table 500 illustrated in FIG. 45, the command conversion apparatus 100 determines that line>Final_point[0] is satisfied. With line>Final_point[0], the command conversion apparatus 100 determines that an SIMD command is normally executable without changing the mask bit width of the mask register with ID=0.

The command conversion apparatus 100 converts an SIMD command of line=450 into an SIMD command defined in Armv8-A. The converted SIMD command is a command line that implements the same function as a function of the SIMD command of line=450, for defining data addition of 8-bit×64 pieces. The command conversion apparatus 100 inserts the converted SIMD command into an assembler source code of Armv8-A. For example, as illustrated in FIG. 47, since the mask bit width of the mask register with ID=0 is not changed, the command conversion apparatus 100 does not have to update State[0]=64 in the mask register information management table 500. Next, the description continues with reference to FIGS. 48 and 49.

For example, as illustrated in a table 4800 in FIG. 48, the command conversion apparatus 100 sets line=451 as a processing target. By referring to the line information management table 400 illustrated in FIG. 47 and the mask register information management table 500 illustrated in FIG. 47, the command conversion apparatus 100 determines that line=451 has kind=SIMD. By referring to the line information management table 400 illustrated in FIG. 47 and the mask register information management table 500 illustrated in FIG. 47, the command conversion apparatus 100 determines that line<=Final_point[1] and line=Final_point [1] are satisfied. With line=Final_point[1], the command conversion apparatus 100 determines that the reserve register is releasable.

By referring to the line information management table 400 illustrated in FIG. 47 and the mask register information management table 500 illustrated in FIG. 47, the command conversion apparatus 100 determines that line=451 has state !=State[1]. With state !=State[1], the command conversion apparatus 100 determines that it is preferable to change the mask bit width of the mask register with ID=1. For example, with state=64 and State[1] !=64, the command conversion apparatus 100 determines that it is preferable to restore the value of the mask register having ID=1 with the saved value.

The command conversion apparatus 100 converts an SIMD command of line=451 into a change command for changing the mask bit width of the mask register with ID=1 and an SIMD command defined in Armv8-A. The converted SIMD command is a command line that implements the same function as a function of the SIMD command of line=451, for defining data addition of 8-bit×64 pieces. The change command is a restoration command for restoring the value of the mask register with ID=1 to the saved value.

The command conversion apparatus 100 inserts the converted change command and SIMD command into an assembler source code of Armv8-A. For example, as illustrated in FIG. 49, since the mask bit width of the mask register with ID=1 is changed, the command conversion apparatus 100 updates State[1]=state=64 in the mask register information management table 500. By changing Reserved[Reserve[1]]=−1 and deleting 2 from Reserve[1], the command conversion apparatus 100 releases the reserve register.

In this manner, the command conversion apparatus 100 converts each command line included in the assembler source code 3300 into a command line defined in Armv8-A, and inserts the command line into an assembler source code of Armv8-A. Accordingly, the command conversion apparatus 100 may correctly generate the assembler source code of Armv8-A. Therefore, the command conversion apparatus 100 may reduce a work burden on a user who obtains the assembler source code of Armv8-A.

As compared with a case where an assembler source code of Armv8-A is manually generated, the command conversion apparatus 100 may reduce the probability that a bug is included in the assembler source code of Armv8-A. The command conversion apparatus 100 may easily suppress a use of an assembler source code of Armv8-A that is executable but includes a bug causing an error in an execution result, by manually generating the assembler source code of Armv8-A.

Since the command conversion apparatus 100 may appropriately release the reserve register, it is possible to suppress a shortage of the empty mask register. Accordingly, the command conversion apparatus 100 may reduce the probability that a processing efficiency of the assembler source code of Armv8-A decreases since the value of the mask register is saved to a storage region in a memory instead of another mask register, due to the shortage of the empty mask register.

For example, when the mask bit width of the mask register is changed from 64 bits to another mask bit width such as 32 bits, 16 bits, or 8 bits, it is difficult to return the mask bit width of the mask register to 64 bits, based on the changed mask register. Therefore, it is preferable that the value of the mask register in a state in which the mask bit width is 64 bits is saved in another storage region. It is preferable that the saving destination storage region is an empty mask register having a higher access speed than an access speed of the storage region in the memory.

In a case where no empty mask register remains, the value of the mask register in a state in which the mask bit width is 64 bits is saved to the storage region in the memory. In this case, the processing efficiency of the assembler source code of Armv8-A decreases. By contrast, the command conversion apparatus 100 may appropriately release the reserve register and reduce the probability that the processing efficiency of the assembler source code of Armv8-A decreases.

Here, the case where the command conversion apparatus 100 converts the assembler source code 3300 of IA-64 into the assembler source code of Armv8-A is described, and the embodiment is not limited thereto. For example, the command conversion apparatus 100 may convert an assembler source code of IA-64 into an assembler source code of Armv8-A, in some cases.

For example, the command conversion apparatus 100 may convert an assembler source code of AMD into an assembler source code of Armv8-A, in some cases. For example, the command conversion apparatus 100 may convert an assembler source code of Armv8-A into an assembler source code of AMD, in some cases.

For example, the command conversion apparatus 100 may convert an assembler source code corresponding to a certain type of CPU into an assembler source code corresponding to another type of CPU having a mask register use rule different from a mask register use rule of the certain type of CPU, in some cases.

Here, the case where the command conversion apparatus 100 determines whether or not a reserve register is releasable, and releases the reserve register when the reserve register is releasable is described, and the embodiment is not limited thereto. For example, the command conversion apparatus 100 may not determine whether or not the reserve register is releasable, and may not release the reserve register, in some cases. Even in this case, the command conversion apparatus 100 may reduce a work burden on a user who obtains an assembler source code of Armv8-A. The command conversion apparatus 100 may reduce a probability that a bug is included in the assembler source code of Armv8-A.

(Overall Process Procedure)

Next, an example of an overall process procedure executed by the command conversion apparatus 100 will be described with reference to FIG. 50. The overall process is implemented, for example, by the CPU 301, the storage region such as the memory 302 or the recording medium 305, and the network I/F 303 illustrated in FIG. 3.

Figure 50:
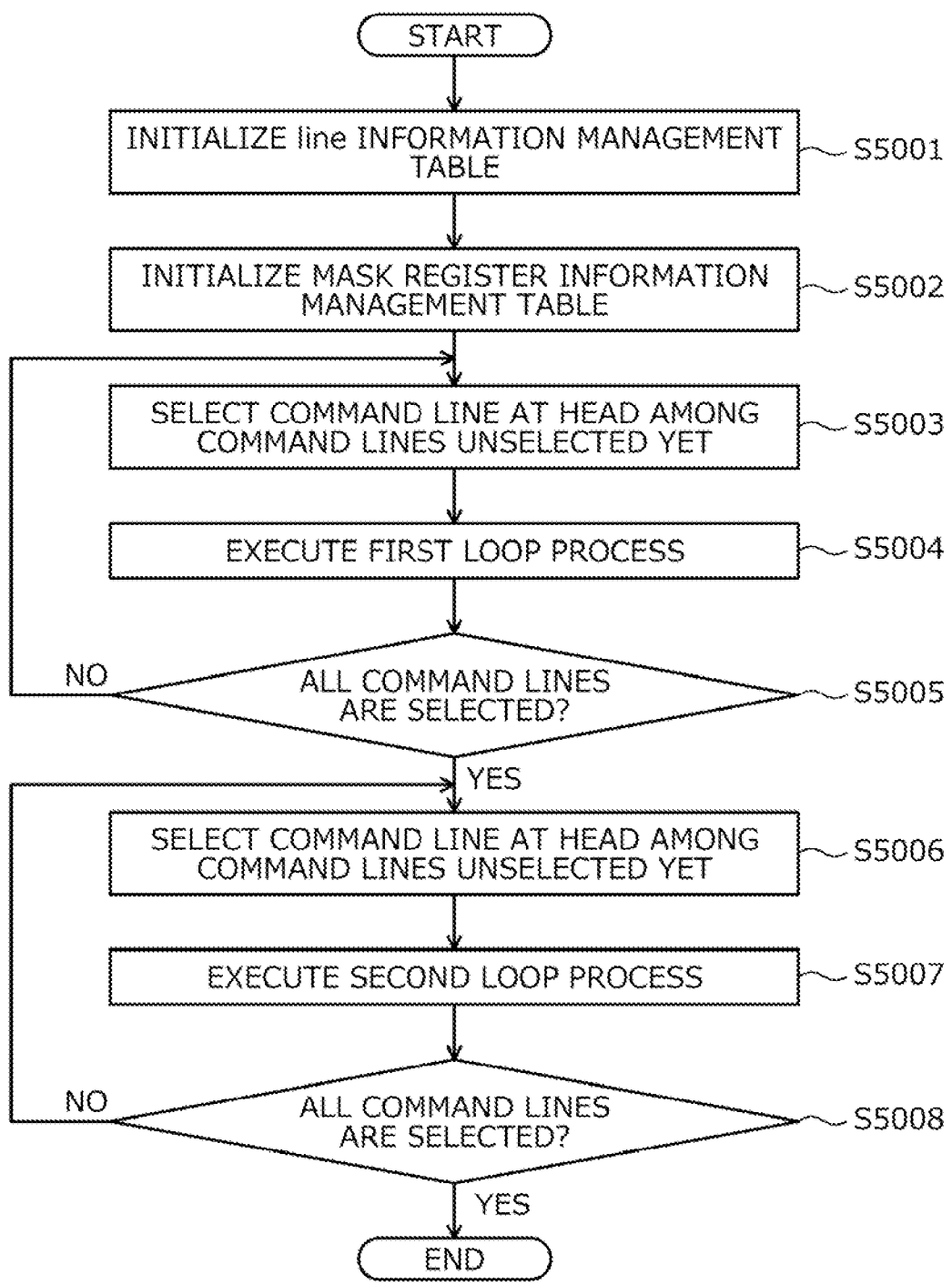
FIG. 50 is a flowchart illustrating an example of an overall process procedure.

FIG. 50 is a flowchart illustrating an example of the overall process procedure. In FIG. 50, the command conversion apparatus 100 initializes the line information management table 400 (step S5001). The command conversion apparatus 100 initializes the mask register information management table 500 (step S5002).

Next, the command conversion apparatus 100 selects, as a processing target of a first loop, a command line at a head among command lines that are included in an assembler source code of IA-64 and not selected yet as the processing target of the first loop (step S5003). The command conversion apparatus 100 executes a first loop process, which will be described below with reference to FIG. 51 (step S5004).

Next, the command conversion apparatus 100 determines whether or not all command lines of the assembler source code are selected as the processing targets of the first loop (step S5005). In a case where there is an unselected command line (No in step S5005), the command conversion apparatus 100 returns to the process in step S5003. By contrast, in a case where all the command lines are selected (Yes in step S5005), the command conversion apparatus 100 proceeds to the process in step S5006.

At step S5006, the command conversion apparatus 100 selects, as a processing target of a second loop, a command line at a head among command lines that are included in the assembler source code and not selected yet as the processing target of the second loop (step S5006). Next, the command conversion apparatus 100 executes a second loop process, which will be described with reference to FIG. 52 (step S5007).

The command conversion apparatus 100 determines whether or not all the command lines of the assembler source code are selected as the processing targets of the second loop (step S5008). In a case where there is an unselected command line (No in step S5008), the command conversion apparatus 100 returns to the process in step S5006. By contrast, in a case where all the command lines are selected (Yes in step S5008), the command conversion apparatus 100 ends the entire process.

(First Loop Process Procedure)

Next, an example of a first loop process procedure executed by the command conversion apparatus 100 will be described with reference to FIG. 51. For example, the first loop process is implemented by the CPU 301, a storage region such as the memory 302 or the recording medium 305, and the network I/F 303 illustrated in FIG. 3.

Figure 51:
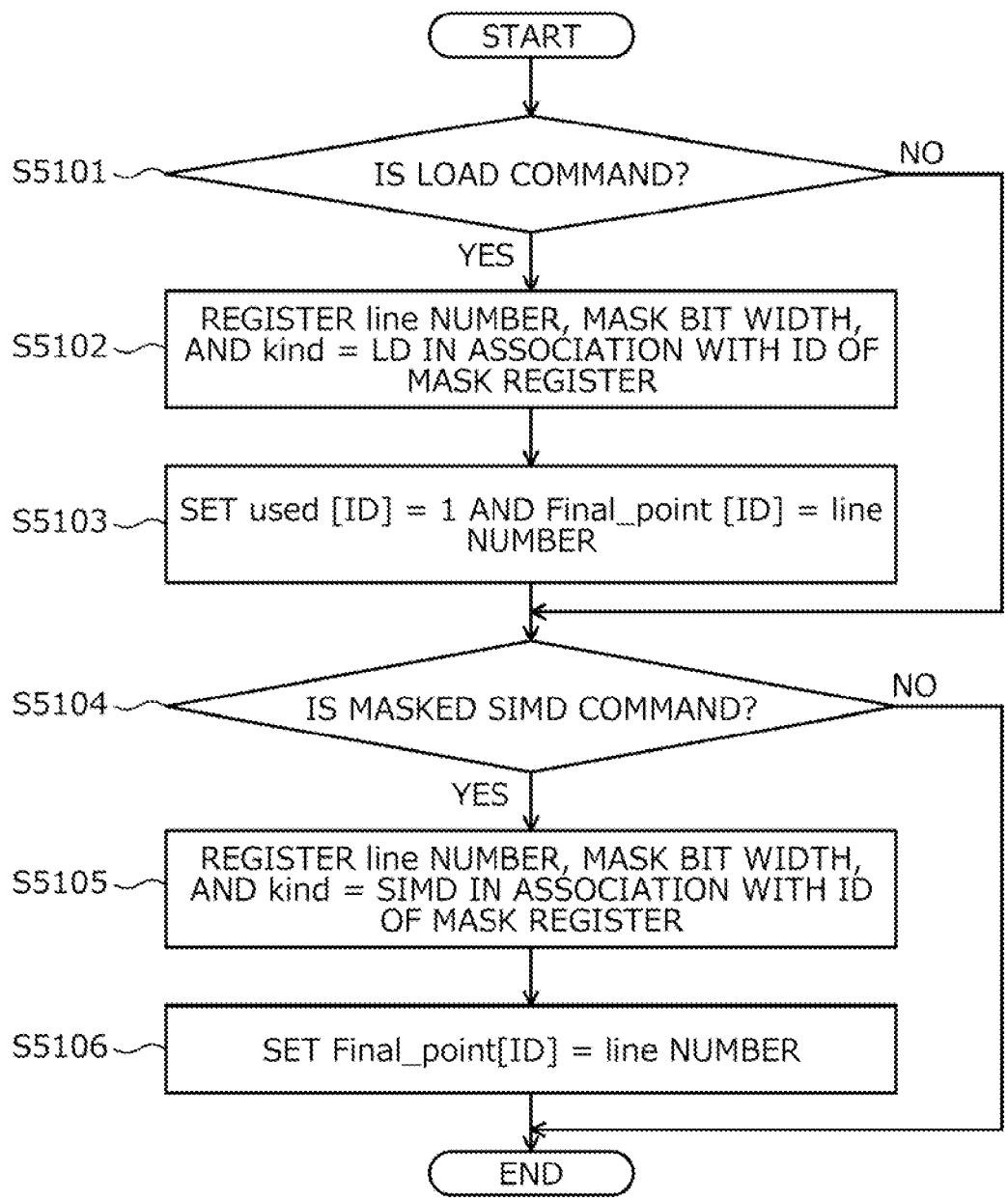
FIG. 51 is a flowchart illustrating an example of a first loop process procedure.

FIG. 51 is a flowchart illustrating the example of the first loop process procedure. In FIG. 51, the command conversion apparatus 100 determines whether or not a selected command line is a load command to a mask register (step S5101). In a case where the command is not the load command (No in step in S5101), the command conversion apparatus 100 proceeds to the process in step S5104. By contrast, in a case where the command is the load command (Yes in step S5101), the command conversion apparatus 100 proceeds to the process in step S5102.

At step S5102, the command conversion apparatus 100 registers a line number of the selected command line, a mask bit width of the mask register, and kind=LD in the line information management table 400 in association with an ID of the mask register (step S5102). Next, the command conversion apparatus 100 sets used[ID]=1 and Final_point [ID]=the line number of the selected command line, in the mask register information management table 500 (step S5103). The command conversion apparatus 100 proceeds to the process in step S5104.

At step S5104, the command conversion apparatus 100 determines whether or not the selected command line is a masked SIMD command (step S5104). In a case where the command is not the masked SIMD command (No in step S5104), the command conversion apparatus 100 ends the first loop process. By contrast, in a case where the command is the masked SIMD command (Yes in step S5104), the command conversion apparatus 100 proceeds to the process in step S5105.

At step S5105, the command conversion apparatus 100 registers a line number of the selected command line, a mask bit width of the mask register, and kind=SIMD, in the line information management table 400, in association with an ID of the mask register (step S5105). The mask bit width is a mask bit width requested by the selected command line.

Next, the command conversion apparatus 100 sets Final_point[ID]=the line number of the selected command line, in the mask register information management table 500 (step S5106). For example, the command conversion apparatus 100 may set Final_point[ID]=the line number of the selected command line only in a case where the mask bit width requested by the selected command line does not coincide with the immediately before mask bit width. The command conversion apparatus 100 ends the first loop process.

(Second Loop Process Procedure)

Next, an example of a second loop process procedure executed by the command conversion apparatus 100 will be described with reference to FIGS. 52 to 55. For example, the second loop process is implemented by the CPU 301, a storage region such as the memory 302 or the recording medium 305, and the network I/F 303 illustrated in FIG. 3.

Figure 52:
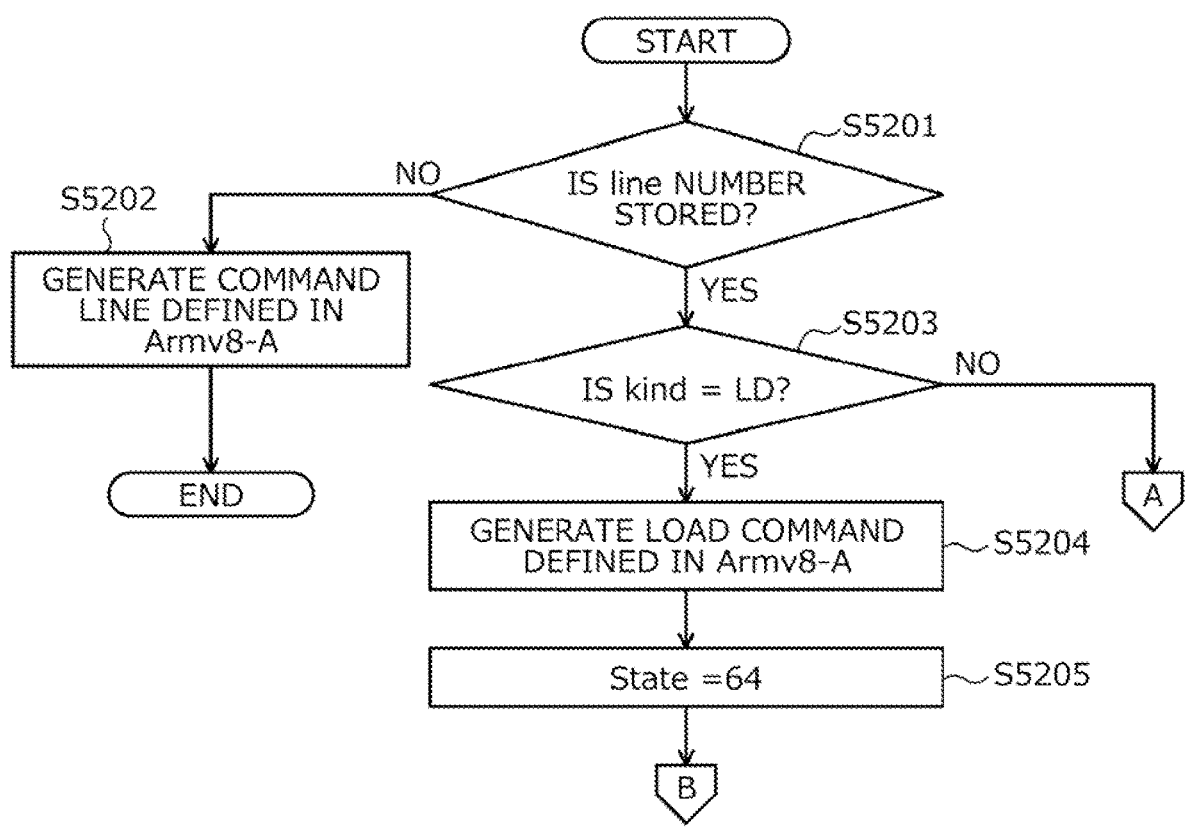
FIG. 52 is a flowchart (part 1) illustrating an example of a second loop process procedure.

FIGS. 52 to 55 are flowcharts illustrating an example of the second loop process procedure. In FIG. 52, the command conversion apparatus 100 determines whether or not a line number of a selected command line is stored in the line information management table 400 (step S5201). In a case where the line number of the selected command line is stored (Yes in step S5201), the command conversion apparatus 100 proceeds to the process in step S5203. By contrast, in a case where the line number of the selected command line is not stored (No in step S5201), the command conversion apparatus 100 proceeds to the process in step S5202.

At step S5202, the command conversion apparatus 100 generates a command line defined in Armv8-A, corresponding to the selected command line, and inserts the generated command line into an assembler source code after conversion (step S5202). The command conversion apparatus 100 ends the second loop process.

At step S5203, the command conversion apparatus 100 determines whether or not a kind stored in the line information management table 400 in association with the line number of the selected command line is LD (step S5203). In a case where the kind is not LD but SIMD (No in step S5203), the command conversion apparatus 100 proceeds to the process in step S5401 in FIG. 54. By contrast, in a case where the kind is LD (Yes in step S5203), the command conversion apparatus 100 proceeds to the process in step S5204.

At step S5204, the command conversion apparatus 100 generates a load command defined in Armv8-A for reading 64-bit data from [memory address] and copying the 64-bit data to a mask register, and inserts the load command into the assembler source code after conversion (step S5204). The mask register to be copied is specified by an ID stored in the line information management table 400 in association with the line number of the selected command line.

Next, the command conversion apparatus 100 sets State[ID]=64 (step S5205). The command conversion apparatus 100 proceeds to the process in step S5301 in FIG. 53. Next, the description continues with reference to FIG. 53.

Figure 53:
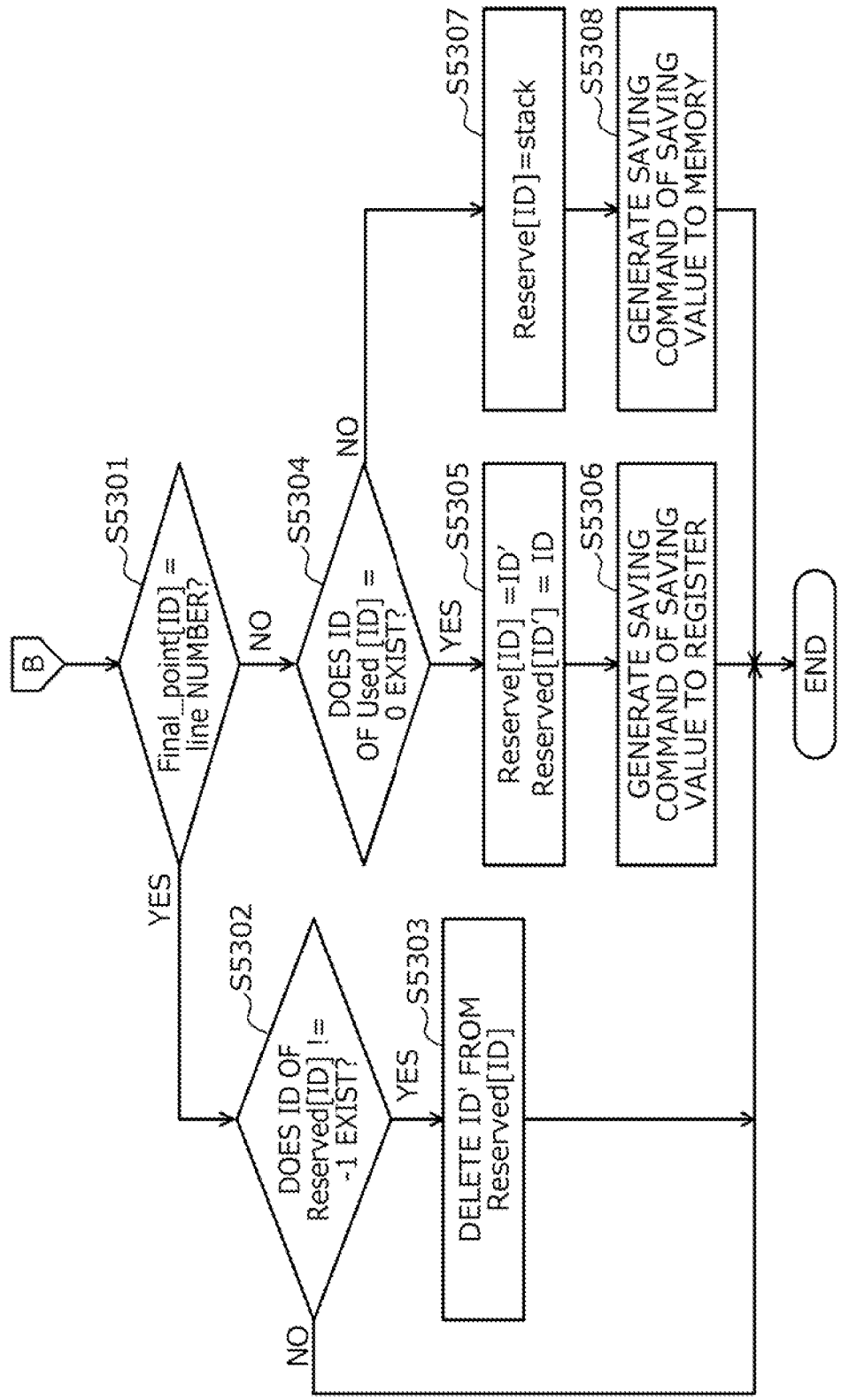
FIG. 53 is a flowchart (part 2) illustrating the example of the second loop process procedure.

In FIG. 53, the command conversion apparatus 100 determines whether or not Final_point[ID]=the line number of the selected command line is satisfied (step S5301). In a case where Final_point[ID]=the line number of the selected command line (Yes in step S5301), the command conversion apparatus 100 proceeds to the process in step S5302. By contrast, in a case where Final_point[ID]=the line number of the selected command line is not satisfied (No in step S5301), the command conversion apparatus 100 proceeds to the process in step S5304.

At step S5302, the command conversion apparatus 100 determines whether or not an ID with Reserve[ID] !=−1 exists (step S5302). In a case where the ID exists (Yes in step S5302), the command conversion apparatus 100 deletes ID' from Reserve[ID], sets Reserved[ID']=−1 (step S5303), and ends the second loop process. By contrast, in a case where the ID does not exist (No in step S5302), the command conversion apparatus 100 ends the second loop process.

At step S5304, the command conversion apparatus 100 determines whether or not there is an ID with used[ID]=0 (step S5304). In a case where the ID with used[ID]=0 exists (Yes in step S5304), the command conversion apparatus 100 proceeds to the process in step S5305. By contrast, in a case where the ID with used[ID]=0 does not exist (No in step S5304), the command conversion apparatus 100 proceeds to the process in step S5307.

At step S5305, the command conversion apparatus 100 sets Reserve[ID]=ID' and Reserved[ID']=ID (step S5305). Next, the command conversion apparatus 100 generates a saving command defined in Armv8-A, for saving a value of a mask register indicated by ID to a mask register indicated by ID', and inserts the saving command into the assembler source code after conversion (step S5306). After that, the command conversion apparatus 100 ends the second loop process.

At step S5307, the command conversion apparatus 100 sets Reserve[ID]=stack (step S5307). Next, the command conversion apparatus 100 generates a saving command to a memory defined in Armv8-A, and inserts the saving command into the assembler source code after conversion (step S5308). After that, the command conversion apparatus 100 ends the second loop process. Next, the description continues with reference to FIG. 54.

Figure 54:
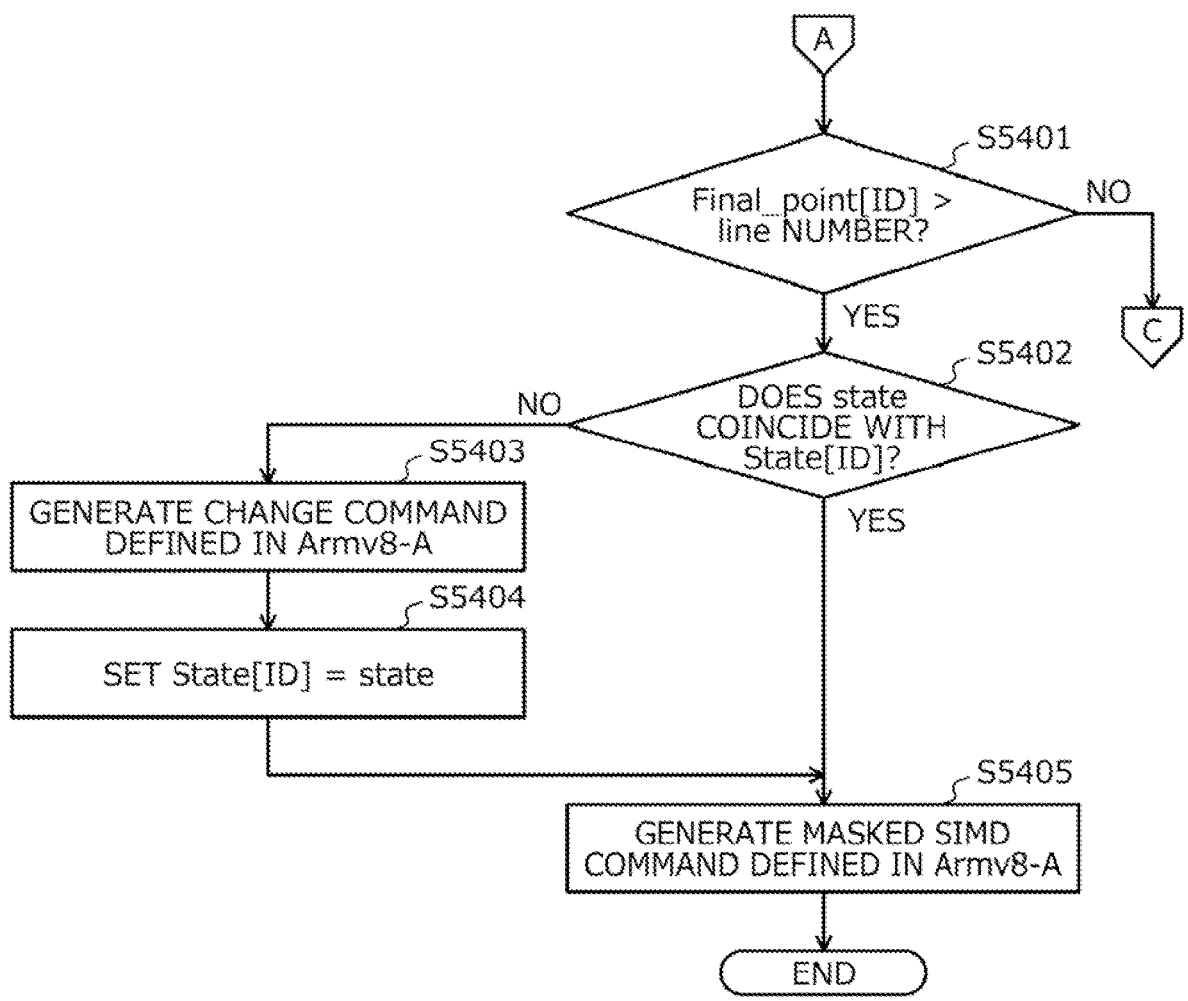
FIG. 54 is a flowchart (part 3) illustrating the example of the second loop process procedure.

In FIG. 54, the command conversion apparatus 100 determines whether or not Final_point[ID]>a line number of a selected command line is satisfied (step S5401). In a case where Final_point[ID]>the line number of the selected command line is not satisfied (No in step S5401), the command conversion apparatus 100 proceeds to the process in step S5501 in FIG. 55. By contrast, in a case where Final_point[ID]>the line number of the selected command line is satisfied (Yes in step S5401), the command conversion apparatus 100 proceeds to the process in step S5402.

At step S5402, the command conversion apparatus 100 determines whether or not a state stored in the line information management table 400 in association with the line number of the selected command line coincides with State[ID] (step S5402). In a case where the state coincides with State[ID] (Yes in step S5402), the command conversion apparatus 100 proceeds to the process in step S5405. By contrast, in a case where the state does not coincide with State[ID] (No in step S5402), the command conversion apparatus 100 proceeds to the process in step S5403.

At step S5403, the command conversion apparatus 100 generates a change command defined in Armv8-A, for changing a value of a mask register in accordance with a mask bit width requested by a masked SIMD command, and inserts the change command into the assembler source code after conversion (step S5403). Next, the command conversion apparatus 100 sets State[ID]=state (step S5404). The command conversion apparatus 100 proceeds the process to the process in step S5405.

At step S5405, the command conversion apparatus 100 generates a masked SIMD command defined in Armv8-A, and inserts the masked SIMD command into the assembler source code after conversion (step S5405). The command conversion apparatus 100 ends the second loop process. Next, the description continues with reference to FIG. 55.

Figure 55:
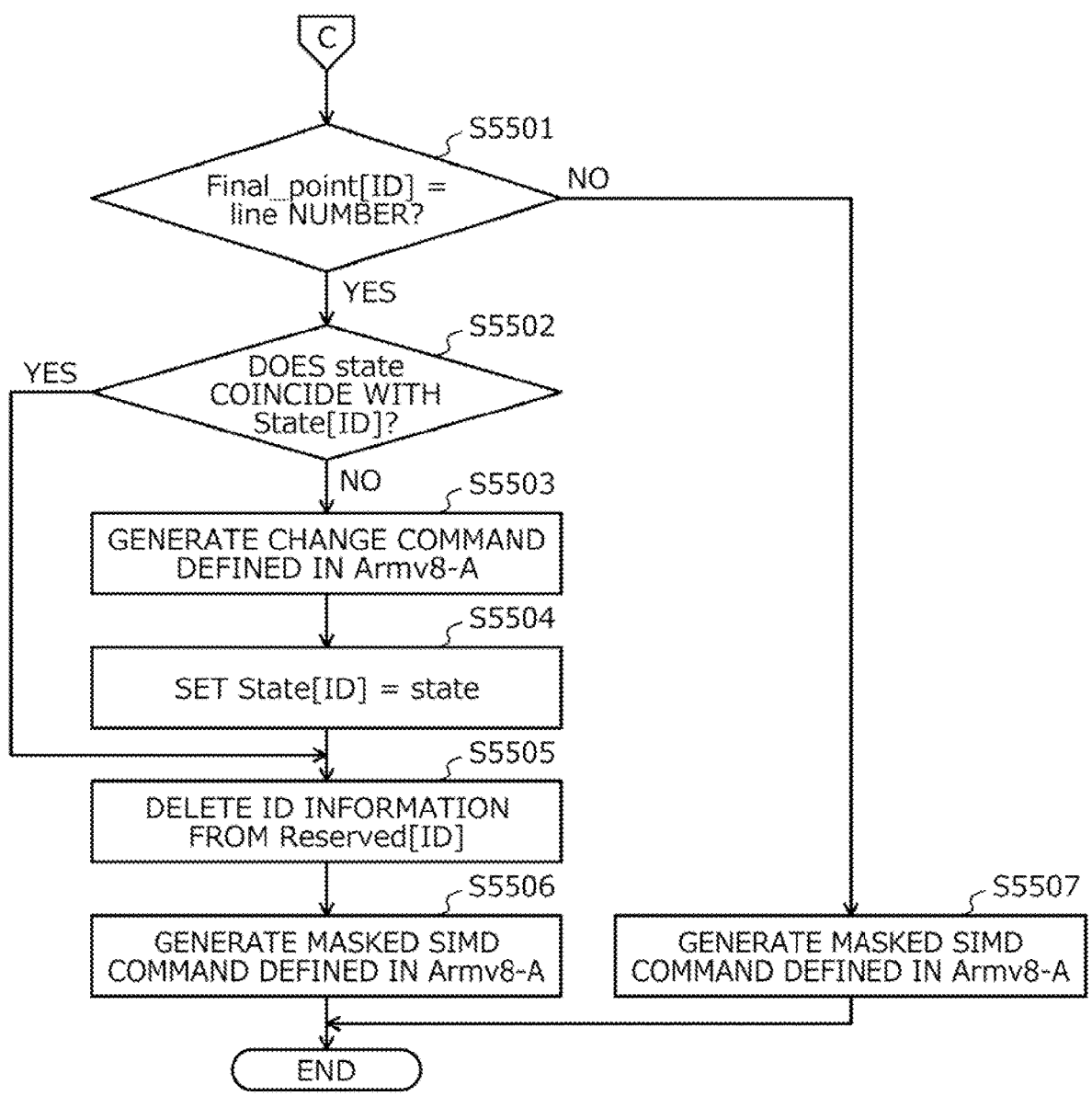
FIG. 55 is a flowchart (part 4) illustrating the example of the second loop process procedure.

In FIG. 55, the command conversion apparatus 100 determines whether or not Final_point[ID]=a line number of a selected command line (step S5501). In a case where Final_point[ID]=the line number of the selected command line is not satisfied (No in step S5501), the command conversion apparatus 100 proceeds to the process in step S5507. By contrast, in a case where Final_point[ID]=the line number of the selected command line is satisfied (Yes in step S5501), the command conversion apparatus 100 proceeds to the process in step S5502.

At step S5502, the command conversion apparatus 100 determines whether or not a state stored in the line information management table 400 in association with the line number of the selected command line coincides with State [ID] (step S5502). In a case where the state coincides with State[ID] (Yes in step S5502), the command conversion apparatus 100 proceeds to the process in step S5505. By contrast, in a case where the state does not coincide with State[ID] (No in step S5502), the command conversion apparatus 100 proceeds to the process in step S5503.

At step S5503, the command conversion apparatus 100 generates a change command defined in Armv8-A, for changing a value of a mask register in accordance with a mask bit width requested by a masked SIMD command, and inserts the change command into the assembler source code after conversion (step S5503). Next, the command conversion apparatus 100 sets State[ID]=state (step S5504). The command conversion apparatus 100 proceeds the process to the process in step S5505.

At step S5505, the command conversion apparatus 100 sets Reserved[Reserve[ID]]=−1, and deletes the ID of the mask register from Reserve[ID] (step S5505). Next, the command conversion apparatus 100 generates a masked SIMD command defined in Armv8-A, and inserts the masked SIMD command into the assembler source code after conversion (step S5506). The command conversion apparatus 100 ends the second loop process.

At step S5507, the command conversion apparatus 100 generates a masked SIMD command defined in Armv8-A, and inserts the masked SIMD command into the assembler source code after conversion (step S5507). The command conversion apparatus 100 ends the second loop process.

The command conversion apparatus 100 may partially change and execute an order of the processes in steps illustrated in each of the flowcharts illustrated in FIGS. 50 to 55. For example, the order of the processes in steps S5101 to S5103 may be changed with the order of the processes in steps S5104 to S5106. Here, the case where the command conversion apparatus 100 converts the assembler source code of IA-64 into the assembler source code of Armv8-A is described, and the embodiment is not limited thereto. For example, the command conversion apparatus 100 may convert an assembler source code of Armv8-A into an assembler source code of IA-64, in some cases.

As described above, with the command conversion apparatus 100, it is possible to acquire a first source code corresponding to a first-type processor. With the command conversion apparatus 100, it is possible to convert a first load command for a first mask register included in the first-type processor, in the first source code, into a second load command for a second mask register included in a second-type processor. With the command conversion apparatus 100, it is possible to determine whether or not there is a first SIMD command that performs an arithmetic operation using the first mask register after the first load command, in the first source code. With the command conversion apparatus 100, when the first SIMD command exists, it is possible to determine whether or not a state of a value of the first mask register requested by the first SIMD command coincides with a state of a value of the first mask register. With the command conversion apparatus 100, when the states do not coincide with each other, it is possible to convert the first SIMD command into a second SIMD command corresponding to the second-type processor and a change command for changing a state of a value of the second mask register to a state of a value of the second mask register requested by the second SIMD command. Accordingly, the command conversion apparatus 100 may generate the second load command that implements the same function as a function of the first load command so as to be correctly executable by the second-type processor. The command conversion apparatus 100 may generate a pair of second SIMD command and change command that implements the same function as a function of the first SIMD command so as to be correctly executable by the second-type processor. Therefore, the command conversion apparatus 100 may easily generate a source code that is correctly executable by the second-type processor.

With the command conversion apparatus 100, it is possible to convert the first SIMD command into the second SIMD command when the state of the value of the first mask register requested by the first SIMD command coincides with the state of the value of the first mask register. Accordingly, the command conversion apparatus 100 may easily generate a source code that is correctly executable by the second-type processor. The command conversion apparatus 100 may reduce the processing amount, without generating a change command.

With the command conversion apparatus 100, when the first SIMD command exists after the first load command, the first load command may be converted into a second load command and a saving command for saving the value of the second mask register to a third mask register included in the second-type processor. Accordingly, the command conversion apparatus 100 may set the value of the second mask register to be restorable, and may easily generate a source code that is correctly executable by the second-type processor.

With the command conversion apparatus 100, it is possible to determine whether or not the state of the value of the first mask register requested by the first SIMD command coincides with the state of the value of the first mask register. With the command conversion apparatus 100, it is possible to determine whether or not there is another SIMD command that performs an arithmetic operation using the first mask register after the first SIMD command, in the first source code. With the command conversion apparatus 100, when the states do not coincide with each other and there is no other SIMD command, it is possible to convert the first SIMD command into a second SIMD command and a change command, and to release the third mask register. Accordingly, the command conversion apparatus 100 may easily secure an empty mask register. With the command conversion apparatus 100, it is possible to reduce the processing amount of source code that is correctly executable by the second-type processor.

With the command conversion apparatus 100, it is possible to determine whether or not the state of the value of the first mask register requested by the first SIMD command coincides with the state of the value of the first mask register. With the command conversion apparatus 100, it is possible to determine whether or not the state of the value of the first mask register, which exists after the first SIMD command and requested by another SIMD command that performs an arithmetic operation using the first mask register, coincides with the state of the value of the first mask register. In some cases, it is determined that the state of the value of the first mask register requested by the first SIMD command does not coincide with the state of the value of the first mask register, and the state of the value of the first mask register requested by the another SIMD command coincides with the state of the value of the first mask register. In this case, according to the command conversion apparatus 100, it is possible to convert the first SIMD command into the second SIMD command and the change command, and to release the third mask register. Accordingly, the command conversion apparatus 100 may easily secure an empty mask register. With the command conversion apparatus 100, it is possible to reduce the processing amount of source code that is correctly executable by the second-type processor.

With the command conversion apparatus 100, it is possible to convert a command that is neither a load command nor an SIMD command in the first source code into a command corresponding to the second-type processor that implements a function corresponding to the command. Accordingly, the command conversion apparatus 100 may easily generate a source code that is correctly executable by the second-type processor.

With the command conversion apparatus 100, it is possible to convert a first load command included in the first source code corresponding to the first-type processor into a second load command corresponding to the second-type processor having a mask register use rule different from a mask register use rule of the first-type processor. With the command conversion apparatus 100, it is possible to convert a first SIMD command included in the first source code corresponding to the first-type processor into a second SIMD command or the like corresponding to the second-type processor having a mask register use rule different from a mask register use rule of the first-type processor. Accordingly, the command conversion apparatus 100 may easily generate a second source code described in an assembly language, which is correctly executable by the second-type processor having a mask register use rule different from a mask register use rule of the first-type processor.

With the command conversion apparatus 100, it is possible to acquire a first source code described in the assembly language. Accordingly, the command conversion apparatus 100 may treat the first source code described in the assembly language as a processing target, and may easily generate a second source code described in the assembly language, which is correctly executable by the second-type processor.

The command conversion method described in the present embodiment may be implemented by causing a computer, such as a PC or a workstation, to execute a program prepared in advance. A command conversion program described in the present embodiment is recorded in a computer-readable recording medium and is executed by being read from the recording medium by a computer. The recording medium is a hard disk, a flexible disk, a compact disc (CD)-ROM, a magneto optical (MO) disc, a Digital Versatile Disc (DVD), or the like. The command conversion program described in the present embodiment may be distributed via a network, such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a command conversion program for causing a computer to execute a process comprising:

converting, in a first source code corresponding to a first-type processor, a first load command for a first mask register included in the first-type processor into a second load command for a second mask register included in a second-type processor different from the first-type processor; and converting, when a first single instruction multiple data (SIMD) command for performing an arithmetic operation using the first mask register exists after the first load command in the first source code and a state of a value of the first mask register requested by the first SIMD command does not coincide with a state of a value of the first mask register, the first SIMD command into a second SIMD command corresponding to the second-type processor and a change command for changing a state of a value of the second mask register to a state of a value of the second mask register requested by the second SIMD command.

2. The non-transitory computer-readable recording medium according to claim 1, wherein in the converting of the first SIMD command, when the state of the value of the first mask register requested by the first SIMD command coincides with the state of the value of the first mask register, the first SIMD command is converted into the second SIMD command.

3. The non-transitory computer-readable recording medium according to claim 1, wherein in the converting of the first load command, when the first SIMD command exists after the first load command in the first source code, the first load command is converted into the second load command and a saving command for saving the value of the second mask register to a third mask register included in the second-type processor.

4. The non-transitory computer-readable recording medium according to claim 3, wherein in the converting of the first SIMD command, when the state of the value of the first mask register requested by the first SIMD command does not coincide with the state of the value of the first mask register and another SIMD command for performing an arithmetic operation using the first mask register does not exist after the first SIMD command in the first source code, the first SIMD command is converted into the second SIMD command and the change command, and the third mask register is released.

5. The non-transitory computer-readable recording medium according to claim 3, wherein in the converting of the first SIMD command, when the state of the value of the first mask register requested by the first SIMD command does not coincide with the state of the value of the first mask register, another SIMD command for performing an arithmetic operation using the first mask register exists after the first SIMD command in the first source code, and a state of a value of the first mask register requested by the another SIMD command coincides with the state of the value of the first mask register, the first SIMD command is converted into the second SIMD command and the change command, and the third mask register is released.

6. The non-transitory computer-readable recording medium according to claim 1, wherein the command conversion program causes the computer to execute a process of converting a command that is neither a load command nor an SIMD command in the first source code into a command corresponding to the second-type processor that implements a function corresponding to the command.

7. The non-transitory computer-readable recording medium according to claim 1, wherein a mask register use rule by the first-type processor and a mask register use rule by the second-type processor are different from each other.

8. The non-transitory computer-readable recording medium according to claim 1, wherein the first source code is described in an assembly language.

9. A command conversion method comprising:
converting, by a computer, in a first source code corresponding to a first-type processor, a first load command for a first mask register included in the first-type processor into a second load command for a second mask register included in a second-type processor different from the first-type processor; and
converting, in response to a case where a first single instruction multiple data (SIMD) command for performing an arithmetic operation using the first mask register exists after the first load command in the first source code and a state of a value of the first mask register requested by the first SIMD command does not coincide with a state of a value of the first mask register, the first SIMD command into a second SIMD command corresponding to the second-type processor and a change command for changing a state of a value of the second mask register to a state of a value of the second mask register requested by the second SIMD command.

10. An information processing apparatus comprising:
a memory; and
a processor coupled to the memory and configured to:
convert, in a first source code corresponding to a first-type processor, a first load command for a first mask register included in the first-type processor into a second load command for a second mask register included in a second-type processor different from the first-type processor; and
convert, when a first single instruction multiple data (SIMD) command for performing an arithmetic operation using the first mask register exists after the first load command in the first source code and a state of a value of the first mask register requested by the first SIMD command does not coincide with a state of a value of the first mask register, the first SIMD command into a second SIMD command corresponding to the second-type processor and a change command for changing a state of a value of the second mask register to a state of a value of the second mask register requested by the second SIMD command.

* * * * *